United States Patent [19]

Koike

[11] Patent Number: 4,506,580

[45] Date of Patent: Mar. 26, 1985

[54] TONE PATTERN IDENTIFYING SYSTEM

[75] Inventor: Tatsuhiro Koike, Hamakita, Japan

[73] Assignee: Nippon Gakki Seizo Kabushiki Kaisha, Hamamatsu, Japan

[21] Appl. No.: 462,181

[22] Filed: Jan. 31, 1983

[30] Foreign Application Priority Data

Feb. 2, 1982 [JP] Japan .................................. 57-15210
Feb. 2, 1982 [JP] Japan .................................. 57-15211

[51] Int. Cl.[3] ........................ G09B 15/04; G10H 7/00

[52] U.S. Cl. ........................................ 84/1.01; 84/1.28; 84/477 R; 84/478

[58] Field of Search ...................... 84/1.01, 1.03, 1.28, 84/477 R, 478

[56] References Cited

U.S. PATENT DOCUMENTS 3,539,701 11/1970 Milde .................................. 84/1.28
3,634,596 1/1972 Rupert ................................ 84/1.28
4,364,299 12/1982 Nakada et al. ........................ 84/478

*Primary Examiner*—S. J. Witkowski
*Attorney, Agent, or Firm*—Spensley Horn Jubas & Lubitz

[57] ABSTRACT

A tone pattern identifying system collates coincidence between tone data of an inputted tone array and tone data of a given reference theme tone array by recognizing such coincidence at corresponding locations between these two tone arrays for each shifting of their relative positions, and outputs at least a most closely resembling tone array as a result of the collation. This system may include means for evaluating the result of collation and means for displaying the result of the evaluation.

19 Claims, 55 Drawing Figures

TONE PATTERN IDENTIFYING SYSTEM

BACKGROUND OF THE INVENTION (a) Field of the Invention

The present invention relates to a tone pattern identifying system for comparing the tone pattern of tone array produced by a playing of a musical instrument or by singing, with a reference tone array.

(b) Description of the Prior Art

Such comparison of tone patterns is useful so that the result thereof is utilized in pointing out errors in the exercise of, for example, singing or playing of a musical instrument, or in performing remote control of various objectives.

In conventional systems of this kind, a reference tone array is stored preliminarily as a theme, and then in accordance with the performance which may be a playing of a musical instrument or a vocal performance, the respective tones constituting a tone array which is inputted through a microphone or a keyboard are compared successively against the tones present at corresponding positions in the reference tone array which has been stored, and thus identification of the inputted tone pattern is carried out. For this reason, if the initial part of the tone array which is inputted through, for example, a performance on the keyboard contains a tone which represents a trial playing for the purpose of, for example, achieving the matching of the tone, there has been the inconvenience that, even when, for example, the tone located in a later portion of the array has a close resemblance to the reference tone array than the tones in the earlier portion, the degree of resemblance of the inputted tone array relative to the reference tone array as the result of comparison will be judged to be nil, giving rise to many such mishaps in the past.

SUMMARY OF THE INVENTION

It is, therefore, a primary object of the present invention to provide a tone pattern identifying system which compares a reference tone array with an inputted tone array by detecting a portion of the inputted tone array which most closely resembles a portion of the reference tone array.

Another object of the present invention is to provide a tone pattern identifying system of the type as described above, which compares a reference tone array with an inputted tone array by detecting a portion of the inputted tone array which most closely resembles the reference tone array and also by detecting another portion of the inputted tone array which resembles the reference tone array in a lesser degree.

Still another object of the present invention is to provide a tone pattern identifying system of the type as described above, which, by combining the detected most closely resembling tone array portion with the detected less closely resembling tone array portion between the reference tone array and the inputted tone array, generates a tone array having a higher degree of resemblance than said most closely resembling tone array portion, and which then compares this tone array of a higher resemblance against the reference tone array.

Yet another object of the present invention is to provide a tone pattern identifying system of the type as described above, which performs the generation of a tone array having a higher degree of resemblance by a combination of the information concerning the most closely resembling tone array portion with the information on the less closely resembling tone array portion, to thereby be able to minimize the capacity of the required memory.

A further object of the present invention is to provide a tone pattern identifying system of the type as decribed above, which awards points of success to the pupil on the degree of resemblance of the inputted tone array relative to the reference tone array on the basis of the number of coincidence of tones and/or the lengths of the coincidental portions of the tone array.

A still further object of the present invention is to provide a tone pattern identifying system of the type as described above, which displays on a screen the result of the points to be awarded.

DETAILED DESCRIPTION OF THE PREFERRED EMBODIMENTS

FIGS. 1 to 37 are drawings for explaining a first embodiment in case the tone pattern identifying system of the present invention is applied to a melody exercising apparatus which is useful in exercising singing or in playing a piano or an electronic musical instrument.

In the following description, statement will be made typically with respect to a melody playing. It should be noted, however, that the same applies also to the exercise of rhythm playing, chord playing and other kinds of instrument playing.

Before making detailed description of the operation of the apparatus shown in this embodiment, description will be made first of an outline of the basic flow of respective operations of the respective parts of this apparatus by giving reference mainly to FIG. 1 which shows the overall arrangement of the apparatus.

Figure 1A:
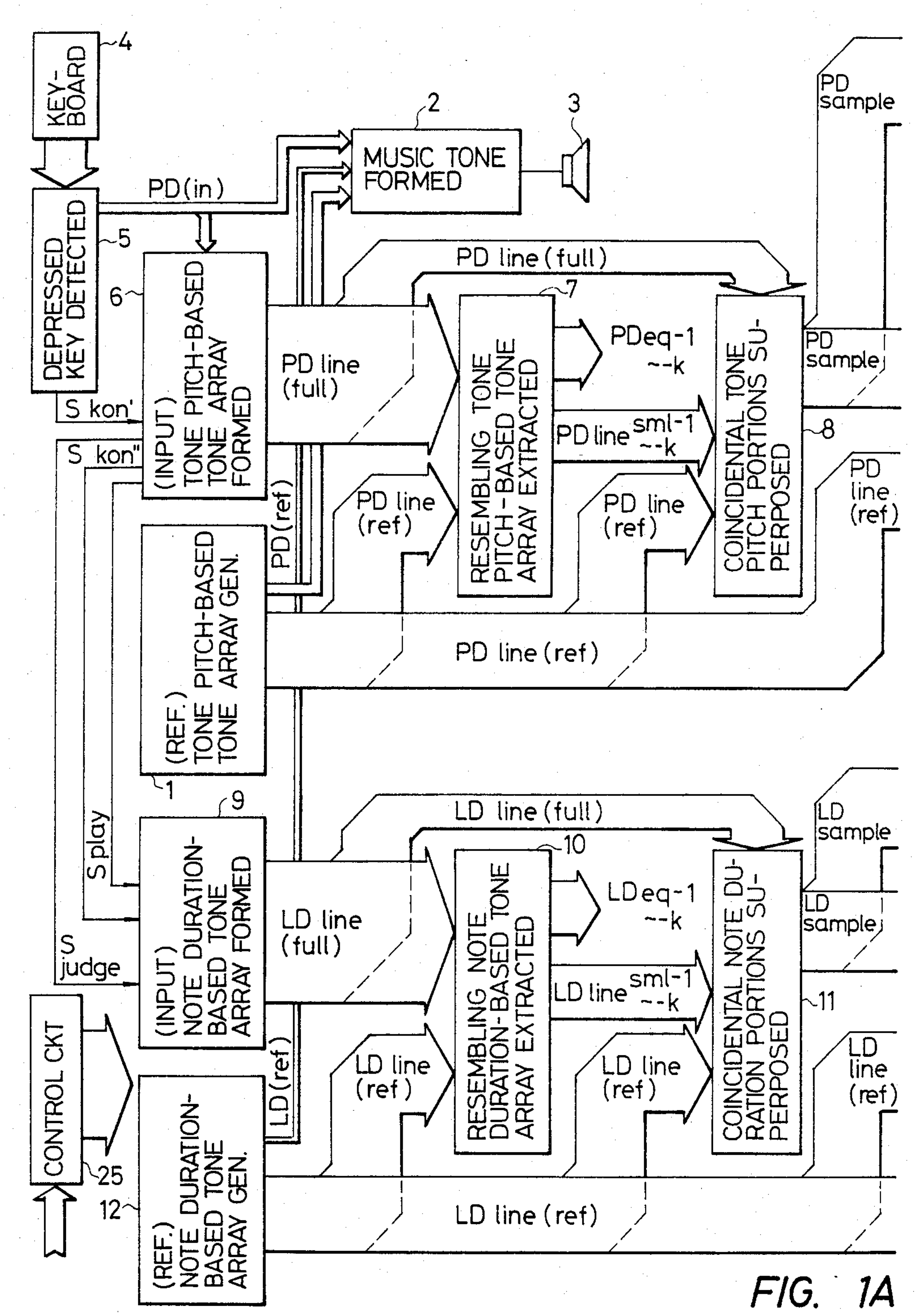
FIGS. 1A and 1B, in combination, are a block diagram showing the overall arrangement of a melody exercising apparatus embodying the present invention.
Figure 1B:
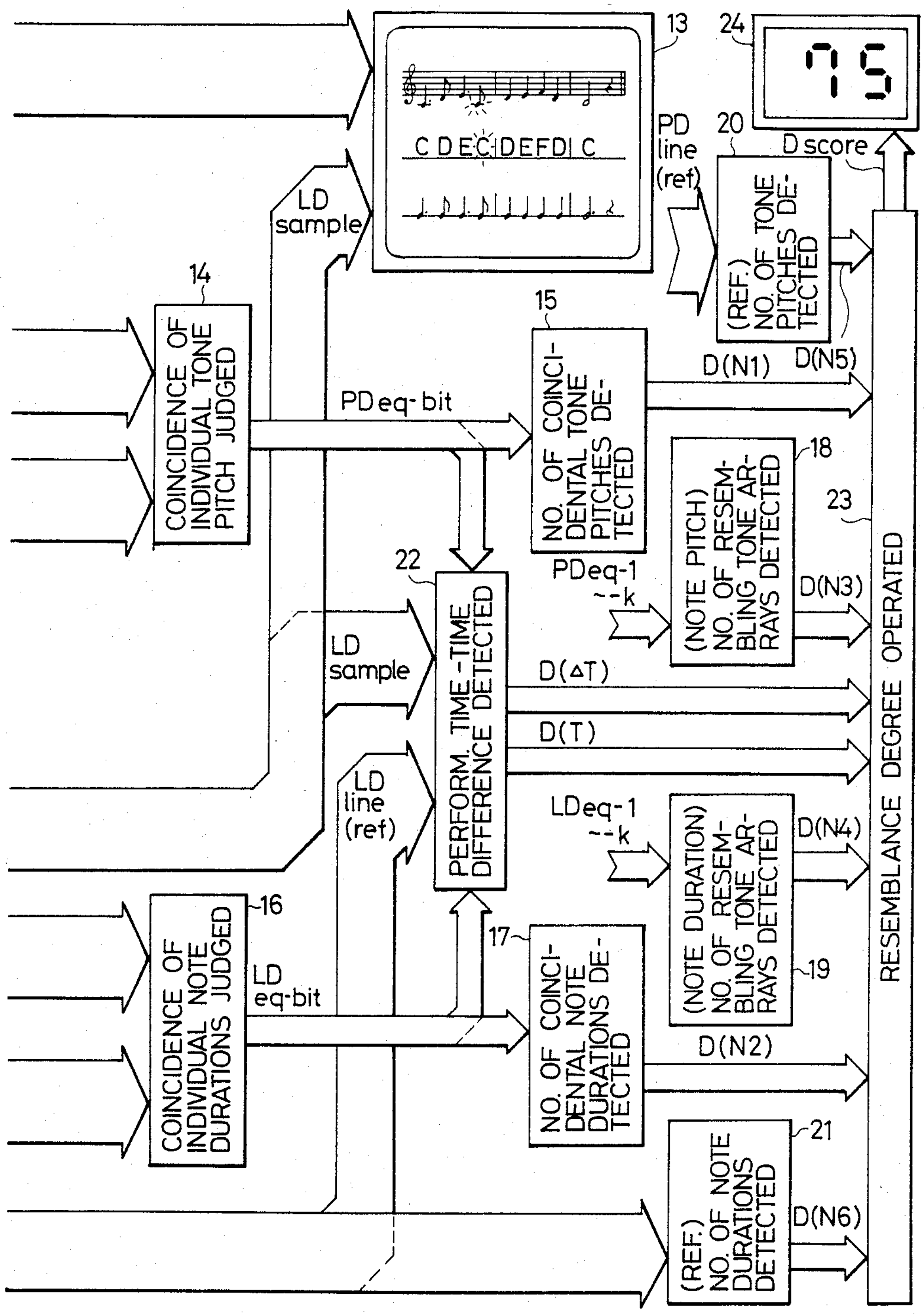

In FIG. 1, when provided with a start command signal from a means not shown, a reference tone pitch-based tone array generating circuit 1 outputs, time-divisionally in synchronism with the tone pronouncing timing of respective notes, respective tone pitch data $PD_{(ref)}$ (see FIG. 25(B)) which constitute a reference melody (see FIG. 25(A)). Upon receipt of these data $PD_{(ref)}$, a musical tone forming circuit 2 is driven, and a reference melody is sounded from a loudspeaker 3.

Thereafter, the student or pupil memorizes this sounded reference melody, and he plays the reference melody by using a keyboard based on his own memory.

From a depressed key detecting circuit 5 is outputted a key depression timing signal $S_{kon'}$ (see FIG. 26(B)) which is a minute width "1" pulse, that is, a "1" pulse having a minute width, at each depression of any key on the keyboard 4. Simultaneously therewith, and in synchronism therewith, tone pitch data $PD_{(in)}$ corresponding to the respective depressed keys on the keyboard 4 (see FIG. 26(A)) are outputted, and these signals are supplied to a tone pitch-based tone array forming circuit 6.

In the tone pitch-based tone array forming circuit 6, respective note durations are discriminated based on said signal $S_{kon'}$ for each of the original tone pitch data (see FIG. 27(A)) which are supplied thereto time-divisionally successively, and those tone pitch data smaller than the predetermined minute note durations which cannot become musical factors are removed by regarding them as "jitters". And, the remaining respective tone pitch data are stored in the order of their generation, and this circuit 6 utilizes them to form an inputted tone pitch-based tone array data $PD_{line(full)}$ (see FIG. 27(B)). Then, this data $PD_{line(full)}$ is supplied in parallel to a resembling note pitch-based tone array extracting circuit 7 and to a coincidental tone pitch portions superposing circuit 8.

In the resembling tone pitch-based tone array extracting circuit 7, the reference tone pitch-based tone array data $PD_{line(ref)}$ which is outputted from said reference tone pitch-based tone array generating circuit 1 is compared against the inputted tone pitch-based tone array data $PD_{line(full)}$ which is outputted from said inputted tone pitch-based tone array forming circuit 6, by giving reference to the tone array portion of the same length as the reference tone array after converting the abovesaid inputted data to a tone array pattern consisting of a train of sequentially arranged respective constitutional tones which are present in the corresponding timewise locations, while shifting the mutual starting positions progressively in such manner as if trains pass each other. The extracting circuit 7 extracts, from among these tone array portions, up to a maximum of k-th group, those portions of tone array which have higher resemblance with the reference tone pitch-based tone array in the order of closer resemblance (see FIGS. 27–30).

The extracting circuit 7 will output these extracted resembling tone pitch-based tone array portion data of a maximum of k groups after converting the data to a shift number data $PD_{line\ sml\text{-}1\sim\text{-}k}$ (see FIG. 27(C)–(J)) which represents the number of shifts of said input tone pitch-based tone array data $PD_{line(full)}$.

Simultaneously therewith, in the extracting circuit 7 there are outputted coincidental tone pitch number data $PD_{eq\text{-}1\sim k}$ between said extracted respective resembling tone pitch-based tone array portion data and the reference tone pitch-based tone array data $PD_{line(ref)}$.

Figure 35:
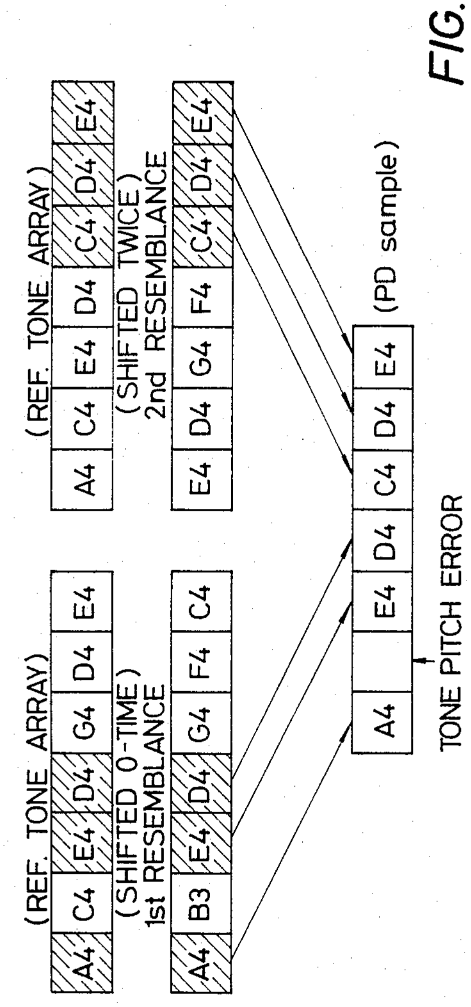
FIG. 35 is an explanatory illustration showing the flow of the tone array data processing which is performed in the circuit for superimposing the coincidental tone pitch array portions.

In the tone pitch portions superposing circuit 8, respective resembling tone pitch-based tone array portions data are reproduced based on the shift number data $PD_{line\ sml\text{-}1\sim\text{-}k}$ which is outputted from the resembling tone pitch-based tone array extracting circuit 7 and on the inputted tone pitch-based tone array data $PD_{line(full)}$ outputted from the inputted tone pitch-based tone array forming circuit 6, and these respective resembling tone pitch-based tone array portions data which are thus reproduced are compared with the reference tone pitch-based tone array data $PD_{line(ref)}$, and those tone pitch data which are in agreement therebetween are successively superposed with each other to form most closely resembling tone pitch-based tone array data $PD_{sample}$ (see FIG. 35).

Next, in an inputted note duration-based tone array forming circuit 9, note duration data corresponding to respective constitutional tones of the inputted tone pitch-based tone array data $PD_{line(full)}$ are formed based on the signals $S_{kon'}$ (see FIG. 26(C)) which are outputted from the inputted tone pitch-based tone array forming circuit 6, and these note duration data thus formed are stored successively in the order of their generation, to thereby form an inputted note duration-based tone array data $LD_{line(full)}$ (see FIG. 31(B)).

Figure 31:
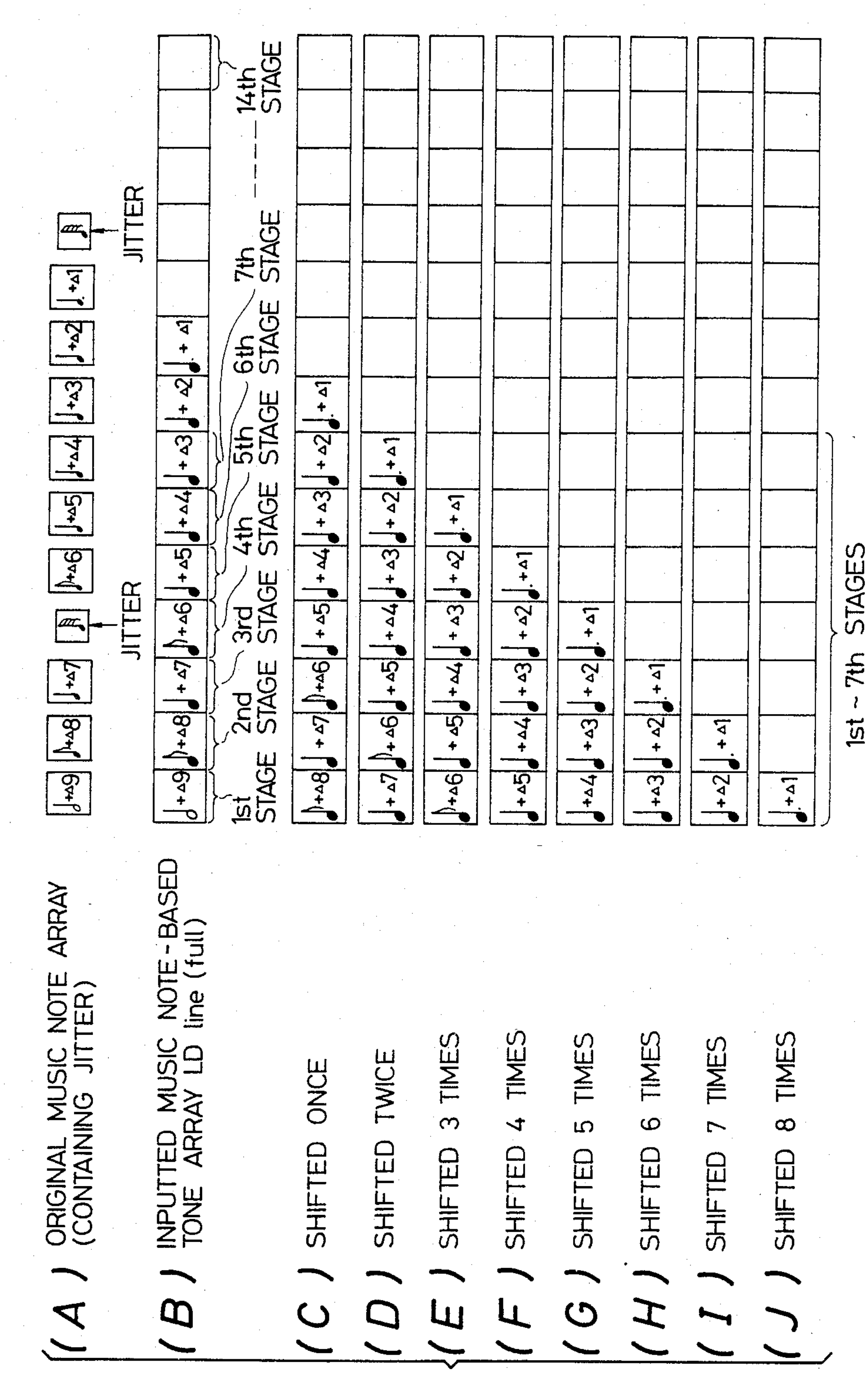
FIGS. 31 to 34 are explanatory illustrations showing the flow of the tone array data processing which is performed in the inputted note duration forming circuit and the resembling note duration-based tone array extracting circuit.
Figure 32:
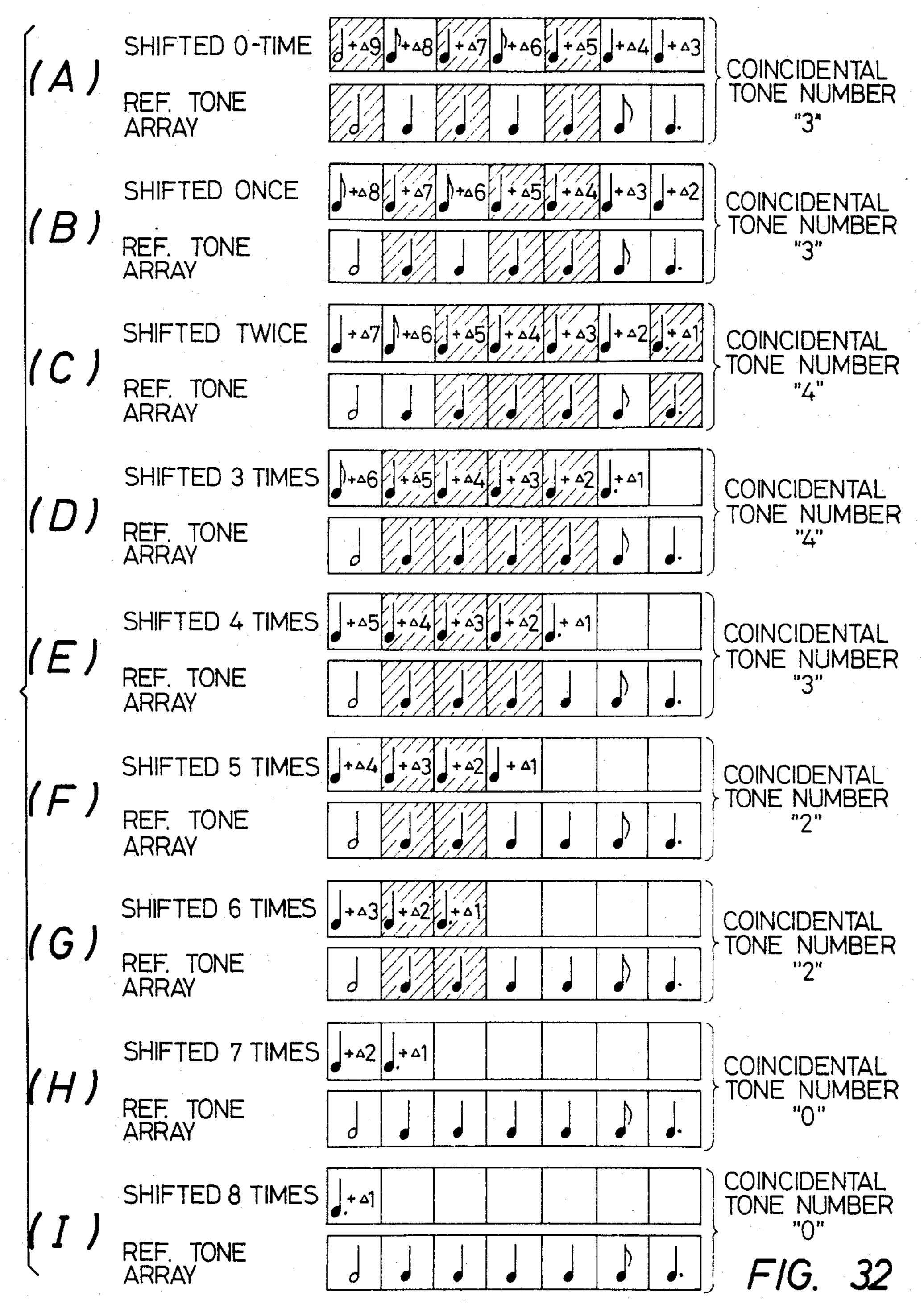
Figure 33:
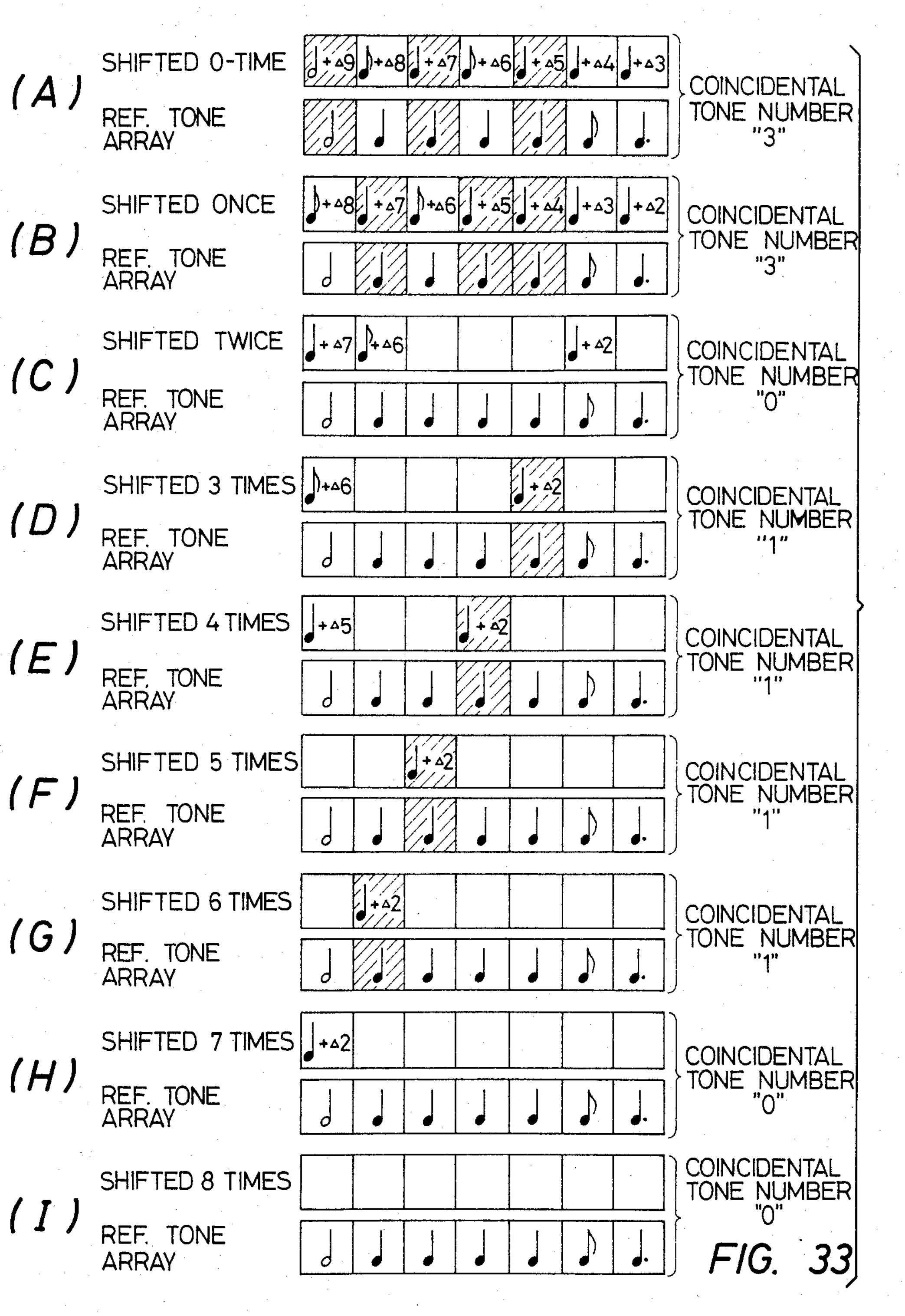
Figure 34:
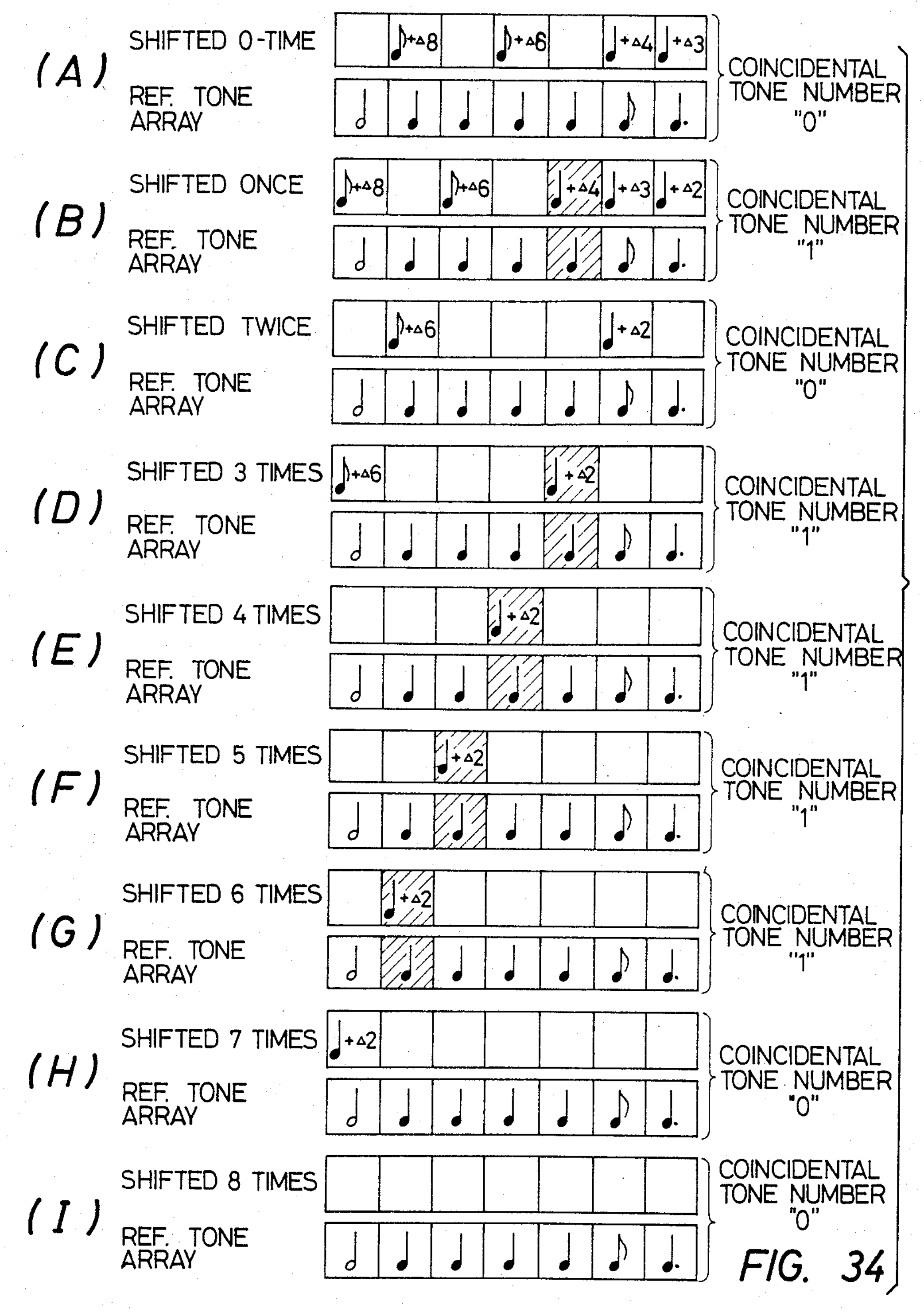

In a resembling note duration-based tone array extracting circuit 10, the reference note duration-based tone array data $LD_{line(ref)}$ (see FIG. 25(C)) which are outputted from a reference note duration-based tone array generating circuit 12 are compared against the inputted note duration-based tone array data (see FIG. 31(B)) which are outputted from the inputted note duration-based tone array forming circuit 9 between those tone array portions which are present in the same timewise locations while shifting the mutual starting positions progressively in the same way as that for the abovesaid instance of tone pitches, seeking those having higher resemblance arranged in the order of closer resemblance (see FIGS. 32 to 34).

And, this extracting circuit 10 outputs the respective resembling note duration-based tone array portions data after converting them to shift number data $LD_{line\ sml\text{-}1\sim\text{-}k}$ for the inputted note duration-based tone array data $LD_{line(full)}$ in the same way as that for the instance of tone pitches.

Simultaneously, from the resembling note duration-based tone array extracting circuit 10 are outputted coincidental note duration-based tone numbers data $LD_{eq\text{-}1\sim\text{-}k}$ indicative of the number of coincidental note durations between respective resembling note duration-based tone array portions data and the reference note duration-based tone array data $LD_{line(ref)}$.

Figure 36:
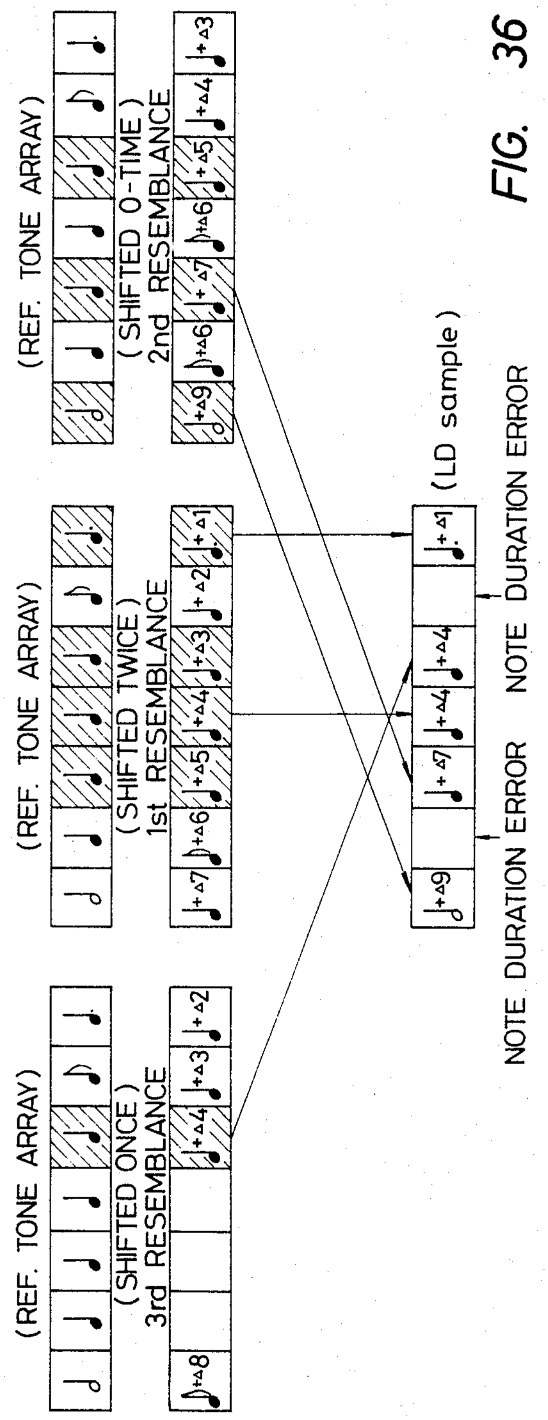
FIG. 36 is an explanatory illustration showing the flow of the tone array processing which is performed in the circuit for superposing the coincidental note duration portions.

In coincidental note duration portions superposing circuit 11, respective resembling note duration-based tone array portions data are reproduced based on the shift number data $LD_{line\ sml\text{-}1\sim\text{-}k}$ outputted from the resembling note duration-based tone array extracting circuit 10 and on the inputted note duration-based tone array data $LD_{line(full)}$ outputted from the inputted note duration-based tone array forming circuit 9, and these reproduced resembling note duration-based tone array portions data are compared successively with the reference note duration-based tone array data $LD_{line(ref)}$ to seek coincidental note duration portions therebetween, and these coincidental portions are superposed with each other, thereby forming most closely resembling note duration-based tone array data $LD_{sample}$ (see FIG. 36).

Figure 18:
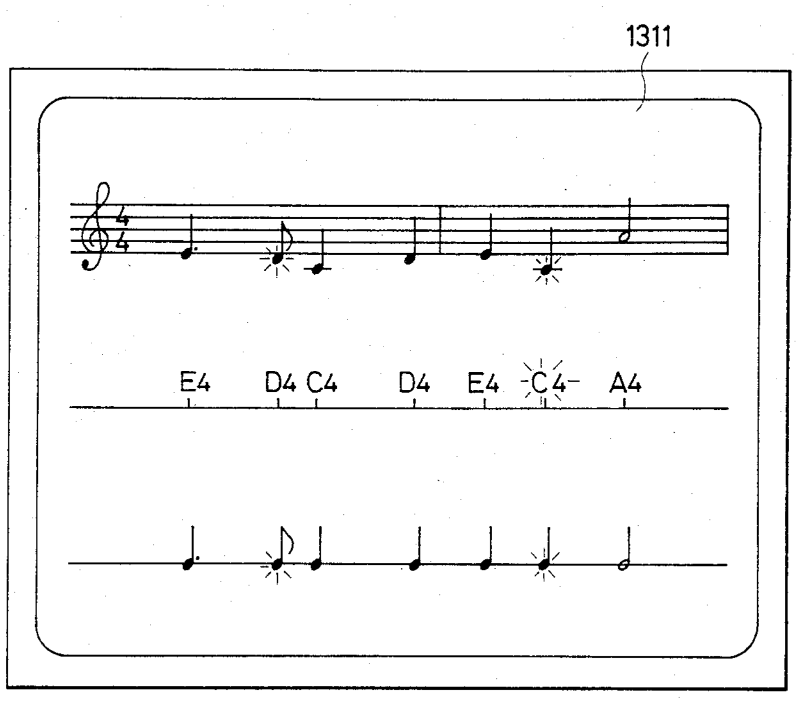
FIG. 18 is an illustration of an image on a CRT screen showing the state of the result of performance to be displayed on the CRT.

Then, the most closely resembling tone pitch-based tone array data $PD_{sample}$ outputted from the coincidental tone pitch portions superposing circuit 8 and the most closely resembling note duration-based tone array data $LD_{sample}$ outputted from the coincidental note duration portions superposing circuit 11 are supplied to a display circuit 13, and based on these data, the result of performance by the pupil is displayed as shown in FIG. 18 on the CRT display screen which constitutes the display circuit 13.

On the display screen, there are displayed, in vertically arranged three horizontal rows, score lines display, a tone pitch-based tone array display and a note duration-based tone array display. Furthermore, in the respective rows of display, there takes place flickering of a bright light at the site of erroneous performance.

Accordingly, by watching the display, the pupil is able to note, firstly by the music score display, which portion of the melody play that has been performed by the pupil himself is in error. Then, by watching the tone pitch-based tone array display on the middle row, and also the note duration-based tone array display on the bottom row, the pupil is able to recognize very clearly whether the error is in the tone pitch or in the note duration or in both.

Next, in the individual tone pitch coincidence discriminating circuit 14, there is performed, based on the reference tone pitch-based tone array data $PD_{line(ref)}$ and the most closely resembling tone pitch-based tone array data $PD_{sample}$, a discrimination or judgement whether the latter data is in agreement with the reference melody for each tone pitch which constitutes the reference tone pitch-based tone array data, and the result of this discrimination or judgement is outputted as an individual tone pitch coincidence judgement data $PD_{eq\text{-}bit}$ which is expressed by one-bit signal for each tone pitch.

A coincidental tone pitch number detecting circuit 15 seeks a coincidental tone number $N_1$ for the reference tone pitch-based tone array data, by relying on the data $PD_{eq\text{-}bit}$ which is outputted from the individual tone pitch coincidence judging circuit 14, and outputs a coincidental tone number data $D(N_1)$.

An individual note duration coincidence judging circuit 16 operates, based on the reference note duration-based tone array data $LD_{line(ref)}$ and the most closely resembling note duration tone array data $LD_{sample}$, to judge the coincidence between these two for each note duration, and outputs the result of discrimination (judgement) for each note duration as an individual note duration coincidence judging data $LD_{eq\text{-}bit}$ of one-bit signal.

A coincided note duration number detecting circuit 17 operates, based on the individual note duration coincidence judging data $LD_{eq}$, to seek a coincidence note number $N_2$ between the reference note duration-based tone array data and the most closely resembling note duration-based tone array data $LD_{sample}$, and outputs a data $D(N_2)$ indicative of the number of coincidental notes.

A circuit 18 for detecting the number of tone arrays containing resembling tone pitches seeks the number $N_3$of the groups having resembling tone pitch-based tone array portions data based on the respective coincidental tone pitch number data $PD_{eq\text{-}1\sim\text{-}k}$ which is outputted from the resembling tone pitch-based tone array extracting circuit 7, and outputs a data $D(N_3)$ indicative of this number $N_3$.

A circuit 19 for detecting the number of tone arrays having resembling note durations the number $N_4$ of the groups having a resembling note duration-based tone array portions data based on the respective coincidental note duration tone number data $LD_{eq\text{-}1\sim\text{-}k}$ outputted from the resembling note duration-based tone array extracting circuit 10, and outputs a data $D(N_4)$ indicative of the number of these groups $N_4$.

A reference tone pitch detecting circuit 20 seeks the number $N_5$ of tones constituting a reference tone pitch-based tone array data based on the reference tone pitch-based tone array data $PD_{line(ref)}$ outputted from the reference tone pitch-based tone array data generating circuit 1, and outputs a data $D(N_5)$ indicative of this numerical value $N_5$.

A reference note duration number detecting circuit 21 seeks a reference note duration-based tone array data constituting tone number $N_6$ based on the reference note duration-based tone array data $LD_{line(ref)}$ outputted from the reference note duration-based tone array generating circuit 12, and outputs a data $D(N_6)$ representative of this numerical value $N_6$.

A performance time and time difference detecting circuit 22 seeks a model performance time T and an erring performance time $\Delta T$ based on the individual tone pitch coincidence judging data $PD_{eq\text{-}bit}$ outputted from the individual tone pitch coincidence judging circuit 14, and on the most closely resembling note duration-based tone array data $LD_{sample}$ outputted from the coincidental note duration portions superposing circuit 11, and on the reference note duration-based tone array data $LD_{line(ref)}$ outputted from the reference note duration-based tone array generating circuit 12, and also on the individual note duration coincidence judge data $LD_{eq\text{-}bit}$ outputted from the individual note duration coincidence judging circuit 16, and outputs a data $D(T)$, $D(\Delta T)$ indicative of these data.

Next, a resemblance degree operating circuit 23 seeks a resemblance degree score data $D_{score}$ based on the coincidental tone pitch number data $D(N_1)$, the coincidental note duration number data $D(N_2)$, the tone pitch-resembling tone array group number data $D(N_3)$, the note duration-resembling tone array group number data $D(N_4)$, the reference tone pitch number data $D(N_5)$, the reference note duration number data $D(N_6)$, the model performance time data $D(T)$ and the performance time difference data $D(\Delta T)$, and causes the score an indicator 24 to display said data $D_{score}$.

The operation formula for seeking the resemblance degree score X based on the respective data is as mentioned below:

$$X=\{[100\times(N_1/N_5)\times(N_2/N_6)\times(T-|\Delta T|)/T]--Y\}\div5\times5,$$

wherein:

$N_1$ represents the number of coincidences on tone pitch;

$N_2$ represents the number of coincidences on note duration;

$N_3$ represents the number of tone pitch-resembling tone array groups;

$N_4$ represents the number of note duration-resembling tone array groups;

$N_5$ represents the number of notes except rests of a reference tone array;

$N_6$ represents the number of notes including rests of a reference tone array;

T represents a model performance time;

$\Delta T$ represents a performance time difference; and

Y represents $N_3$ or $N_4$.

As mentioned above, in this resemblance degree score operating system, it should be understood that, in carrying out the operation of resemblance degree score, the main mark-giving factors are placed on the coincidental tone pitch number $N_1$ and the coincidental note duration number $N_2$, and that accordingly even in case there is present, in the midway of a melody performance done by a pupil, an erroneous portion which has been re-performed or repeated as in the conventional case mentioned earlier in this specification, such presence will not substantially affect the final score, but instead there can be obtained a result of score-marking which is quite close to the sense of the pertinent music teacher per se.

Next, description will be made, in detail, of the flow of the basic operations of the apparatus of the present invention described above, by referring to the drawings of FIG. 2 onwards.

The driving of this apparatus is controlled by various controlling signals outputted from the controlling circuit 25, and therefore, description will be made first of the detailed construction of the controlling circuit 25 by referring to FIGS. 19 to 23.

Figure 19:
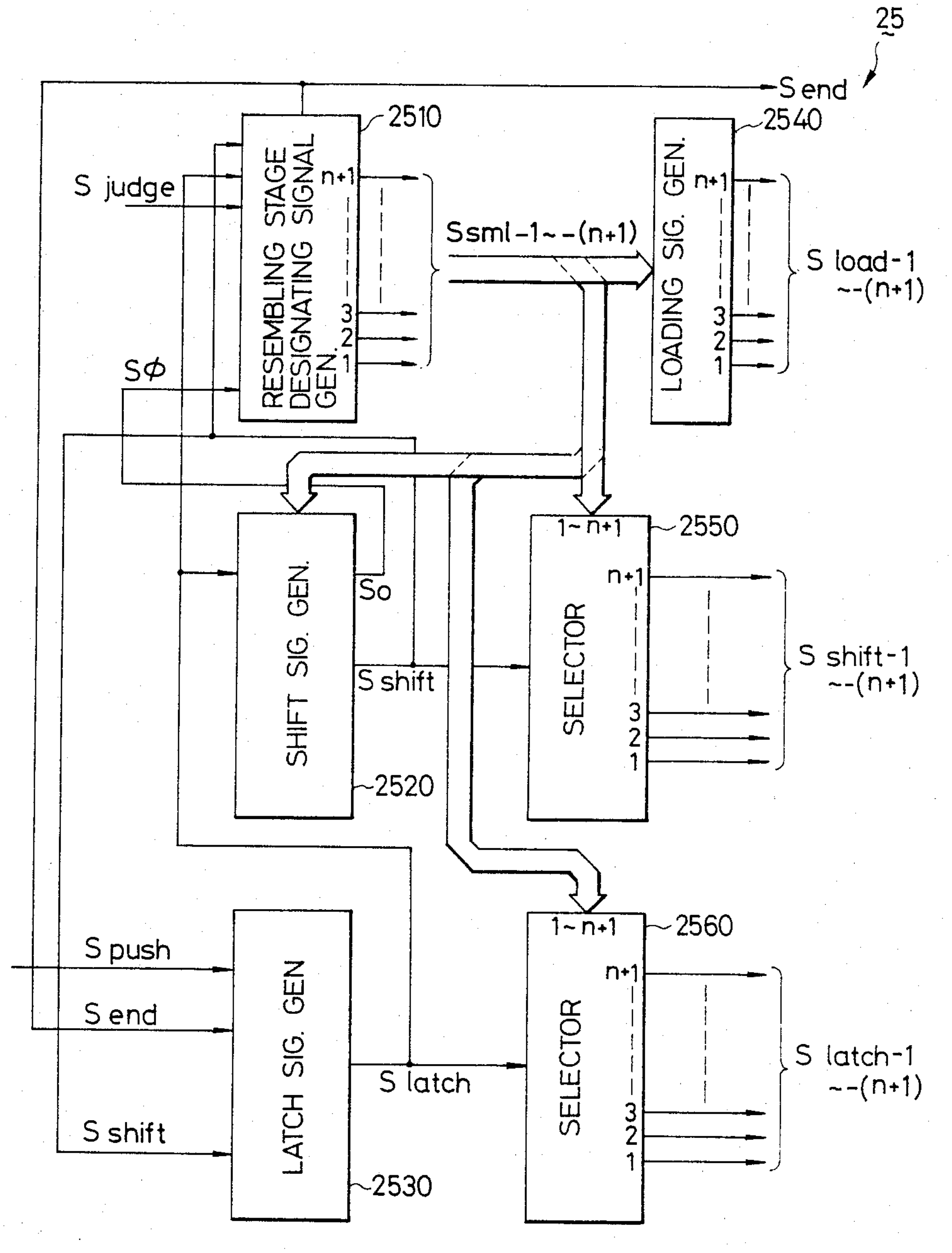
FIG. 19 is a block diagram showing the details of the controlling circuitry contained in FIG. 1A.

As shown in FIG. 19, the controlling circuit 25 is comprised of: a resemblance stage designating signal generating circuit 2510 which outputs a resembling stage designating signal $S_{sml\text{-}1\sim\text{-}(n+1)}$ intended to selectively designate either the first ~ the k-th resembling tone pitch-based tone array detecting circuit which will be described later, or the first ~ the k-th resembling note duration-based tone array detecting circuit; a shifting signal generating circuit 2520 which outputs a shifting signal $S_{shift}$ for the controlling of the advance of the shift registers contained in the designated resembling tone pitch-based tone array detecting circuit and the resembling note duration-based tone array detecting circuit; a latching signal generating circuit 2530 for outputting a latching signal $S_{latch}$ to the shift registers contained in said designated resembling tone pitch-based tone array detecting circuit and said resembling note duration-based tone array detecting circuit to cause them to latch an inputted tone pitch-based tone array data and an inputted note duration-based tone array data; a loading signal generating circuit 2540 which outputs a fine width "1" pulse in response to the respective rises of various resembling stage designating signals $S_{sml-1\sim-(n+1)}$ outputted from the resembling stage designation signal generating circuit 2510; a selector 2550 for changing-over and supplying the shifting signal $S_{shift}$ outputted from said shifting signal generating circuit 2520 to respective shift registers contained in the resembling tone pitch-based tone array detecting circuit and in the resembling note duration-based tone array detecting circuit which are in the resembling stages respectively and which are designated by the resembling stage designating circuit 2510; and a selector 2560 for changing-over and supplying the latching signal $S_{latch}$ outputted from the latching signal generating circuit 2530 to the resembling tone pitch-based tone array detecting circuit and the resembling note duration-based tone array detecting circuit which are in the respective resembling stages designated by said resembling stage designation signal generating circuit 2510.

Figure 20:
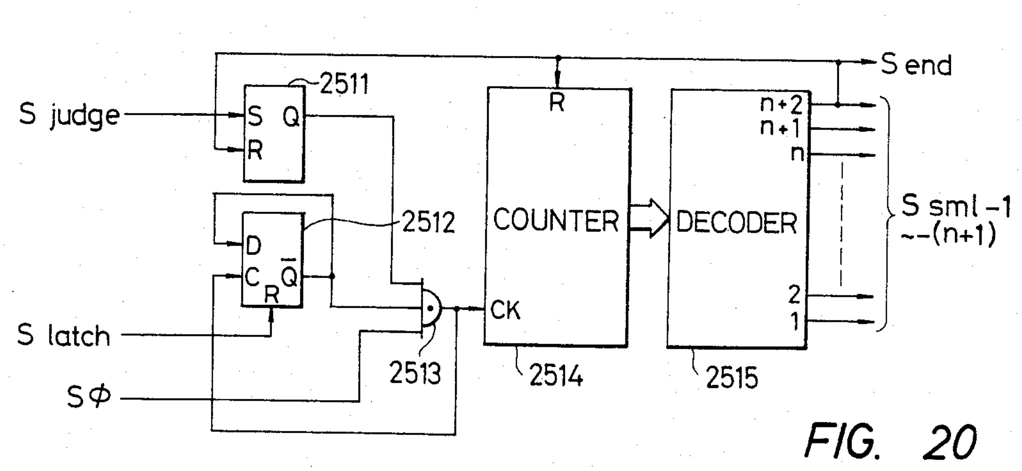
FIG. 20 is a block diagram showing the details of the resembling stage designating signal generating circuit contained in FIG. 19.

The details of the resembling stage designation signal generating circuit 2510 are shown in FIG. 20. As shown therein, the resembling stage designation signal generating circuit 2510 is comprised of: an RS filp-flop 2511 which is set by a judgement enable signal $S_{judge}$ outputted from the inputted tone pitch-based tone array forming circuit 6 and reset by an n+2 bit output of a decoder 2515 which will be described later; a D type flip-flop 2512 which is arranged so that it is forcibly reset by a latching signal $S_{latch}$ outputted from the latching signal generating circuit 2530 and which, in response to the rise of the "1" pulse of the output of an AND gate 2513 which will be described later, takes in its $\overline{Q}$ output; an AND gate 2513 which is controlled of its opening and closing by a Q output of said RS flip-flop 2511 and a $\overline{Q}$ output of said D type flip-flop 2512 and passes therethrough a clock signal $S_{\phi}$ outputted from the shift signal generating circuit 2520; a counter 2514 which counts the pulses outputted from this AND gate 2513 and is reset by an n+2 bit output of a decoder 2515 which will be described later; and said decoder 2515 which decodes the count output of said counter 2514. The respective bit outputs of this decoder 2515 serve as the resembling stage designation signals $S_{sml-1\sim-(n+1)}$, respectively.

Figure 21:
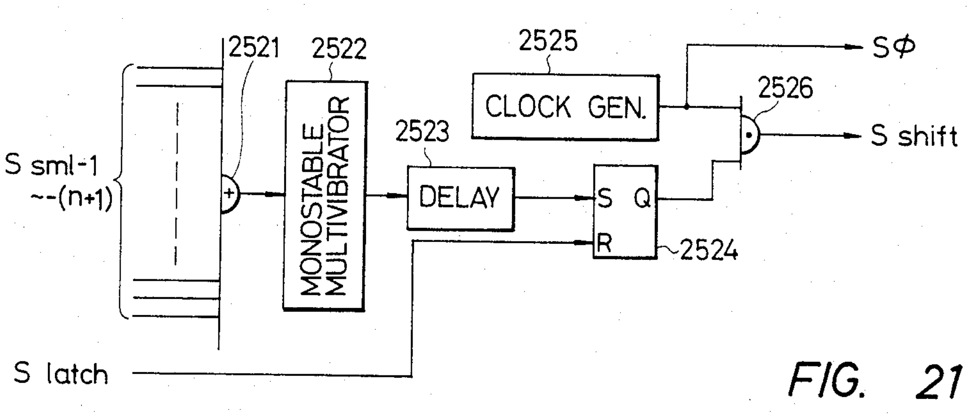
FIG. 21 is a block diagram showing the details of the shifting signal generating circuit contained in FIG. 19.

The details of the shift signal generating circuit 2520 will be shown in FIG. 21. As shown therein, the shift signal generating circuit 2520 is comprised of: an OR gate 2521 for taking a logical sum of the outputs of the respective bits of the decoder 2515 within the resembling stage designation signal generating circuit 2510; a monostable multivibrator 2522 which, in response to the rise of the "1" pulse outputted from the OR gate 2521, outputs a fine width "1" pulse; a delay circuit 2523 for delaying said fine width "1" pulse outputted from said monostable multivibrator 2522 for a fine length of time dt; an RS flip-flop 2524 which is set by the "1" pulse outputted from said delay circuit 2523 and which is reset by a latching signal $S_{latch}$ outputted from the latching signal generating circuit 2530; and an AND gate 2526 which is controlled of its opening and closing by a Q output of said RS flip-flop 2524 and which controls the opening and closing for the passage of the clock signal $S_{\phi}$ outputted from a clock generator 2525. The output of this AND gate 2526 serves as the shift signal $S_{shift}$.

Figure 22:
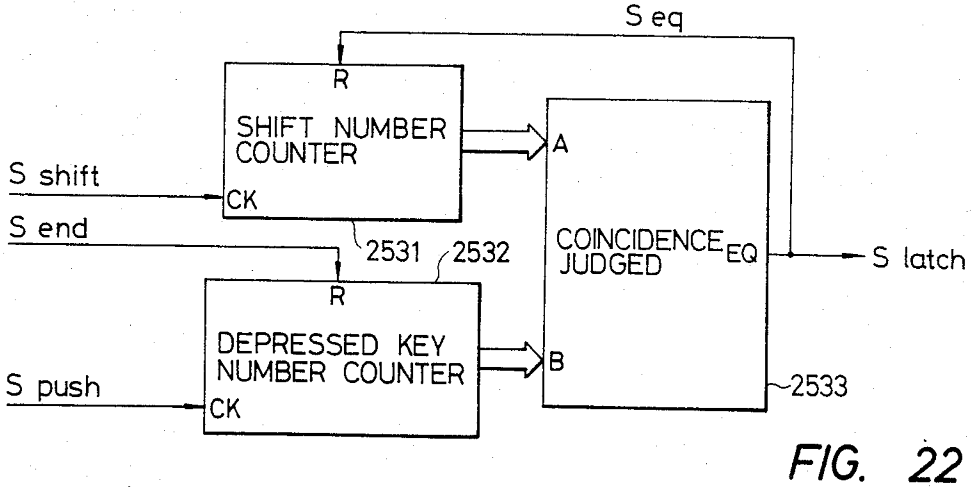
FIG. 22 is a block diagram showing the details of the latching signal generating circuit contained in FIG. 19.

The details of the latching signal generating circuit 2530 are shown in FIG. 22. As shown therein, the latching signal generating circuit 2530 is comprised of: a shift number counter 2531 which counts the shifting signals $S_{shift}$ outputted from the shifting signal generating circuit 2520 and which is reset by a coincidence output $S_{eq}$ of a coincidence judging circuit 2533 which will be described later; a depressed key number counter 2532 which counts surely depressed key signal $S_{push}$ outputted from the inputted tone pitch-based tone array forming circuit 6 and which is reset by a judgement ending signal $S_{end}$ outputted from the resembling stage designation signal generating circuit 2510; and a coincidence judging circuit 2533 for judging the coincidence between the count value of said shift number counter 2531 and the count value of said depressed key number counter 2532. A coincidence signal of this coincidence judging circuit 2533 is outputted as a latching signal $S_{latch}$.

Figure 23:
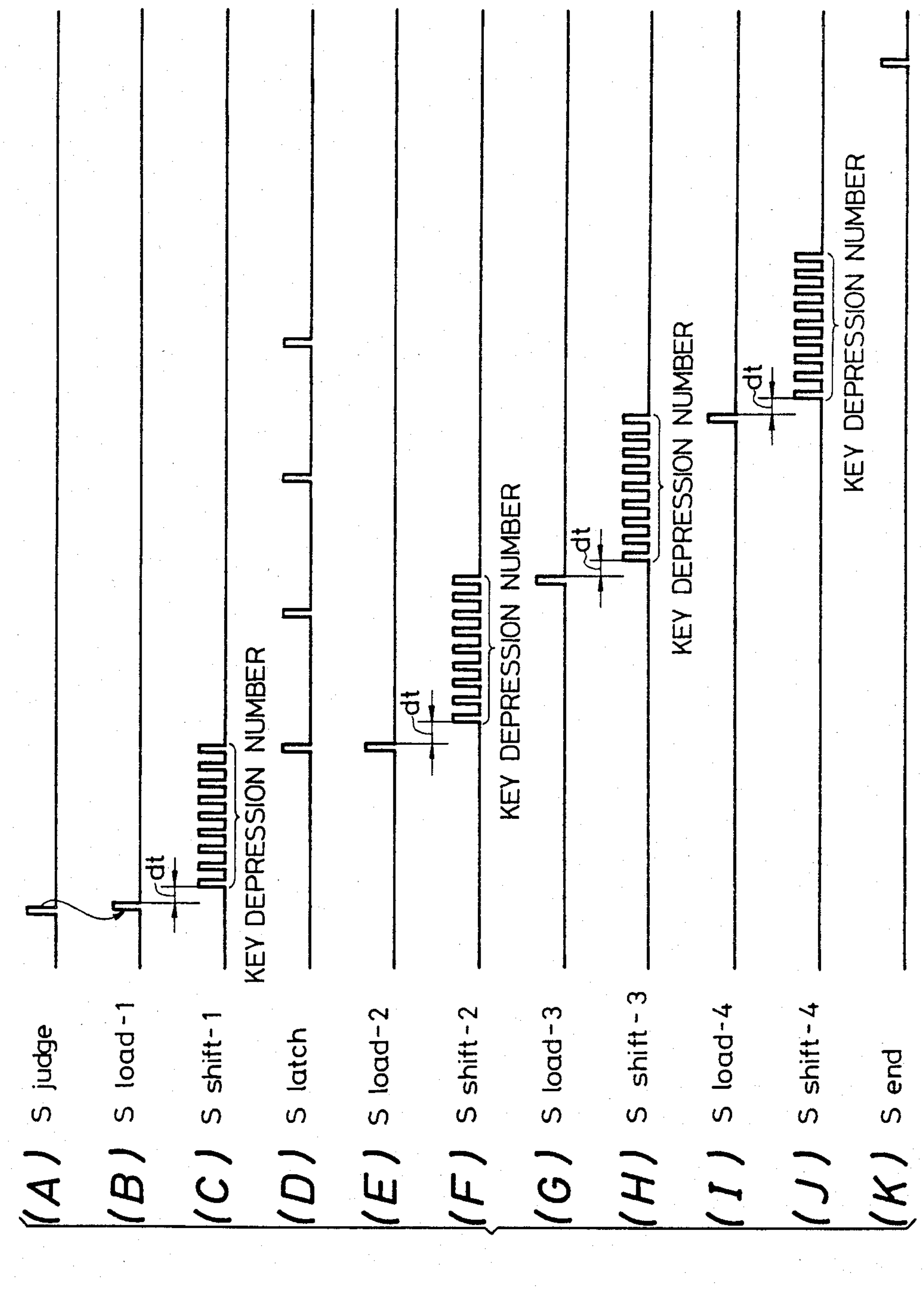
FIG. 23 is a time chart showing the state of the respective controlling signals outputted from the controlling circuit 25.

As a result, when the respective circuits which have been described above are put into action, it will be noted that, upon arrival of a "1" pulse as a judgement enable signal $S_{judge}$, there is outputted firstly a single "1" pulse serving as a loading signal $S_{load-1}$ as shown in the time chart of FIG. 23. Then, in succession thereto, with a delay by a delay time dt which is determined by the delay circuit 2523, there are outputted "1" pulses in a number corresponding to the number of key depressions to serve as a shift signal $S_{shift-1}$. Subsequently, in the same way as described above, similar pulses will be outputted as the load signals $S_{load-2\sim4}$ and the shift signals $S_{shift-2\sim4}$. When a time length necessary for the operation of a certain resemblance degree passes following a train of a predetermined number of pulses which is outputted as the final shift signal $S_{shift-4}$, there will finally be outputted a "1" pulse as a judgement end signal $S_{end}$.

It should be understood here that, in the time chart of FIG. 23, there is shown the instance wherein n=3 in FIG. 19.

Next, the details of the respective circuits shown in FIG. 1 will be explained in accordance with the flow of respective data processing, while giving reference to the respective controlling signals described above.

Figure 2:
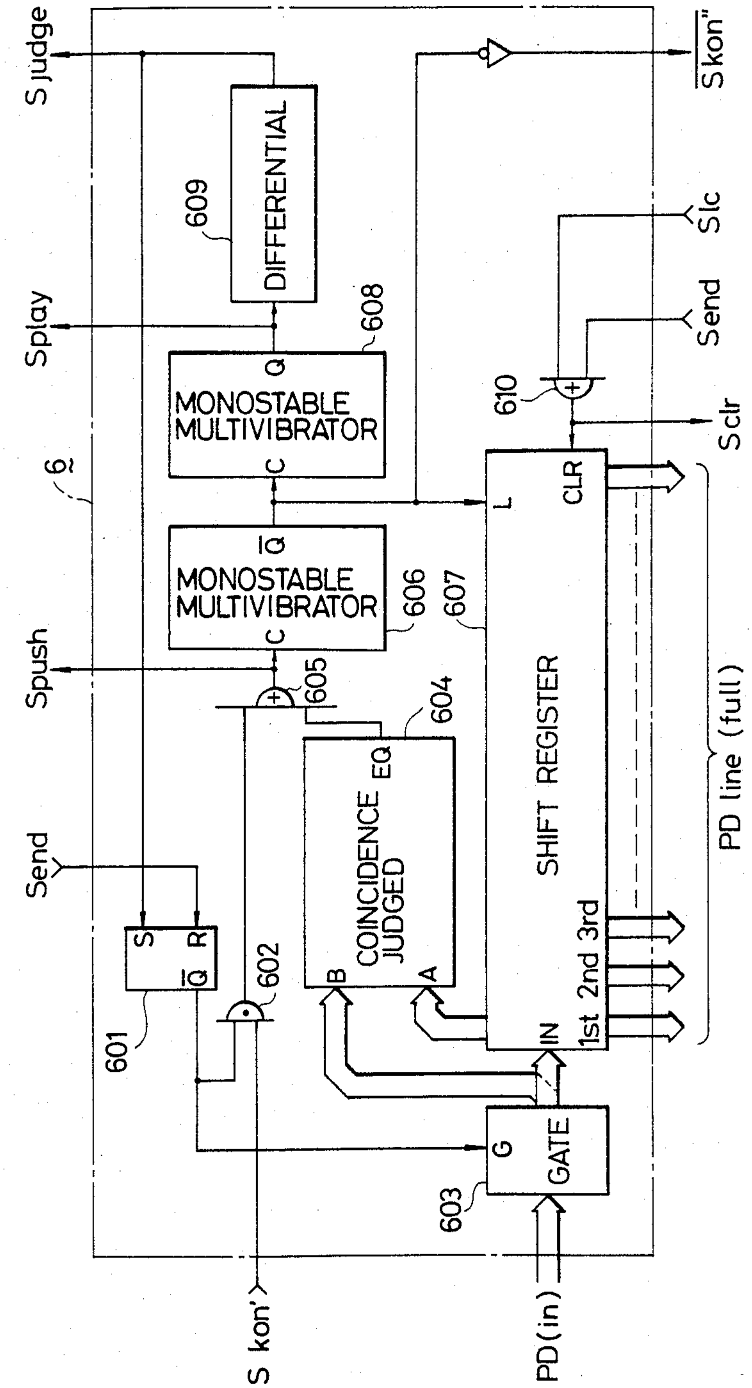
FIG. 2 is a block diagram showing the details of the circuit of FIG. 1A for forming the inputted tone pitch-based tone array.

To begin with, the details of the inputted tone pitch-based tone array forming circuit 6 are shown in FIG. 2. In FIG. 2, an RS flip-flop 601 is set by a fine width "1" pulse outputted from a differentiating circuit 609 which will be described later, and is reset by a judgement end signal $S_{end}$ outputted from said controlling circuit 25.

An AND gate 602 is controlled of its opening and closing by a $\overline{Q}$ output of said RS flip-flop 601 to pass therethrough a key depression timing signal $S_{kon}$, which is outputted from the depressed key detecting circuit 5.

A gate circuit 603 is controlled of its opening and closing by a $\overline{Q}$ output of the RS flip-flop 601, and whereby passes therethrough an inputted tone pitch data $PD_{(in)}$ outputted from the depressed key detecting circuit 5 as the gate circuit 602 is opened.

A coincidence judging circuit 604 judges the coincidence between an inputted tone pitch data $PD_{(in)}$ which is stored in the first stage of a shift register 607 which will be described later and an inputted tone pitch data $PD_{(in)}$ outputted from the gate circuit 603. When the coincidence between these two data is judged, a "1" pulse is outputted at its EQ output terminal.

An OR gate 605 is intended to take a logical sum of an output of said AND gate 602 and an output of said coincidence judging circuit 604. The output of this OR gate 605 serves as said surely depressed key signal $S_{push}$.

A monostable multivibrator 606 is assigned to respond to the rise of "1" pulse which is outputted from the OR gate 605 to thereby output a fine width "1" pulse. The output of this monostable multivibrator 606 represents a signal which is an inversion of a tone pitch data take-in signal $S_{kon''}$.

A shift register 607 is arranged so that, in response to the data take-in signal $S_{kon''}$ outputted from said monostable multivibrator 606, it takes-in the inputted tone pitch data which has passed through the gate circuit 603 into its first stage, and shifts the respective stages toward the right side as viewed in the figure one after another successively.

A monostable multivibrator 608 is arranged so that, in response to the rise of a "1" pulse of said monostable multivibrator 606, it is able to be repetitively triggered, and also that, at each time it is triggered, it outputs a relatively lengthy "1" pulse (for example, 2.5 seconds). The output of this monostable multivibrator 608 serves as a playing signal $S_{play}$.

A differentiating circuit 609 is arranged so that, in response to the rise of a "1" pulse of the output of the monostable multivibrator 608, it outputs a fine width "1" pulse. This output of the differentiating circuit 609 serves as a judgement enable signal $S_{judge}$.

An OR gate 610 is intended to take a logical sum of a judgement end signal $S_{end}$ and an initial clear signal $S_{ic}$. By the output of this OR gate 610, the respective stages of said shift register 607 are cleared entirely, and along therewith the output of this OR gate 610 is outputted as a clear signal $S_{clr}$.

Figure 26:
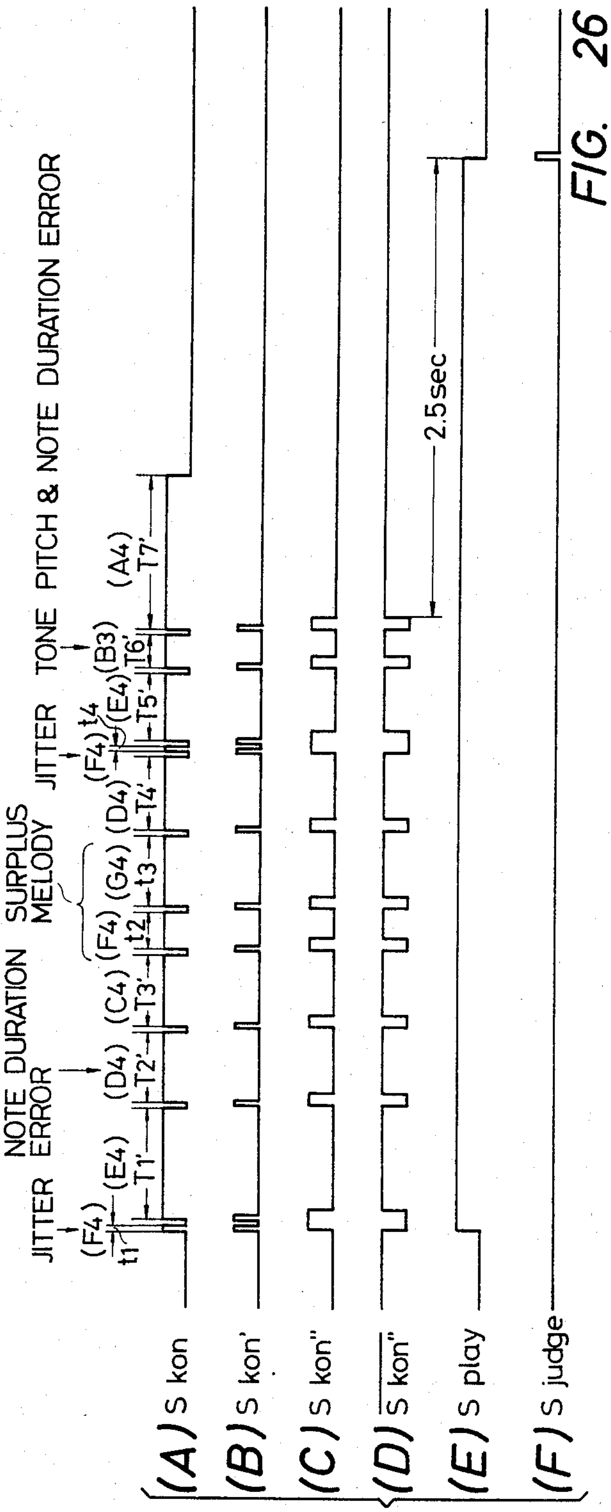
FIG. 26 is a time chart showing the state of various kinds of timing signals corresponding to the inputted melody.
Figure 27:
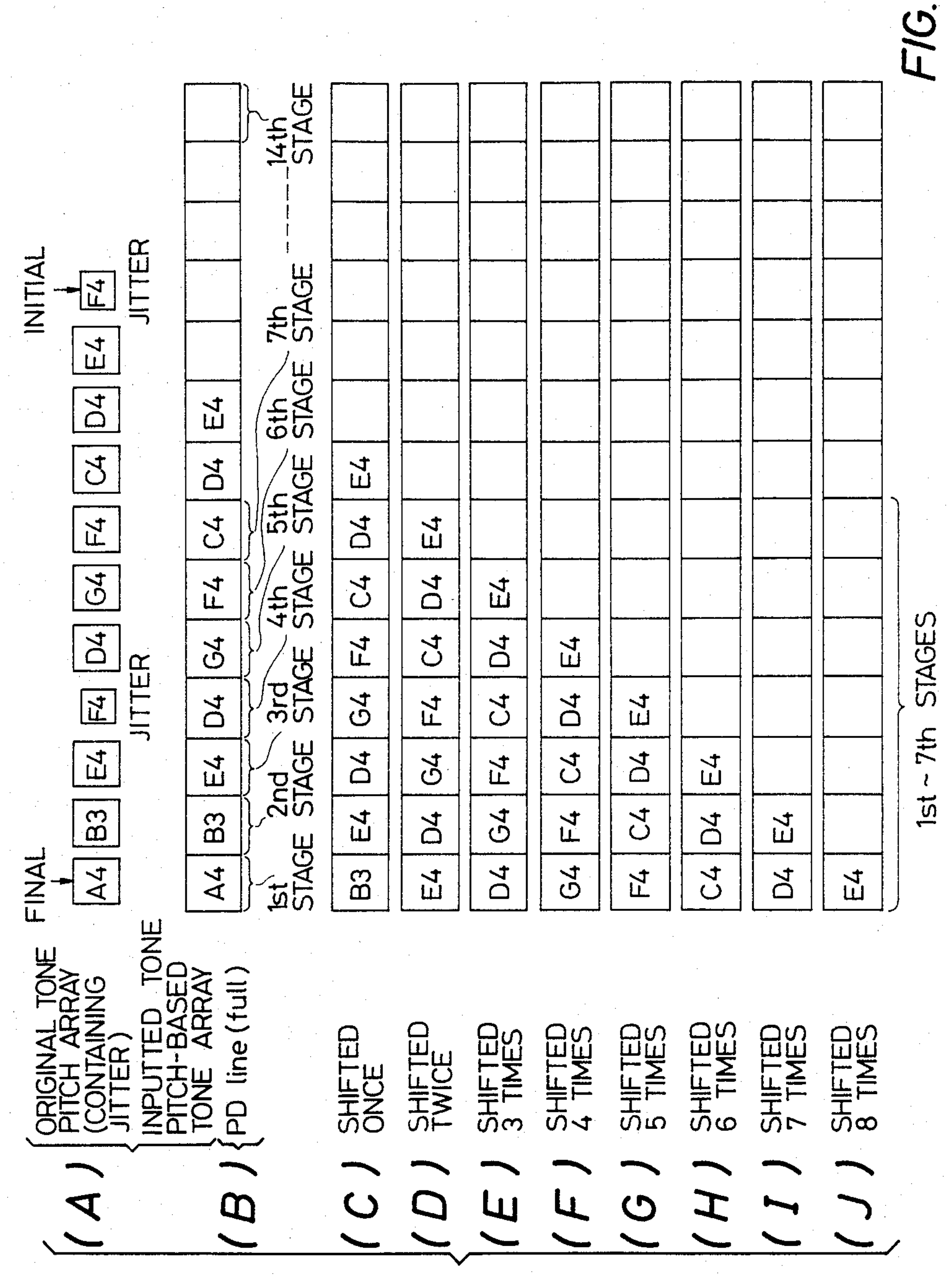
FIG. 27 to FIG. 30 are explanatory illustrations showing the details of the tone array data processing which is performed in the inputted tone pitch-based tone array forming circuit and the resembling tone pitch-based tone array extracting circuit.

As a result, when the respective circuits described above are actuated, the monostable multivibrator 606 is repetitively triggered by the rise of the key depression signal $S_{push}$ which is outputted from the OR gate 605. Also, the shift register 607 takes in the inputted tone pitch data which is outputted from the gate circuit 603 in response to the rise of the data take-in signal $S_{kon''}$ outputted from the monostable multivibrator 606 as shown in the time chart in FIG. 26, and accordingly as shown at FIG. 26(A) and FIG. 27(A), in case there is present an erroneous tone pitch data among the inputted original tone pitch data, these inputted tone pitch data are not taken into the shift register 607. And, as shown in FIG. 27(B), in the respective stages of the shift register 607, the erroneous inputted tone pitch data are removed, and only those tone pitch data corresponding to the note durations having sufficient time lengths to be able to serve as music elements are taken in. And, those tone pitch data which have been taken into the respective stages are outputted in parallel respectively, and these parallel outputs constitute inputted tone pitch-based tone array data $PD_{line(full)}$.

Figure 3:
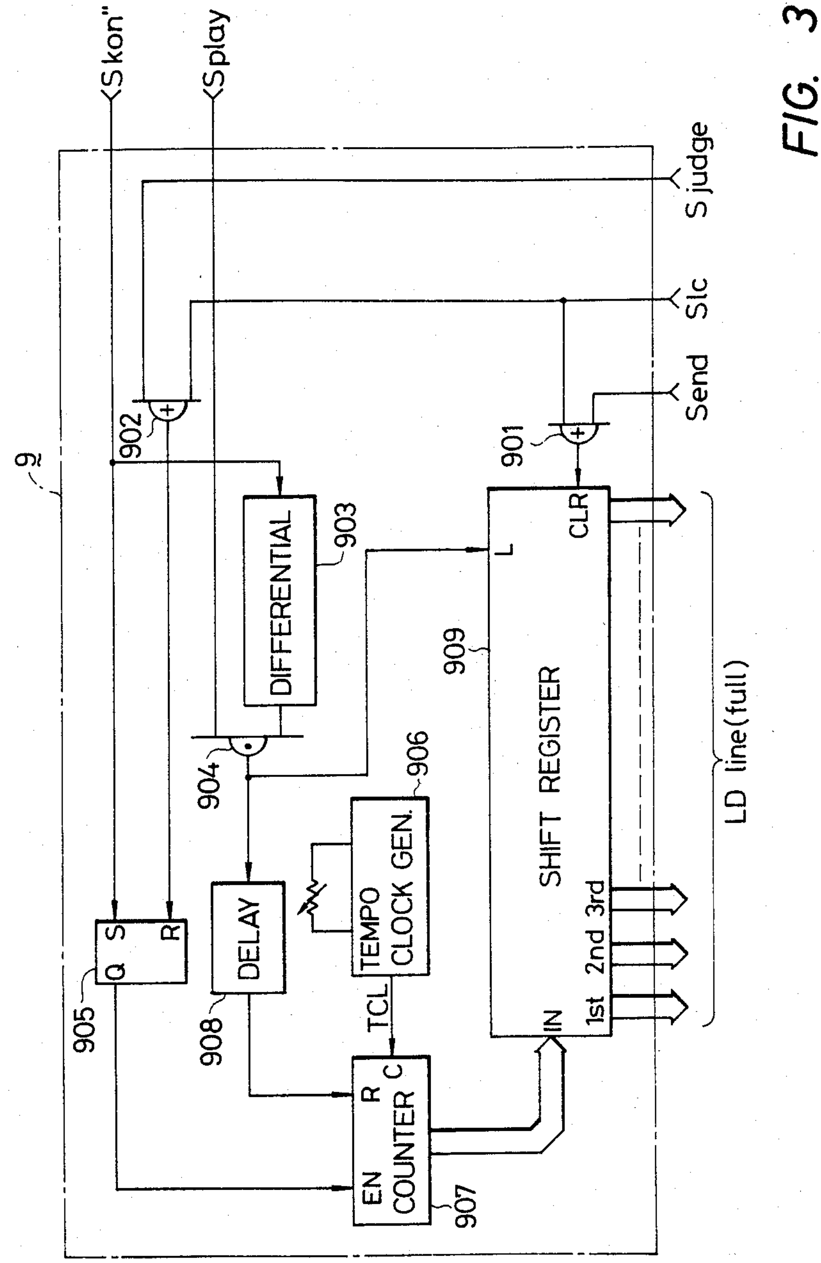
FIG. 3 is a block diagram showing the details of the circuit contained in FIG. 1A for forming the inputted note duration-based tone array.

Next, the details of the inputted note duration-based tone array forming circuit 9 are shown in FIG. 3. In this figure, an OR gate 901 outputs a logical sum of a judgment end signal $S_{end}$ and an initial clear signal $S_{ic}$.

An OR gate 902 outputs a logical sum of an initial clear signal $S_{ic}$ and a judgment enable signal $S_{judge}$.

A differentiating circuit 903 responds to the rise of a data take-in signal $S_{kon''}$ outputted from the tone pitch-based tone array forming circuit 6, to output a fine width "1" pulse.

An AND gate 904 is controlled of its opening and closing by a playing signal $S_{play}$, and passes therethrough a fine width "1" pulse which is outputted from the differentiating circuit 903.

An RS flip-flop 905 is set by the rise of a data take-in signal $S_{kon''}$ and is reset by an output of said OR gate 902.

A tempo clock generator 906 outputs tempo clocks of a predetermined cycle (for example, 100 ms, 500 μs). In this embodiment, arrangement is provided so that the frequency is controlled to be variable.

A counter 907 is enabled by a Q output of the RS flip-flop 905, and counts the tempo clocks TCL outputted from the tempo clock generator 906. Furthermore, it is reset repetitively by a fine width "1" pulse of the AND gate 904 delayed by a delay circuit 908.

A shift register 908 is constructed so that it is controlled of its shifting by a fine width "1" pulse outputted from the AND gate 904, and takes in, into the first stage, the count output of said counter 907 as a note duration data. Also, this shift register 908 is cleared by an output of the OR gate 901.

As a result, when the respective circuits described above are put to action, note durations corresponding to those tone pitch data stored in the respective stages of the shift register 607 provided in the inputted tone pitch-based tone array forming circuit 6 will become taken in successively into the respective stages of said shift register 909 as shown in FIG. 31(B). The parallel output data of these respective stages serve as the inputted note duration-based tone array data $LD_{line(full)}$.

Figure 4:
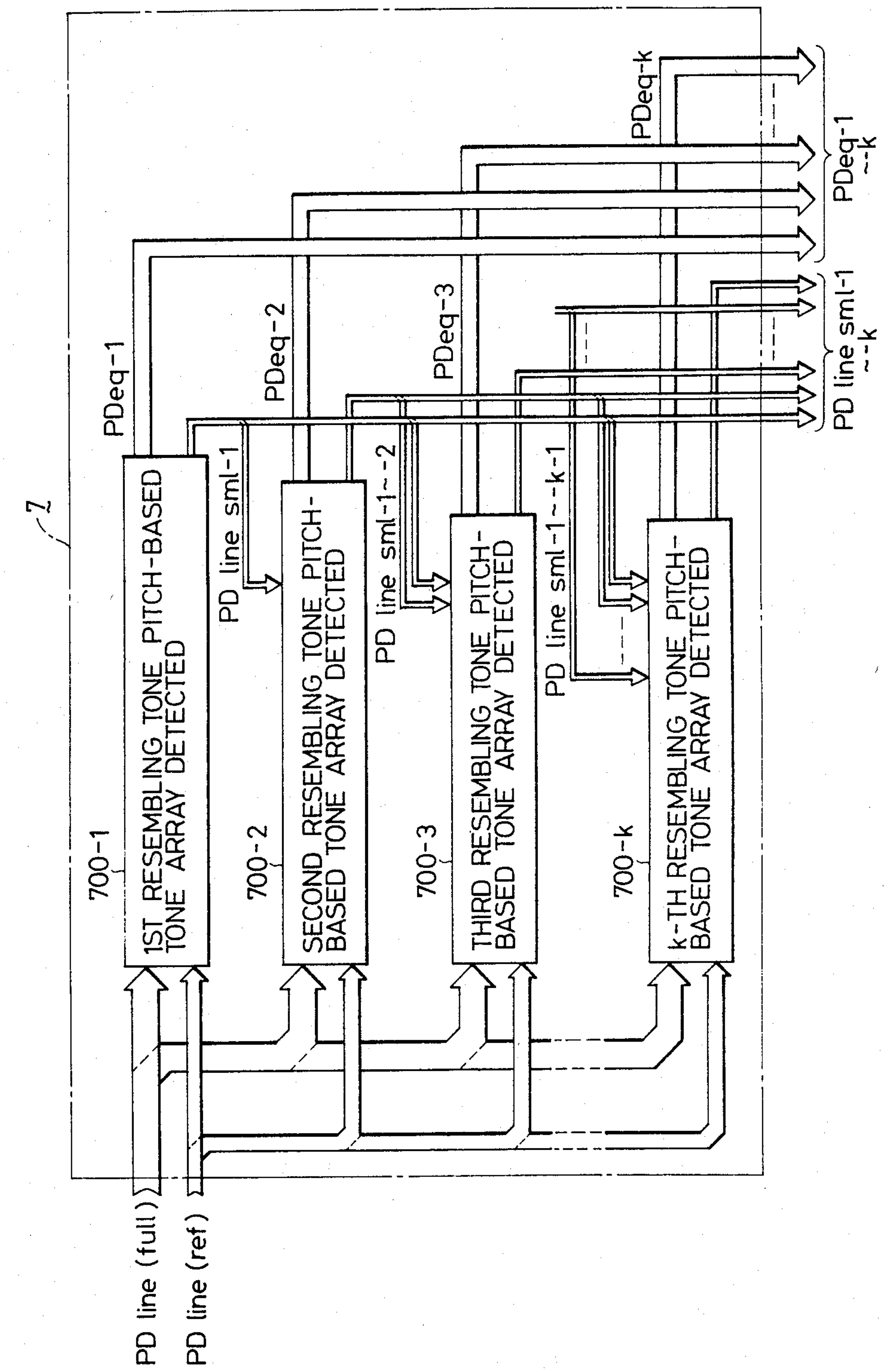
FIG. 4 is a block diagram showing the details of the circuit contained in FIG. 1A for extracting the resembling tone pitch-based tone array.

Next, the details of the resembling tone pitch-based tone array extracting circuit 7 are shown in FIG. 4. As shown in this figure, the resembling tone pitch-based tone array extracting circuit 7 is comprised of resembling tone pitch-based tone array detecting circuits 700-1∼-700-k which are provided k in number from the first to the k-th, so that inputted tone pitch-based tone array data $PD_{line(full)}$ and reference tone pitch-based tone array data $PD_{line(ref)}$ are supplied, in parallel, thereto.

The first to the k-th resembling tone pitch-based tone array detecting circuits 700-1∼-k are operative so that, as stated earlier, in case resemblance degree is judged between those data which are present at same timewise locations of adjacently provided two arrays as they are shifted of their positions progressively one after another relative to each other arrays in such manner as if two trains pass each other, these circuits detect those resembling tone pitch-based tone array data portions in the first, second, . . . k-th locations. These detected resembling tone pitch-based tone array portions are outputted, as shown in FIGS. 27(C)–(J), as a first to the k-th resembling tone pitch-based tone array portions data $PD_{line\ sml\text{-}1\sim\text{-}k}$, respectively, which are indicative of the number of shifts for the inputted tone pitch-based tone array data.

Also, from the respective resembling tone pitch-based tone array detecting circuits 700-1∼700-k are outputted coincidental tone pitch counts data showing the number of those tones contained among the detected respective resembling tone pitch-based tone array portions data $PD_{line\ sml\text{-}1\sim\text{-}k}$ which are in agreement with the reference tone pitch-based tone array data.

Figure 5A:
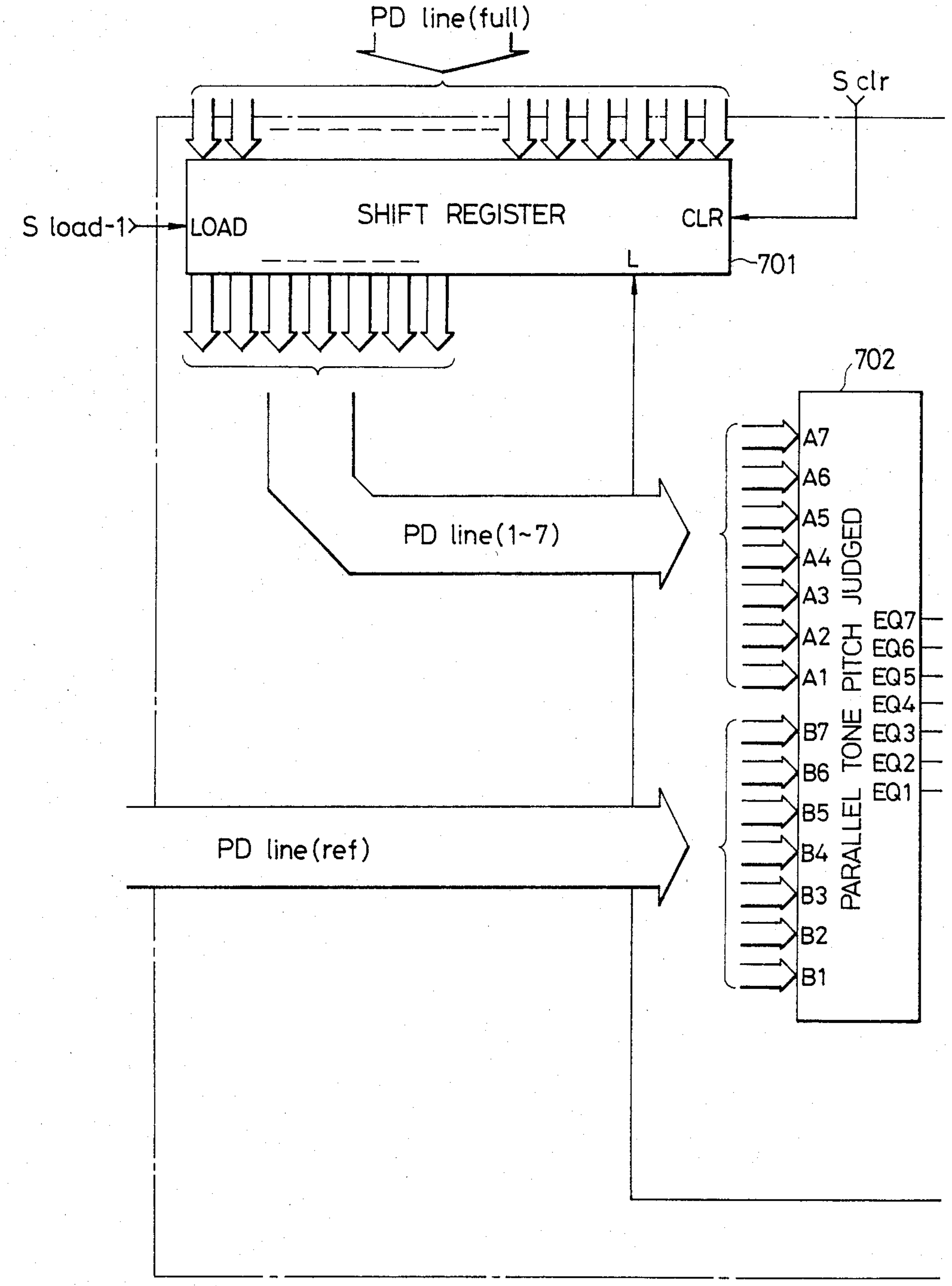
FIGS. 5A and 5B, in combination, are a block diagram showing the details of the circuit contained in FIG. 4 for detecting the initial resembling tone pitch-based tone array.
Figure 5B:
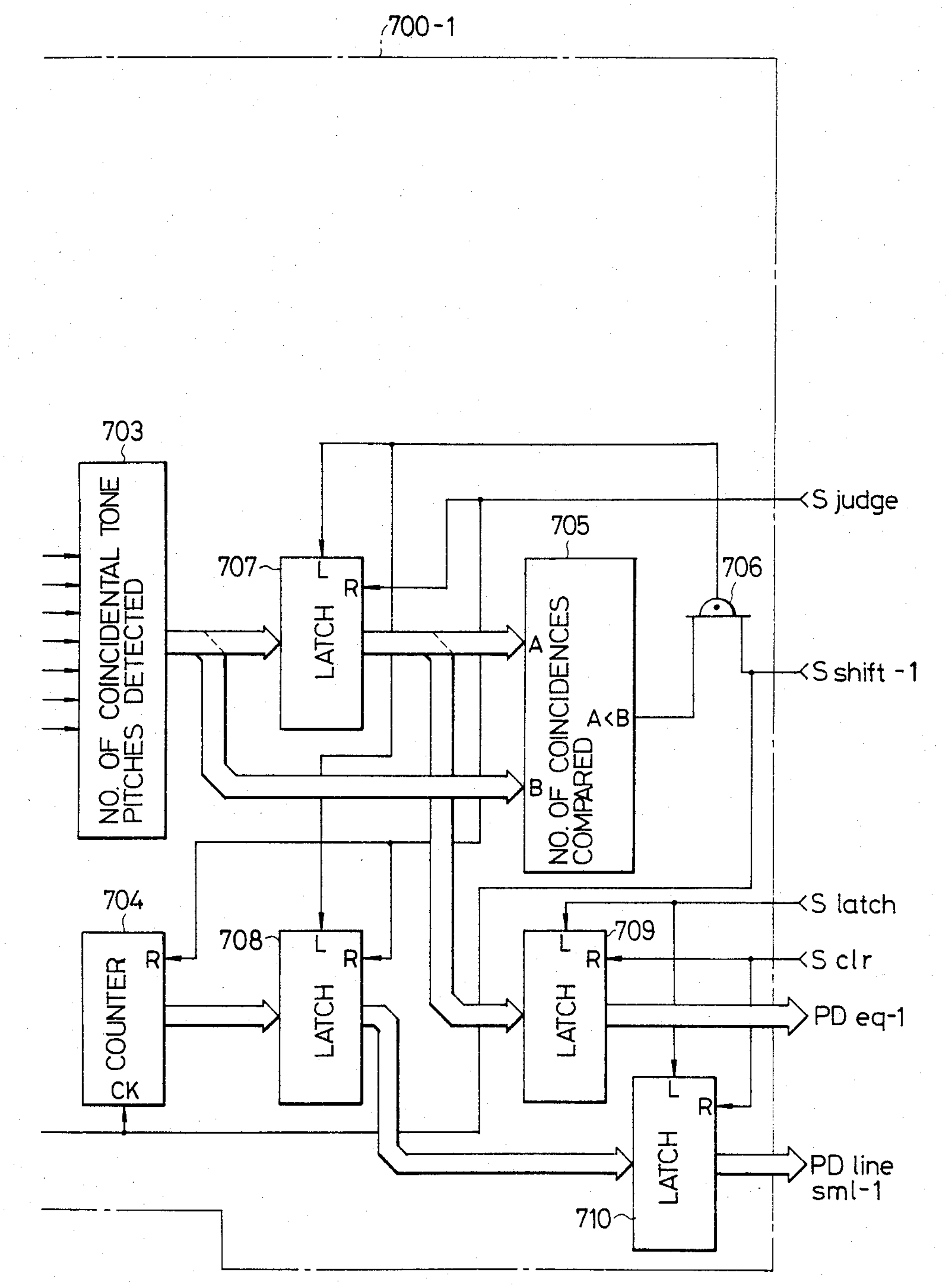

Next, the details of the first resembling tone pitch-based tone array detecting circuit 700-1 are shown in FIG. 5. In this figure, a shift register 701, in response to the rise of a loading signal $S_{load\text{-}1}$, loads an inputted tone pitch-based tone array data $PD_{line(full)}$ outputted from the inputted tone pitch-based tone array forming circuit 6. Also, this circuit is controlled of its shifting toward the left side as viewed in the figure in response to the "1" pulse which is contained in a shifting signal $S_{shift\text{-}1}$ and the contents in all its stages are simultaneously cleared by a clear signal $S_{clr}$.

A parallel tone pitch coincidence judging circuit 702 performs judgement of coincidence, for each stage, between the tone pitch-based tone array portions data $PD_{line(1\text{-}7)}$ outputted in parallel from the first to the 7th stages of the shift register 701, and the reference tone pitch-based tone array data $PD_{line(ref)}$ outputted from the reference tone pitch-based tone array generating circuit 1, and outputs a "1" signal and a "0" signal corresponding to each result of judgement, to terminals $EQ_1$–$EQ_7$.

A tone pitch coincidence detecting circuit 703, based on the respective coincidence outputs $EQ_1$–$EQ_7$ of the parallel tone pitch coincidence judging circuit 702, detects the number of coincidences, and outputs corresponding tone pitch coincidence number data.

A counter 704 is reset by a judgement enable signal $S_{judge}$, and counts the occurrences of "1" pulses contained in the shifting signal $S_{shift}$, and whereby outputs a shift times data.

A coincidence counts comparing circuit 705 compares the magnitude of the tone pitch coincidence count data latched in a latching circuit 707 which will be described later with the magnitude of the tone pitch coincidence count data outputted from the tone pitch coincidence occurrence detecting circuit 703, and only when the tone pitch coincidence count data outputted from the tone pitch coincidence occurrence detecting circuit 703 is greater than the tone pitch coincidence count data latched in the latching circuit 707, the comparing circuit 705 outputs a "1" pulse.

An AND gate 706 is controlled of its opening and closing by an output of the coincidence count comparing circuit 705, and whereby it passes a shifting signal $S_{shift\text{-}1}$ therethrough.

A latching circuit 707 is reset by a judgement enable signal $S_{judge}$, and in the response to a "1" pulse outputted from the AND gate 706, it latches the tone pitch coincidence count data outputted from the tone pitch coincidence occurrence detecting circuit 703.

A latching circuit 708 is reset by a judgement enable signal $S_{judge}$ as in the case of the latching circuit 707, and latches the shift times data outputted from the counter 704 for each arrival of the "1" pulse from the AND gate 706.

A latching circuit 709 is reset by a clearing signal $S_{clr}$ and, at each arrival of a "1" pulse while the latching signal $S_{latch}$ is being applied, it latches the tone pitch coincidence count data which has been latched in said latching circuit 707.

A latching circuit 710, similarly, is reset by a clearing signal $S_{clr}$, and at each arrival of a "1" pulse while the latching signal $S_{latch}$ is being applied, it latches the shift number data which has been latched in said latching circuit 708.

And, the output of the latching circuit 709 will serve as a coincidence tone pitch count data $PD_{eq\text{-}1}$, and the output of the latching circuit 710 will serve as a shift number data $PD_{line\ sml\text{-}1}$.

As a result, when the respective circuits described above are actuated normally, in the shift register 701, there is performed shift-controlling successively as shown in FIGS. 27(B)–(J). And, in the parallel tone pitch coincidence judging circuit 702, there is carried out judgement of coincidence between the data $PD_{line(ref)}$ and the data $PD_{line(1\text{-}7)}$ as shown in FIGS. 28(A)–(I).

Figure 28:
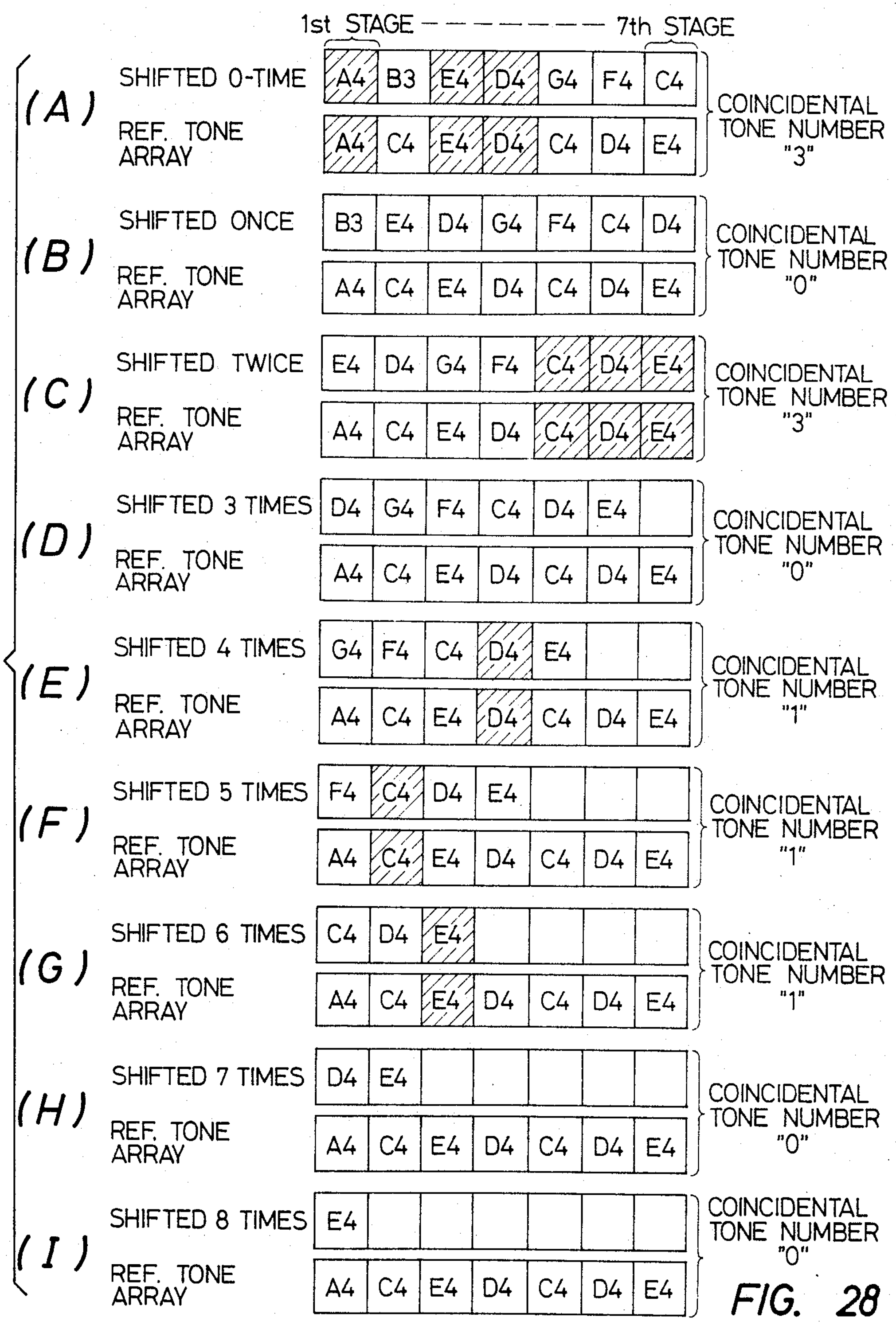

And, in the embodiment of FIG. 28, tone pitch-based tone array portions data $PD_{line(1\text{-}7)}$ corresponding to 0-time shifting are detected as the most resembling tone pitch-based tone array portions data. As a result, the content of the data $PD_{line\ sml\text{-}1}$ which is outputted from the latching circuit 710 will become '0', and also the content of the data $PD_{eq\text{-}1}$ will become '3'.

Figure 6A:
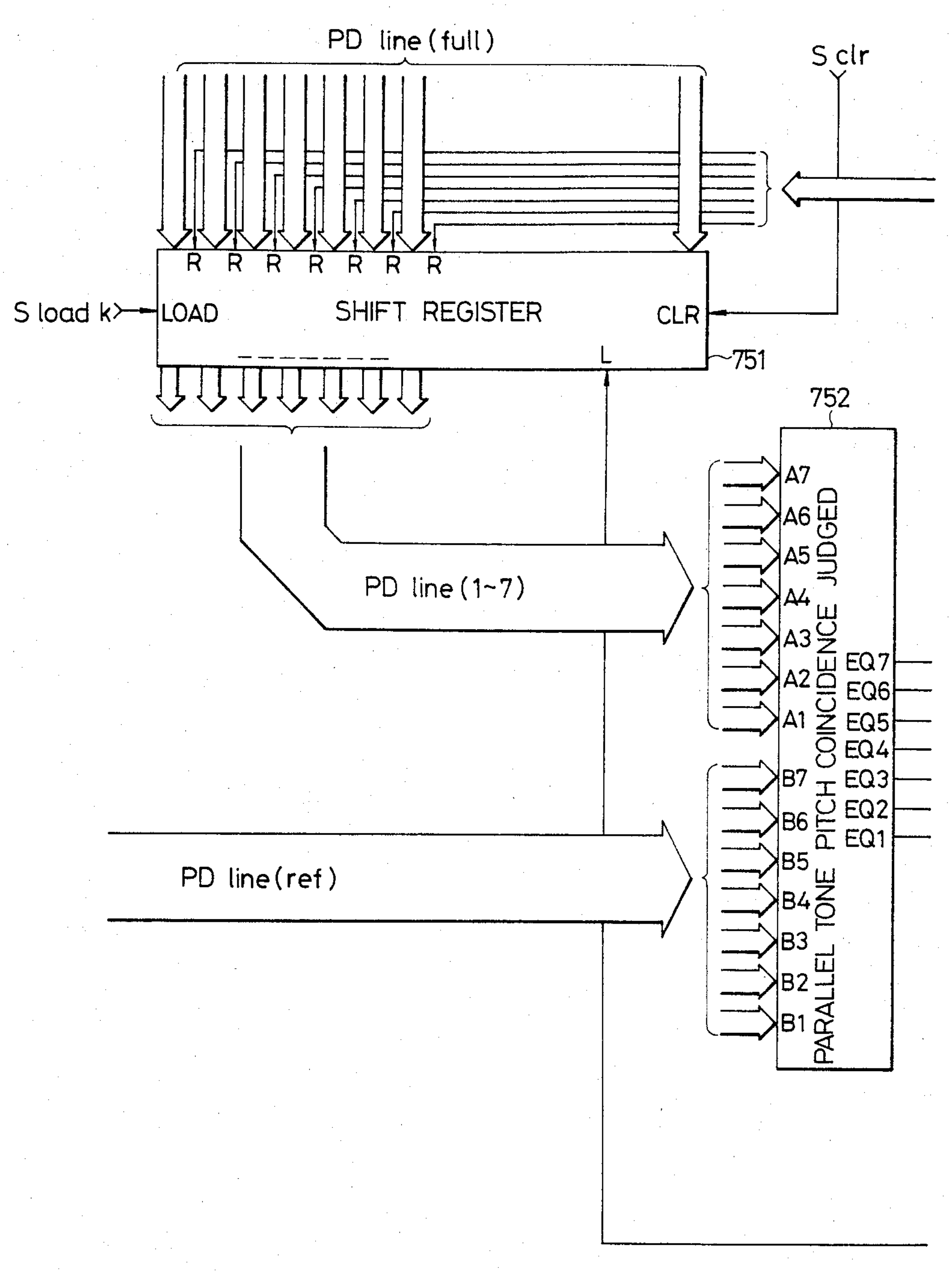
FIGS. 6A and 6B, in combination, are a block diagram showing the details of the circuit contained in FIG. 4 for detecting the k-th resembling tone pitch-based tone array.
Figure 6B:
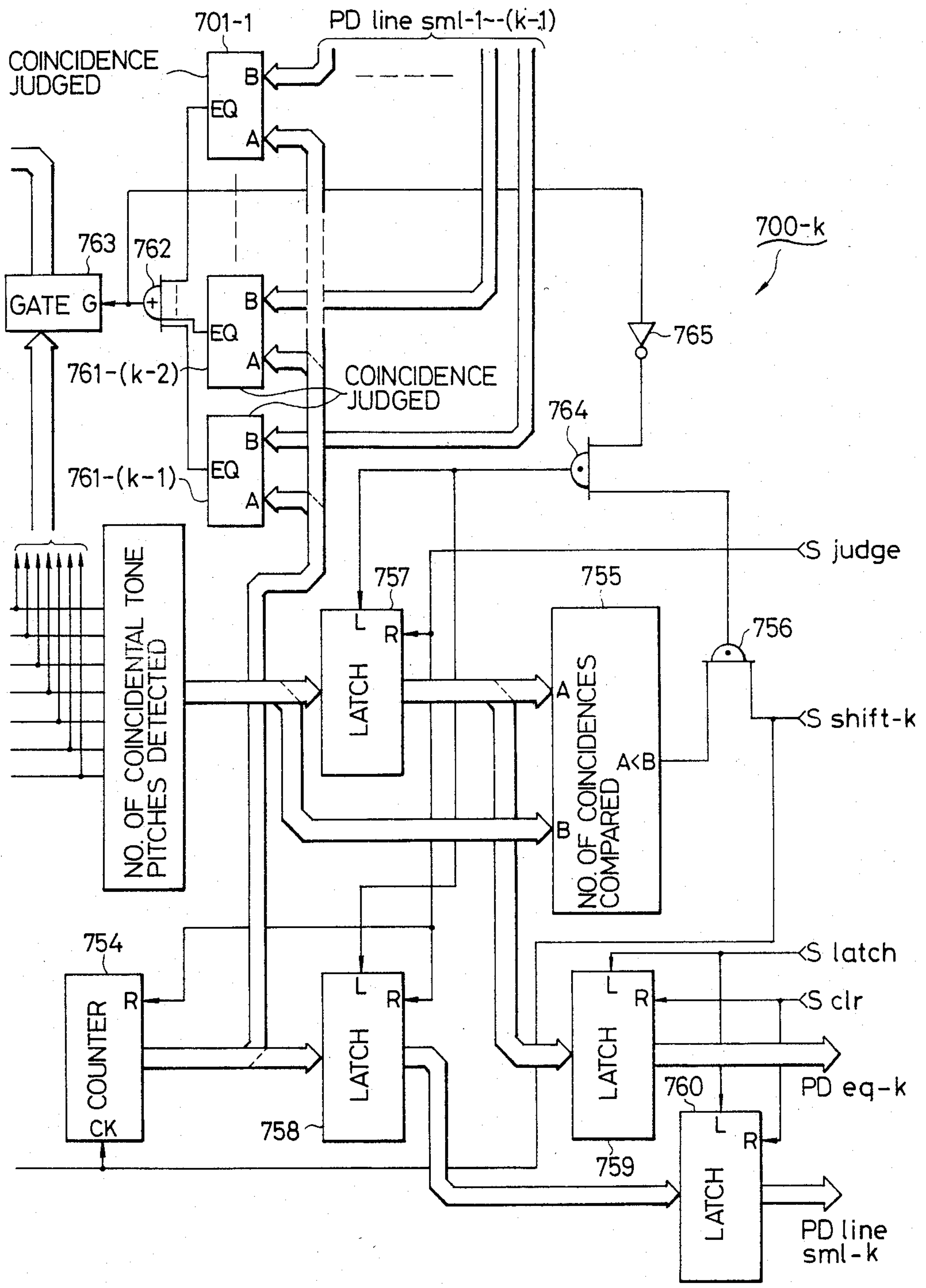

Next, the details of the k-th resembling tone pitch-based tone array detecting circuit 700-k are shown in FIG. 6. In this figure, a shift register 751, in response to a loading signal $S_{load\text{-}k}$, loads an inputted tone pitch-based tone array data $PD_{line(full)}$, and along therewith, in response to a "1" pulse contained in the shifting signal $S_{shift\text{-}k}$, it is controlled of its shifting, and furthermore the contents of its whole stages are cleared simultaneously by a clearing signal $S_{clr}$. Also, arrangement is provided so that the respective data in the first to the 7th stages of the shift register 751 can be reset independently of each other.

Next, the respective actions of a parallel tone pitch coincidence judging circuit 752, a tone pitch coincidence count detecting circuit 753, a coincidence count comparing circuit 755, and AND gate 756, a counter 754, a latching circuit 759, and a latching circuit 760 are altogether the same as those of the corresponding circuits in the above-stated first resembling tone pitch-based tone array detecting circuit 700-1, and therefore, their description is omitted here.

Coincidence judging circuits 761-1∼761-(k−1) are intended to judge the coincidence between the shift number data outputted from the counter 754 and the shift number data $PD_{line\ sml\text{-}1} \sim PD_{line\ sml\text{-}(k-1)}$ supplied from the resembling tone pitch-based tone array detecting circuits 700-1∼700-(k−1) in the preceding stage, respectively, and they output a "1" pulse, respectively, only when coincidence between these two data is judged.

An OR gate 762 outputs a logical sum of the outputs of the respective coincidence judging circuits 761-1∼761-(k−1).

A gating circuit 763 is controlled of its opening and closing by an output from said OR gate 762, and whereby supplies the respective coincidence outputs of the parallel tone pitch coincidence judging circuit 752 to the first to the 7th stage reset terminals of the shift register 751.

And, AND gate 764 is controlled of its opening and closing by an output of the OR gate 762 which has been inverted by an inverter 765, and whereby inhibits the outputting of the AND gate 756.

A latching circuit 757 is reset by a judgement enable signal $S_{judge}$, and in response to a "1" pulse which passes through the AND gate 764, latches a tone pitch coincidence count data outputted from the tone pitch coincidence count detecting circuit 753.

A latching circuit 758 is reset similarly by a judgement enable signal $S_{judge}$, and also, in response to a "1" pulse having passed through the AND gate 764, latches a shift number data outputted from the counter 754.

As a result, when the above-stated respective circuits are put to action, those inputted tone pitch data stored in the respective stages of the shift register 751 are shifted successively to the left side as viewed in FIGS. 27(B)-(J) in response to the "1" pulses of the shifting signals $S_{shift\text{-}k}$. At the same time therewith, in the parallel tone pitch coincidence judging circuit 752, as shown in FIGS. 29 and 30, there is performed coincidence judgement processing between the tone pitch-based tone array portions data and the reference tone pitch-based tone array data for each shifting time.

Figure 29:
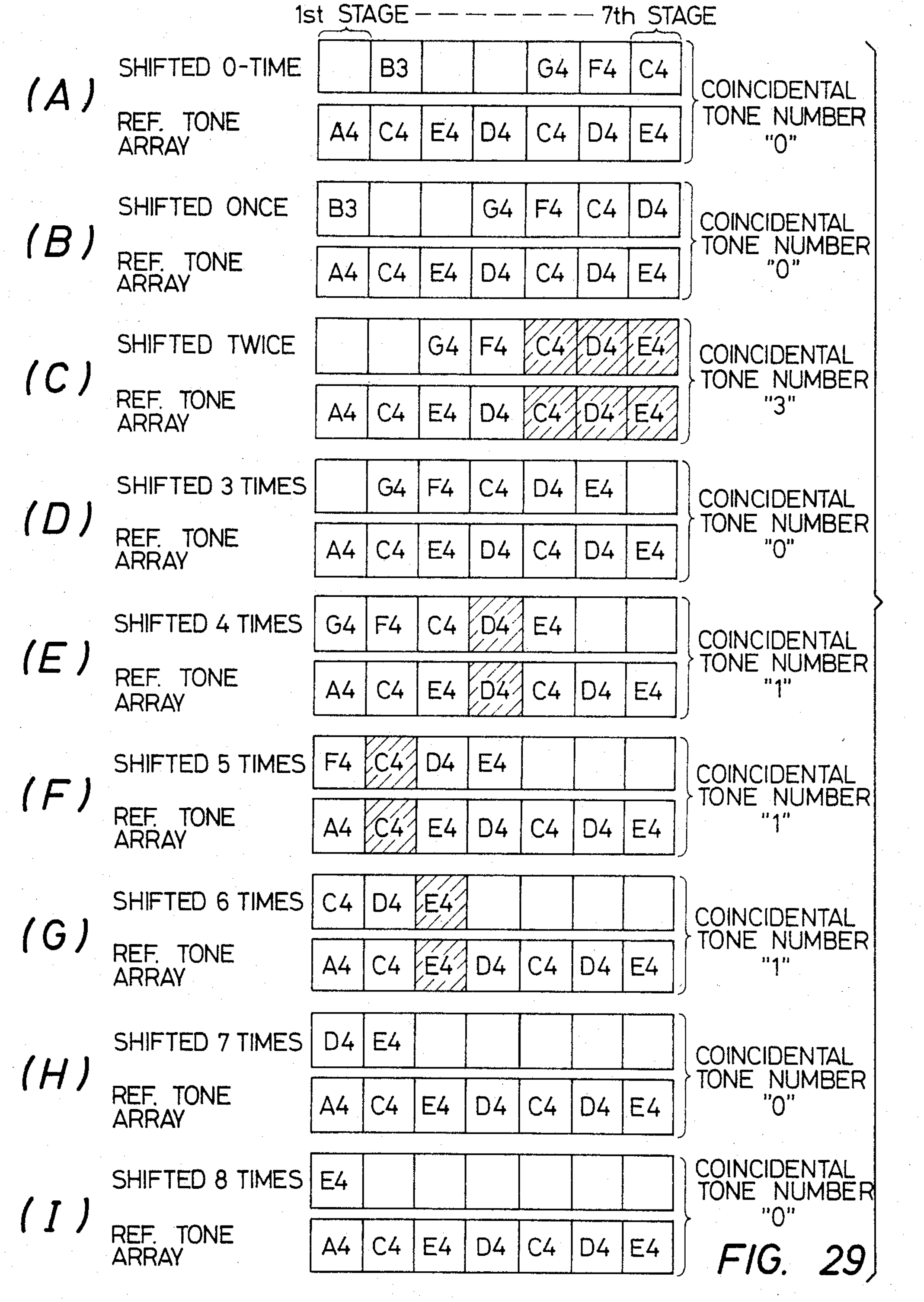
Figure 30:
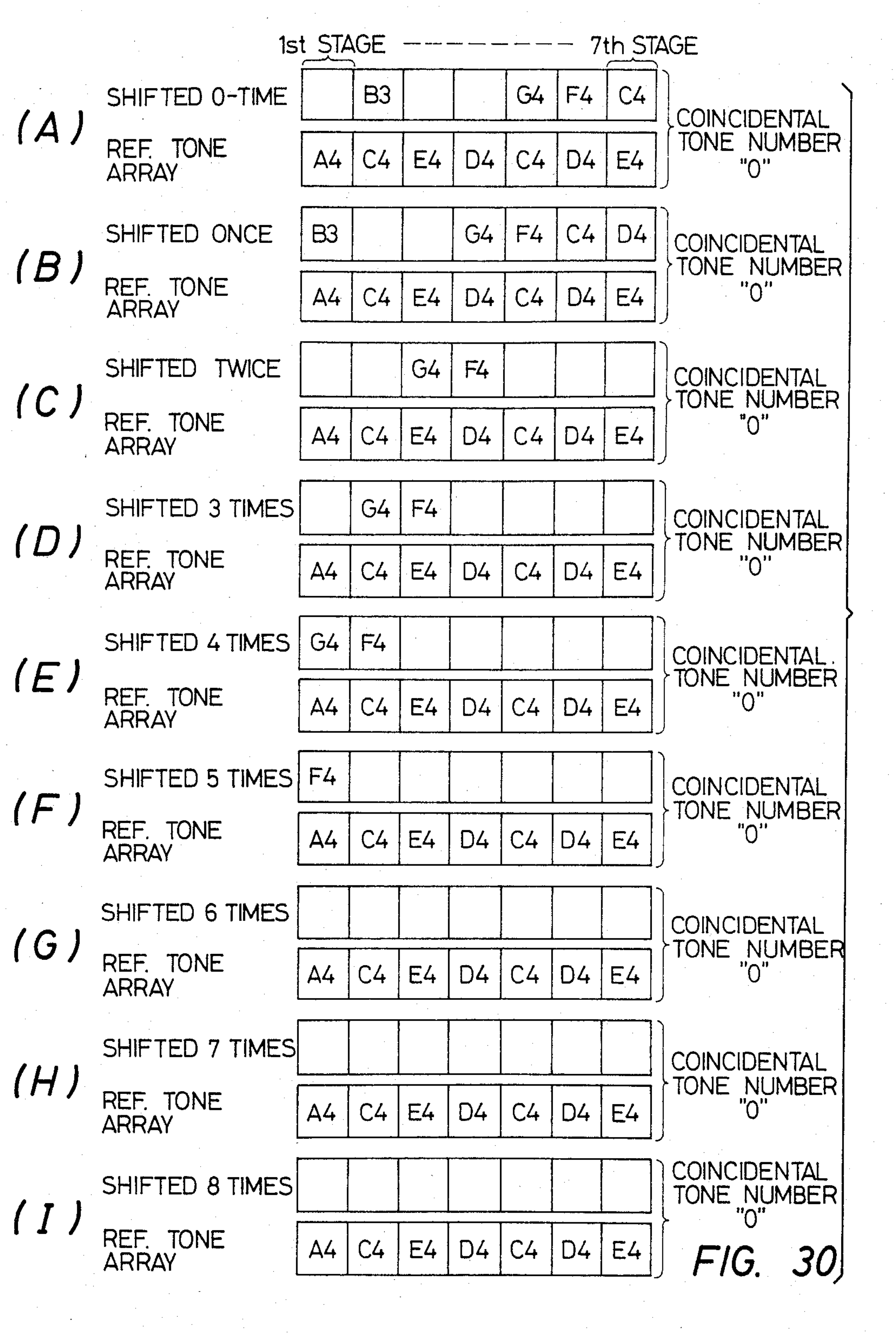

Here, FIGS. 28, 29 and 30 show the actions of the respective parallel tone pitch coincidence judging circuits 702 and 752 in the first, second and third resembling tone pitch-based tone array detecting circuits 700-1, 700-2 and 700-3.

As will be clear from these figures, in the respective parallel tone pitch coincidence judging circuits 752 in the second ~ k-th resembling tone pitch-based tone array detecting circuits, when the shift timing of the resembling tone pitch-based tone array portions data $PD_{line(1\text{-}7)}$ which have been already detected in the resembling tone pitch-based tone array detecting circuit in the preceding stage arrives, they are reset (meaning that they are deleted) individually by an output of the gating circuit 763 for those portions which are contained in these data and which are coincidental with the reference tone pitch-based tone array data $PD_{line(ref)}$.

Whereby, those coincidental portions which are contained in the already detected resembling tone pitch-based tone array portions data and which are coincidental with the reference tone pitch-based tone array data will not become recognized again in doubled fashion over another resembling tone pitch-based tone array portions data.

Also, upon respective arrival of the shift timing of the resembling tone pitch-based tone array portions data which have already been detected in the respective resembling tone pitch-based tone array detecting circuits in the preceding stage, the AND gate is inhibited by an output of the OR gate 762. Accordingly, in the k-th resembling tone pitch-based tone array detecting circuit 700-k, there will be always detected those data which are lower by one level in the degree of resemblance than those resembling tone pitch-based tone array portions data $PD_{line(1\text{-}7)}$ which have been already detected in the first ~ (k−1)th resembling tone pitch-based tone array detecting circuits.

Figure 7A:
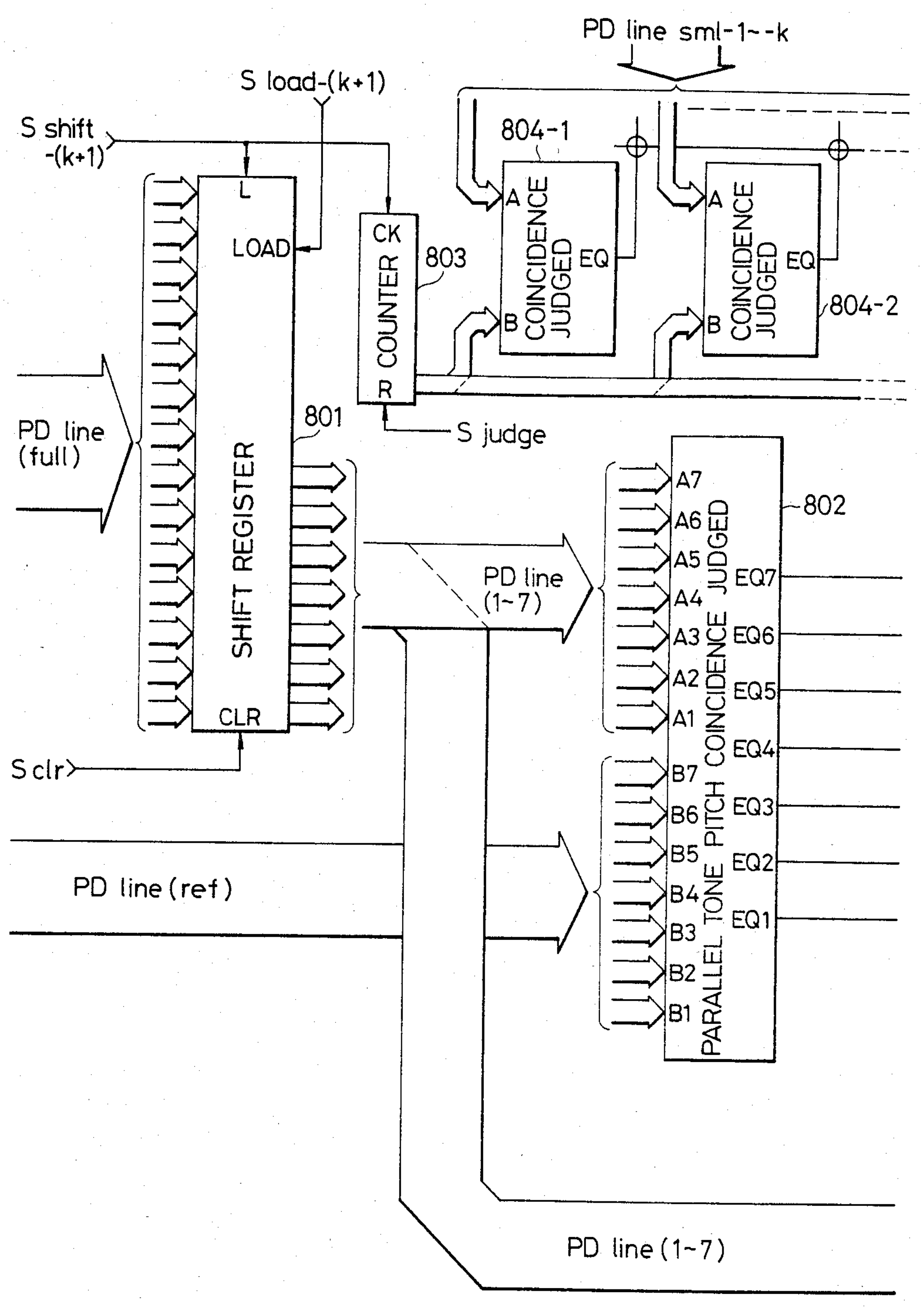
FIGS. 7A and 7B, in combination, are a block diagram showing the details of the circuit contained in FIG. 1A for superposing the coincidental tone pitch portions.
Figure 7B:
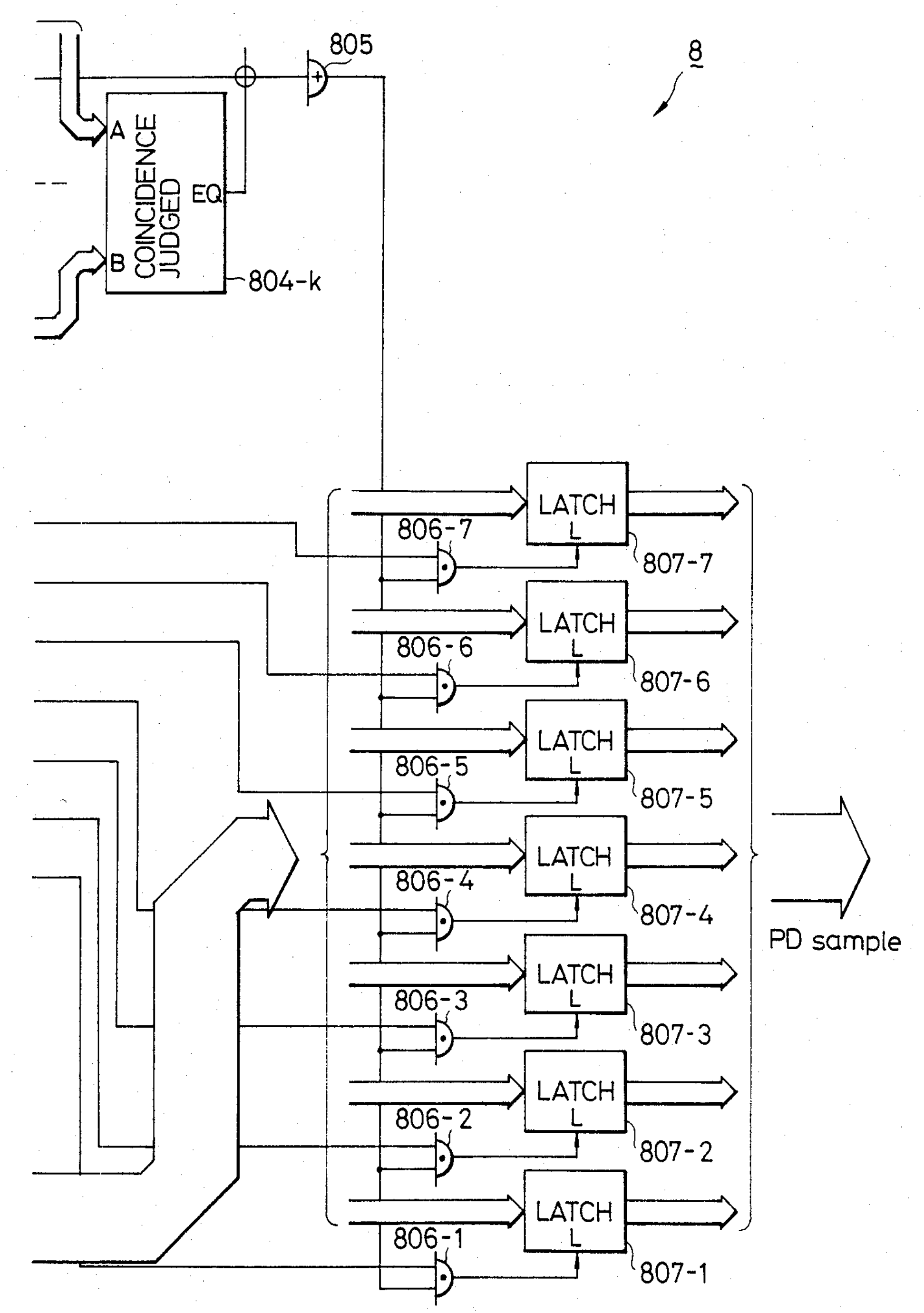

Next, the details of the coincidence tone pitch portions superposing circuit 8 are shown in FIG. 7. In this figure, a shift register 801 loads an inputted tone pitch-based tone array data $PD_{line(full)}$ in response to a loading signal $S_{load\text{-}(k+1)}$. And, it is controlled of its shifting toward the downward direction as viewed in the figure, in response to a "1" pulse contained in the shifting signal $S_{shift\text{-}(k+1)}$, and also the contents in the respective stages thereof are simultaneously cleared by a clearing signal $S_{clr}$.

A parallel tone pitch coincidence judging circuit 802 performs coincidence judgement processing for each stage between the tone pitch-based tone array portions data $PD_{line(1\text{-}7)}$ outputted in parallel from the first ~ 7th stages of said shift register and the reference tone pitch-based tone array data $PD_{line(ref)}$ outputted from the reference tone pitch-based tone array generating circuit 1, and outputs, by 1-bit signal, the result of such judgement to terminals $EQ_1 \sim EQ_7$ for each stage.

A counter 803 is reset by a judgement enable signal $S_{judge}$ and is counts the shifting signals $S_{shift\text{-}(k+1)}$, and whereby outputs a shift number data corresponding to the number of shifts of the shift register 801.

Coincidence judging circuits 804-1 ~ 804-k are assigned respectively to judge the coincidence between the shift number data outputted from the counter 803 and the shift number data $PD_{line\ sml\text{-}1} \sim PD_{line\ sml\text{-}k}$ outputted from the respective resembling tone pitch-based tone array detecting circuits 700-1 ~ 700-k. They output a "1" pulse only when coincidence between the two data is judged.

An OR gate 805 takes a logical sum of the outputs of the respective coincidence detecting circuits 804-1 ~ 804-k. By the output of this OR gate, the data superposition processing which will be described later is controlled.

AND gates 806-1 ~ 806-7 are controlled, respectively, of their opening and closing by an output of said OR gate 805, and they pass therethrough the outputs of the parallel tone pitch coincidence judging circuits, respectively.

Latching circuits 807-1 ~ 807-7 are controlled of their latching actions by the respective coincidence outputs of the parallel tone pitch detecting circuit 802 which are supplied thereto via the AND gates 806-1 ~ 806-7, respectively. Whereby they will latch, for each time of shifting, only those coincidental portions of the respective outputs in the first to the 7th stage outputted from the shift register 801 which are coincidental with the reference tone pitch-based tone array data $PD_{line(ref)}$. And, by the respective series tone pitch data which have been latched in these latching circuits 807-1 ~ 807-7, the most resembling tone pitch-based tone array data $PD_{sample}$ is formed.

As a result, when the respective circuits described above are put to motion, only those coincidental portions of the respective resembling tone array data detected in the resembling tone pitch-based tone array detecting circuits 700-1 ~ 700-k of the respective resembling stages which are coincidental with the reference tone pitch-based tone array data are taken out as shown in FIG. 35. As they are superposed mutually, there is formed a most resembling tone pitch-based tone array data $PD_{sample}$.

Figure 8:
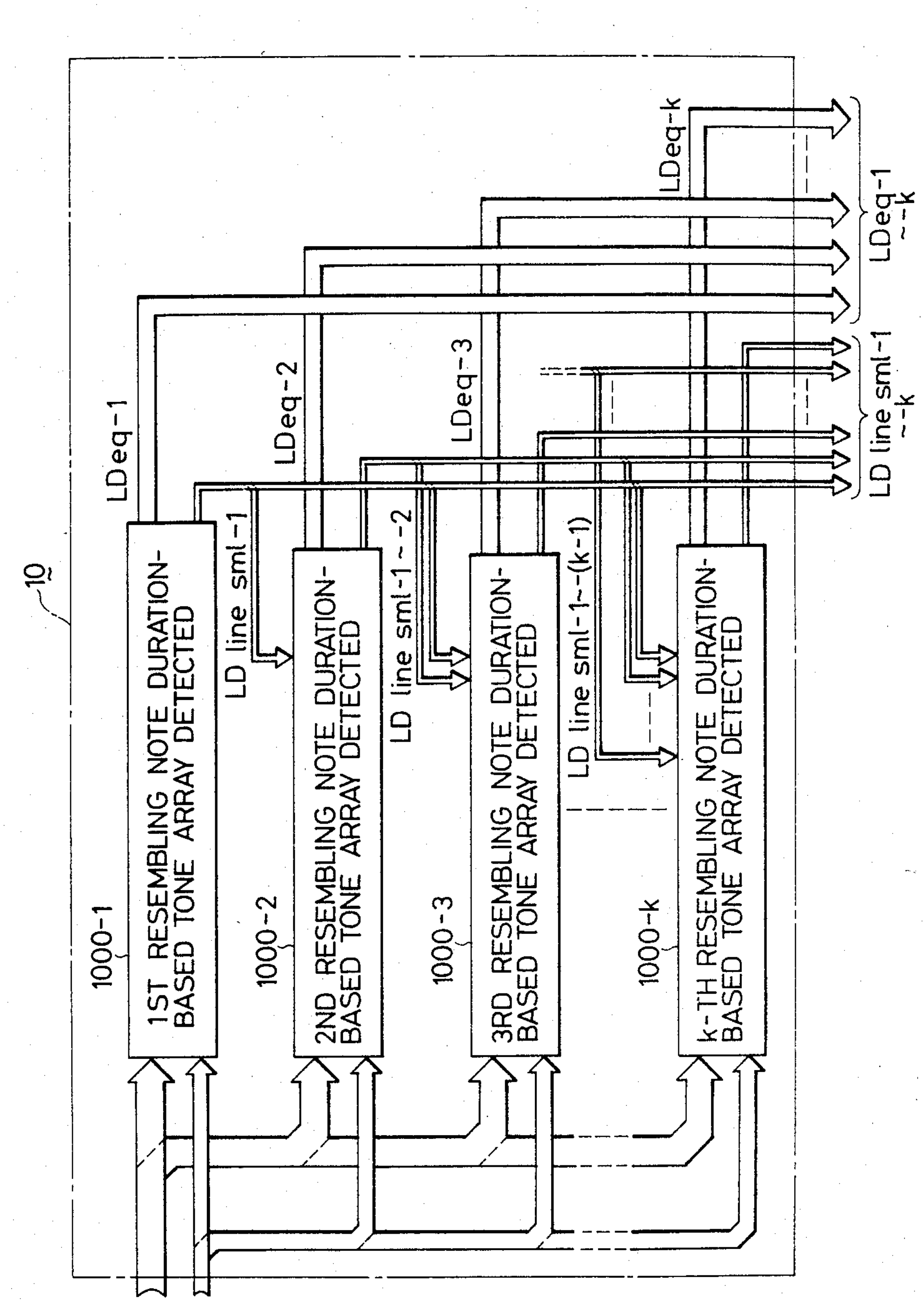
FIG. 8 is a block diagram showing the details of the circuit contained in FIG. 1A for extracting the resembling note duration-based tone array.

Next, the details of the resembling note duration-based tone array detecting circuit 10 are shown in FIG. 8. In this figure, it should be noted that the constructions of the first ~ k-th resembling note duration-based tone array detecting circuits 1000-1 ~ 1000-k are substantially the same as the those of the first ~ k-th resembling tone pitch-based tone array detecting circuits 700-1 ~ 700-k shown in FIG. 4. That is, the respective resembling note duration-based tone array detecting circuits output, in correspondence to the plurality of resembling note duration-based tone array portions data selected in the order of higher degree of resemblance, their shift times data $LD_{line\ sml\text{-}1} \sim LD_{line\ sml\text{-}k}$ and also note duration coincidence count data $LD_{eq\text{-}1} \sim LD_{eq\text{-}k}$.

Figure 9A:
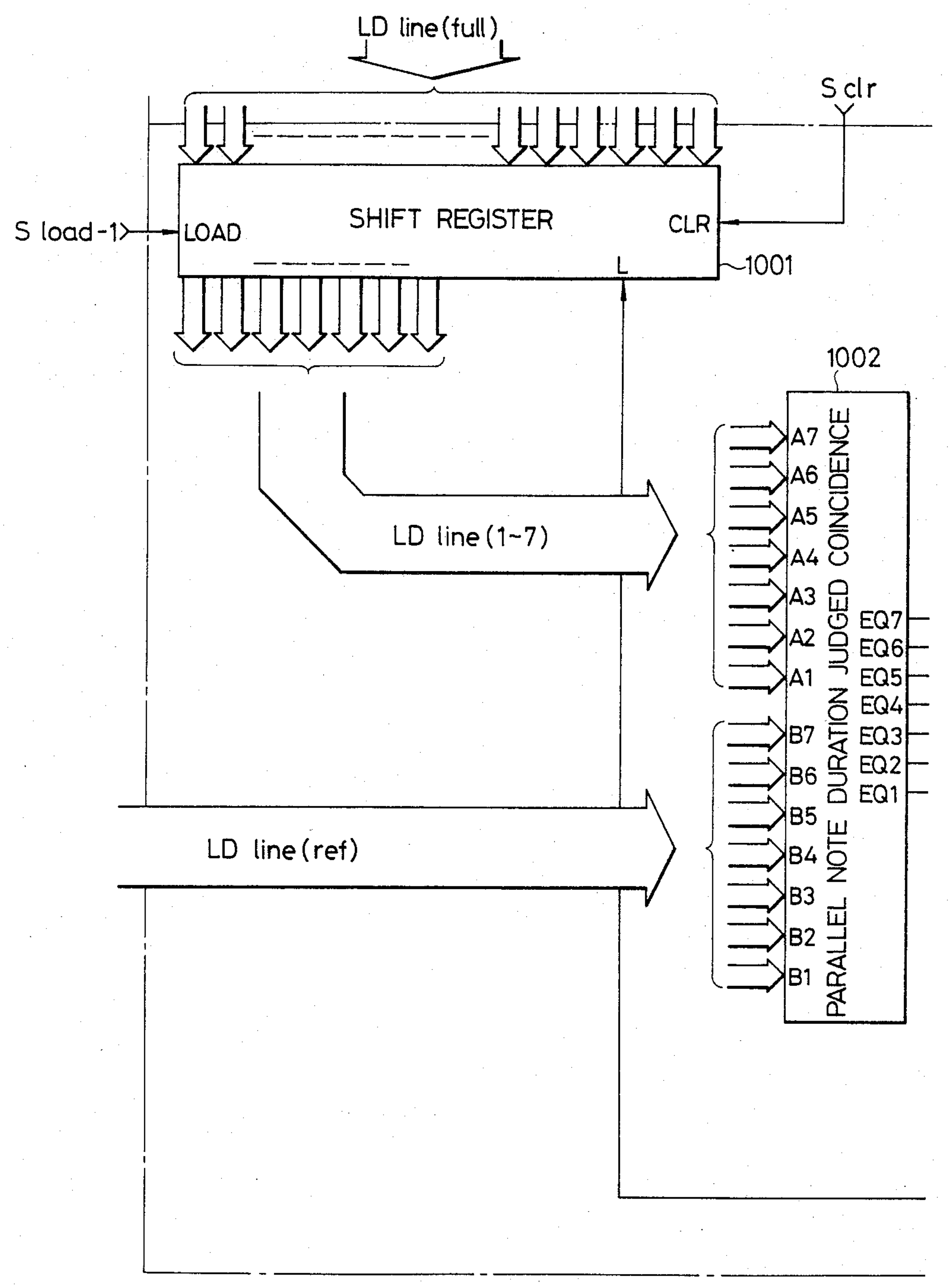
FIGS. 9A and 9B, in combination, are a block diagram showing the details of the first resembling note duration-based tone array detecting circuit contained in FIG. 8.
Figure 9B:
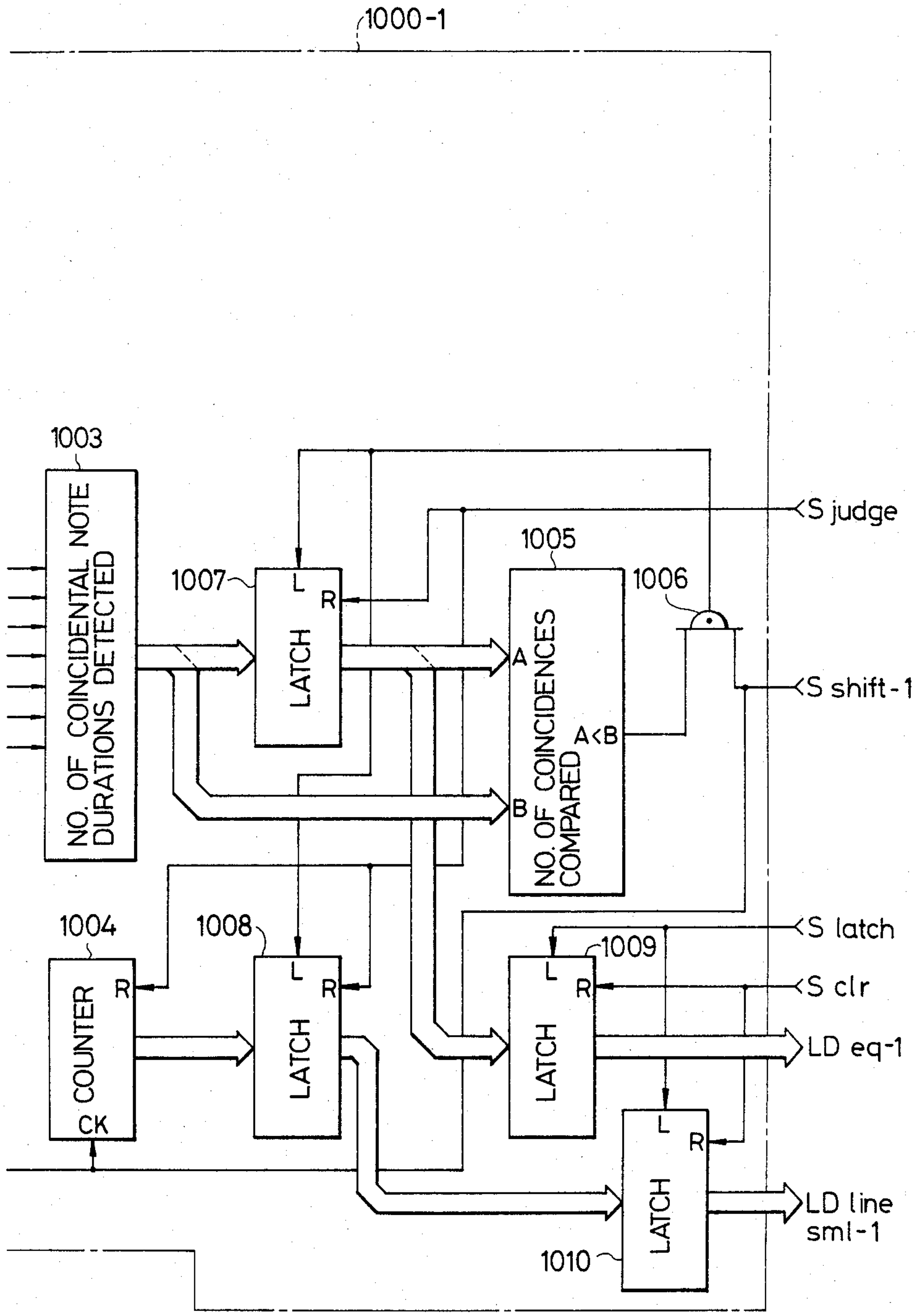

The details of the first resembling note duration-based tone array detecting circuit 1000-1 are shown in FIG. 9. In this figure, the constructions of a shift register 1001, a note duration coincidence detecting circuit 1003, a counter 1004, a coincidence number comparing circuit 1005, an AND gate 1006, a latching circuit 1007, a latching circuit 1008, a latching circuit 1009, and a latching circuit 1010 are such that only those data which they handle are changed from tone pitch data to note duration data, and other aspects are identical with the constructions of the first resembling tone pitch-based tone array detecting circuit 700-1 shown in FIG. 5. Accordingly, their description is omitted here.

In contrast thereto, the construction of the parallel note duration coincidence detecting circuit 1002 differs somewhat from the construction of the parallel tone pitch coincidence detecting circuit 702 shown in FIG. 5. That is, as shown in FIG. 25(C), the respective constituting notes of the reference note duration-based tone array data outputted from a reference note duration-based tone array generating circuit 10 have fixed precise reference durations such as eighth note, quarter note, dotted quarter note and half note.

In contrast thereto, those note duration-based tone array portions data outputted from the first stage to 7th stage of the shift register 701 contain errors $\Delta 1 \sim \Delta 9$, respectively, as shown in FIGS. 31(B)~(J). Here, for the convenience of explanation, the values of these errors $\Delta 1 \sim \Delta 9$ which are imparted to the respective notes ought to be understood as being errors within a predetermined permissible range which permits one to be able to recognize as respective corresponding notes.

Accordingly, in case a precise coincidence judgement is performed, as in the case of the parallel tone pitch coincidence judging circuit 702, between corresponding respective stages of the two tone array data, there can hardly be expected a perfect coincidence therebetween.

Accordingly, in making a comparison between a tone array data $LD_{line(ref)}$ and a tone array data $PD_{line(1\text{-}7)}$ in the parallel note duration coincidence judging circuit 1002, arrangement is provided so that, in case the errors over the reference note duration data for each stage are within predetermined permissible ranges, these data are regarded as being coincidental. That is, at the terminals $EQ_1 \sim EQ_7$, there are derived a coincidence output only in case the differences between $A_1 \sim A_7$ and $B_1 \sim B_7$, respectively, fall within predetermined permissible ranges.

As a result, when the respective circuits shown in FIG. 9 are put to action, there are performed shifting of the respective stages as shown in FIGS. 31(B)~(J) in the shift register 1001. Along therewith, in the parallel note duration coincidence judging circuit 1002, there is carried out a comparison of magnitude between the reference note duration-based tone array data $LD_{line(ref)}$ and the note duration-based tone array portions data $PD_{line(1\text{-}7)}$ as shown in FIG. 32. Thus, judgement is made on whether or not the durations of the respective notes fall within the predetermined permissible ranges for each stage.

And, note duration coincidence number detecting circuit 1003 outputs numerical value data corresponding to respective coincidence tone numbers, and at the same time therewith the counter 1004 outputs the shift number data for the detection, and eventually the latching circuit 1009 and the latching circuit 1010 output coincidental tone numbers corresponding to those note duration-based tone array portions data containing the greatest number of coincidental tones and their shift number data $LD_{eq\text{-}1}$ and $LD_{line\ sml\text{-}1}$.

Figure 10A:
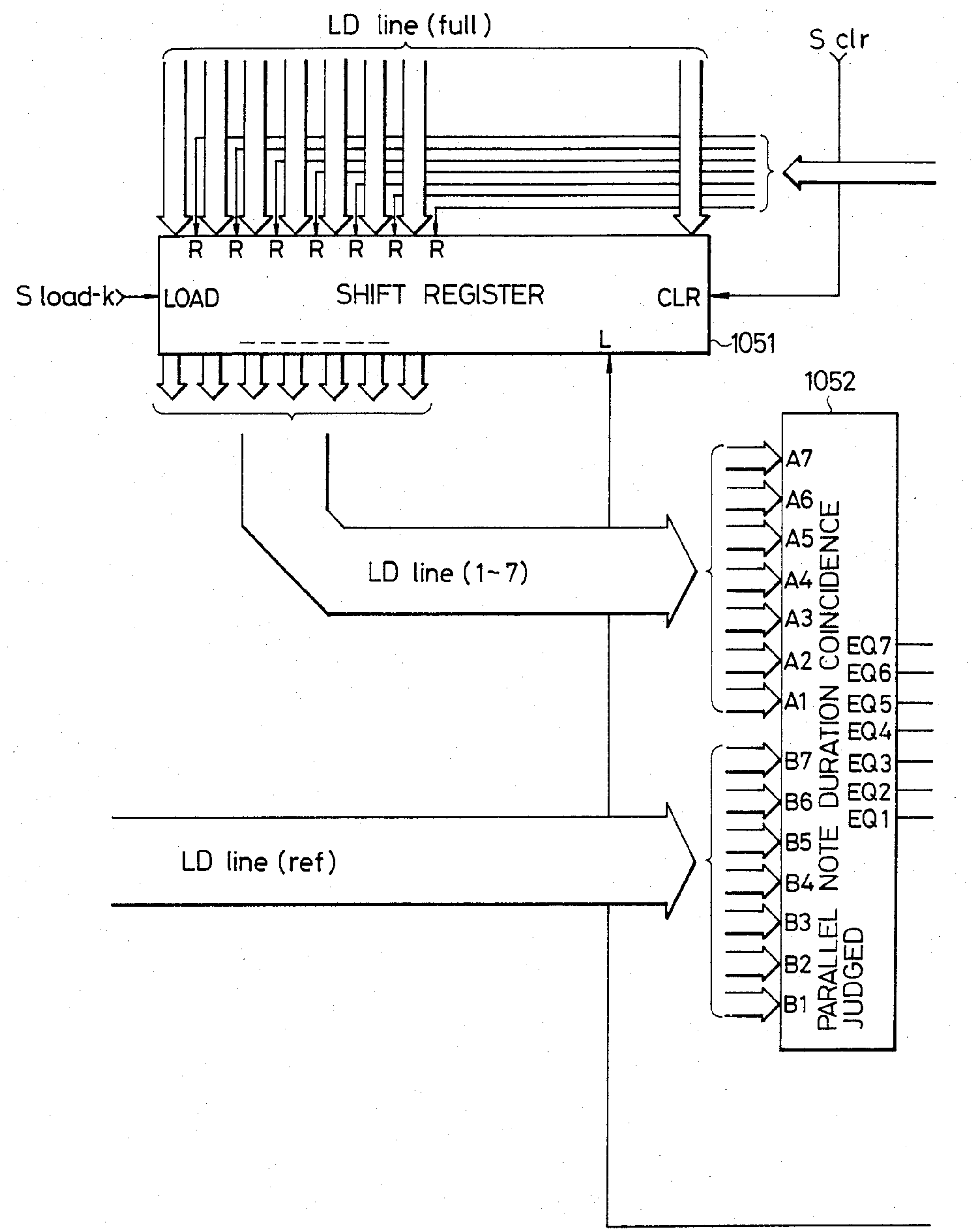
FIGS. 10A and 10B, in combination, are a block diagram showing the details of the k-th resembling note duration-based tone array detecting circuit contained in FIG. 8.
Figure 10B:
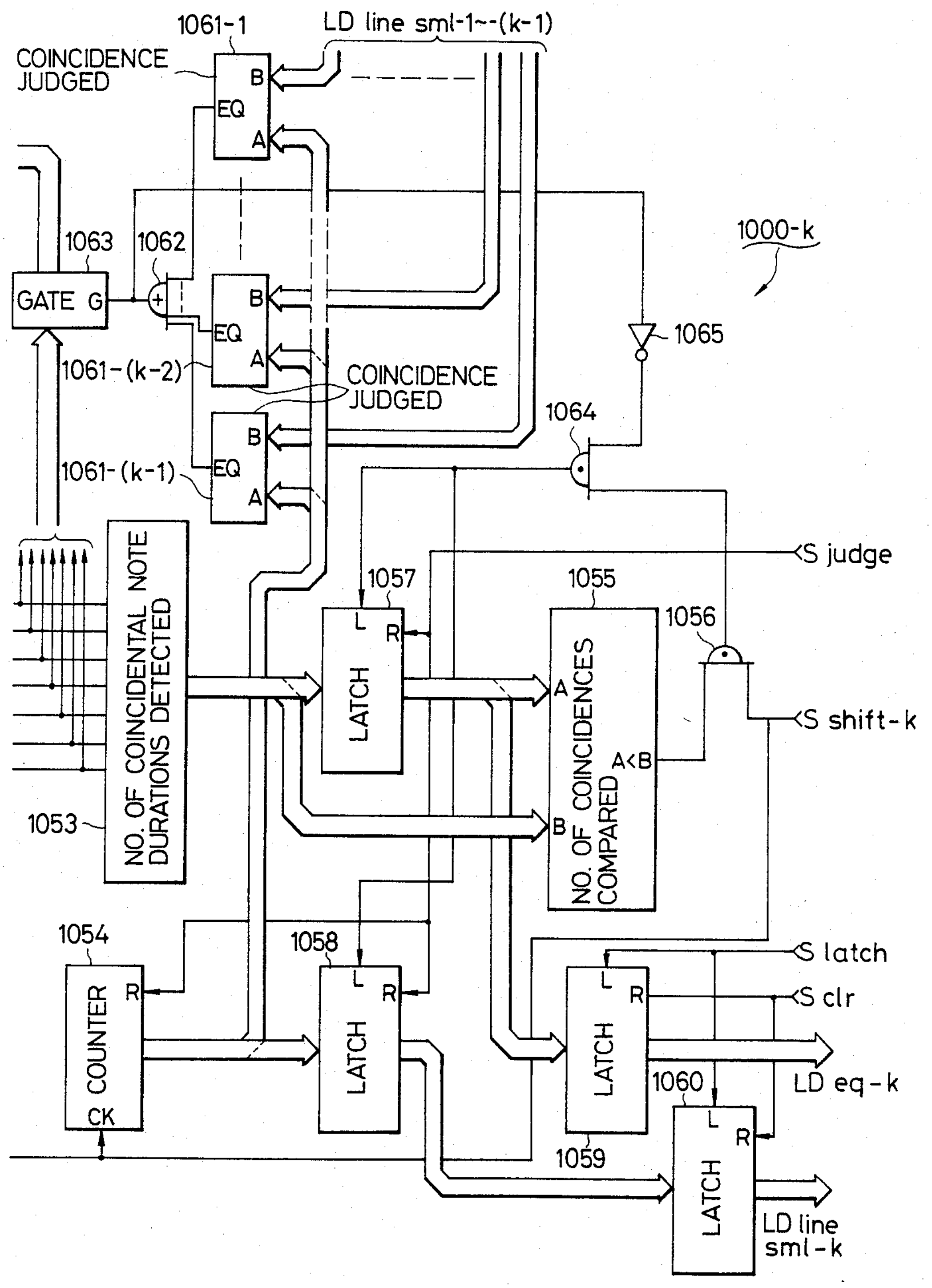

Next, the details of the k-th resembling note duration-based tone array detecting circuit 1000-k are shown in FIG. 10. In this figure, the constructions of a shift register 1051, a note duration coincidence number detecting circuit 1053, a counter 1054, a coincidence number comparing circuit 1055, an AND circuit 1056, a latching circuit 1057, a latching circuit 1058, a latching circuit 1059, a latching circuit 1060, coincidence detecting circuits 1061-1~1061-(k−1), an OR gate 1062, a gating circuit 1063, an AND gate 1064, and inverter 1065 are such that only the type of those data which are handled is changed from tone pitch data to note duration data, and other aspects are identical with the k-th resembling tone pitch-based tone array detecting circuit 700-k shown in FIG. 6. Also, the construction of the parallel note duration coincidence judging circuit 1052 is identical with that of the first resembling note duration-based tone array detecting circuit 1000-1. Therefore, their explanation is omitted here.

As a result, when the respective circuits described above are put to action, in, for example, the second and the third resembling note duration-based tone array detecting circuits 1000-2 and 1000-3, there are carried out the actions to judge coincidence between the reference note duration-based tone array data $LD_{line(ref)}$ and note duration-based tone array portions data $PD_{line(1\text{-}7)}$ as shown in FIGS. 33 and 34. During this part of operation, those resembling tone pitch-based tone array data which have been already selected are removed from the objective requiring judgement of coincidence in the same manner as for the above-described tone pitch data.

And, from the second resembling note duration-based tone array detecting circuit 1000-2, there is extracted a note duration-based tone array portions data containing the second greatest number of coincidental tones, and from the third resembling note duration-based tone array detecting circuit 1000-3 is extracted note duration-based tone array portions data which contain the third greatest number of coincidental tones.

And, these extracted respective note duration-based tone array portions data are converted to shift number data for the inputted note duration-based tone array data $LD_{line(full)}$, respectively, and they are outputted as $LD_{line\ sml\text{-}1} \sim LD_{line\ sml\text{-}k}$, and furthermore with respect to the number of coincidental tones in the respective tone array data, they are outputted as $LD_{eq\text{-}1} \sim LD_{eq\text{-}k}$.

Figure 11A:
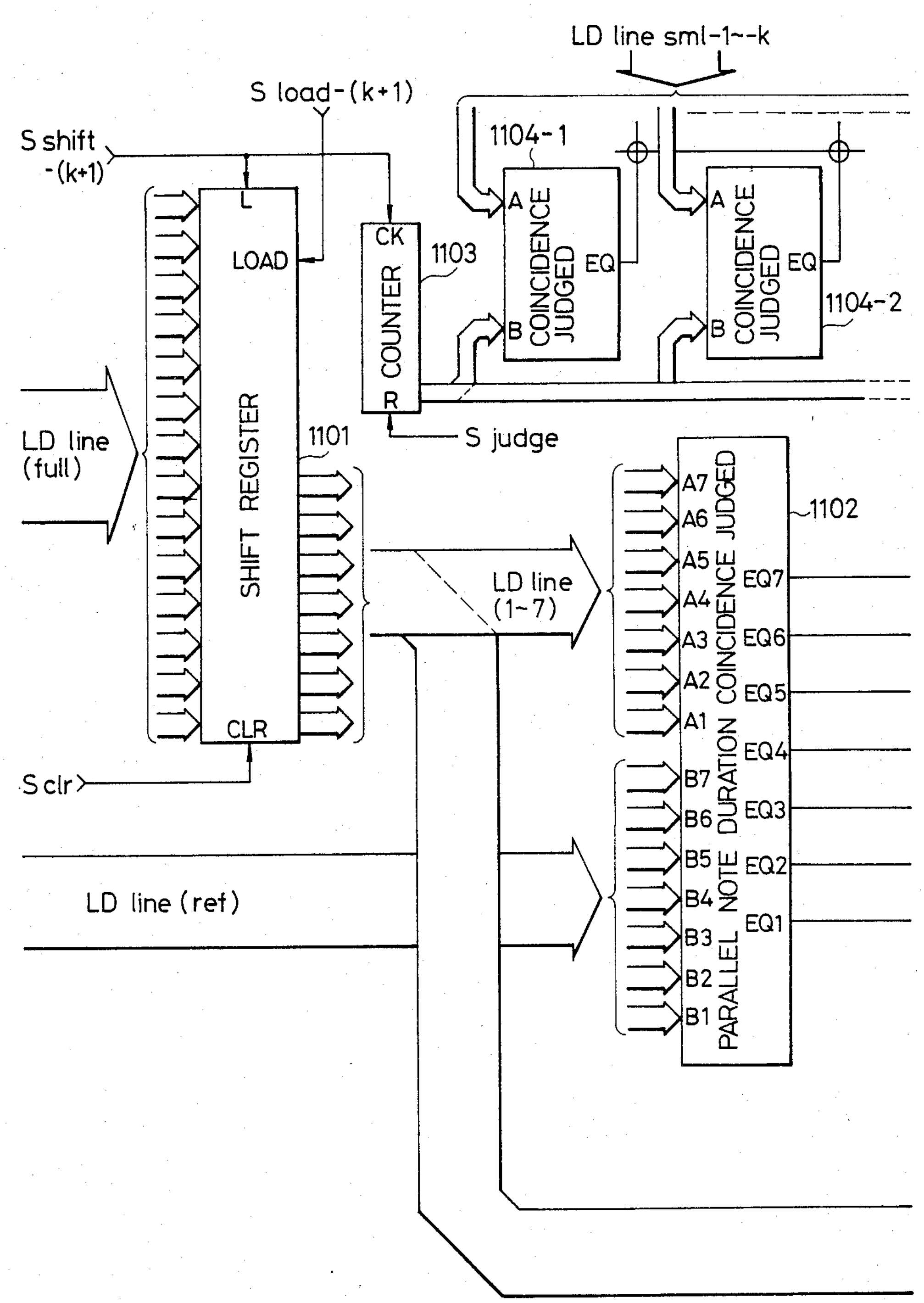
FIGS. 11A and 11B, in combination, are a block diagram showing the details of the circuit contained in FIG. 1A for superposing the coincidental note duration portions.
Figure 11B:
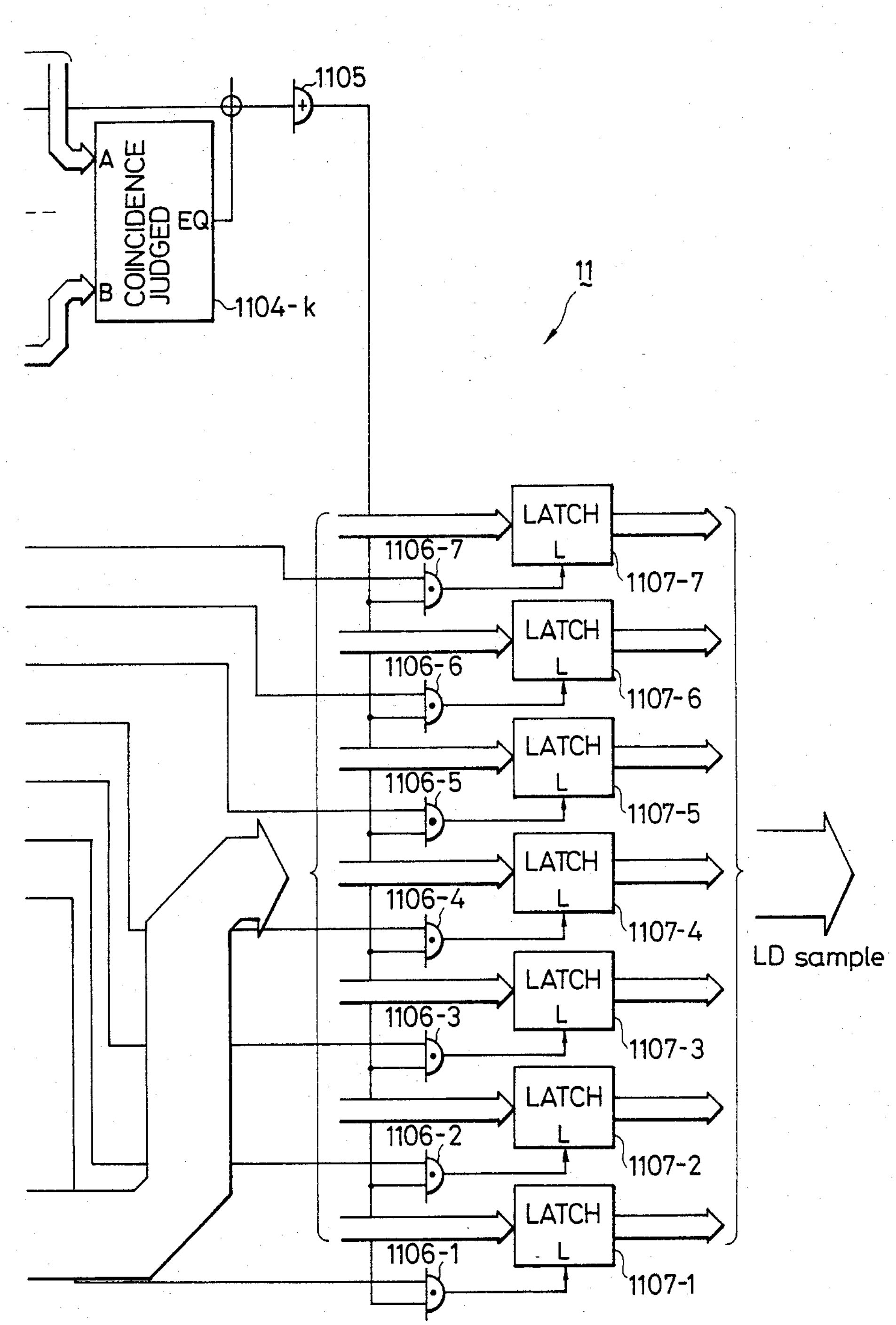

Next, the details of the coincidence note duration portions superposing circuit 11 are shown in FIG. 11. In this figure, the constructions of a shift register 1101, a counter 1103, coincidence judging circuits 1104-1~1104-k, an OR gate 1105, AND gates 1106-1~1106-7, and latching circuits 1107-1~1107-7 are such that the data handled are changed from tone pitch data to note duration data, and other aspects are altogether the same as the coincident tone pitch portions superposing circuit 8 shown in FIG. 7. Also, the construction of the parallel note duration coincidence judging circuit 1102 is identical with the pertinent circuit provided within the respective resembling note duration-based tone array detecting circuits 1000-1~1000-k. Therefore, their description is omitted here.

As a result, when these circuits described above are actuated, in the latching circuits 1107-1~1107-7, those respective coincidental tones in the respective note duration-based tone array portions data detected in the first, second and third resembling note duration-based tone array detecting circuits are superposed upon each other, and whereby there is formed the most resembling note duration-based tone array data $LD_{sample}$.

Figure 17A:
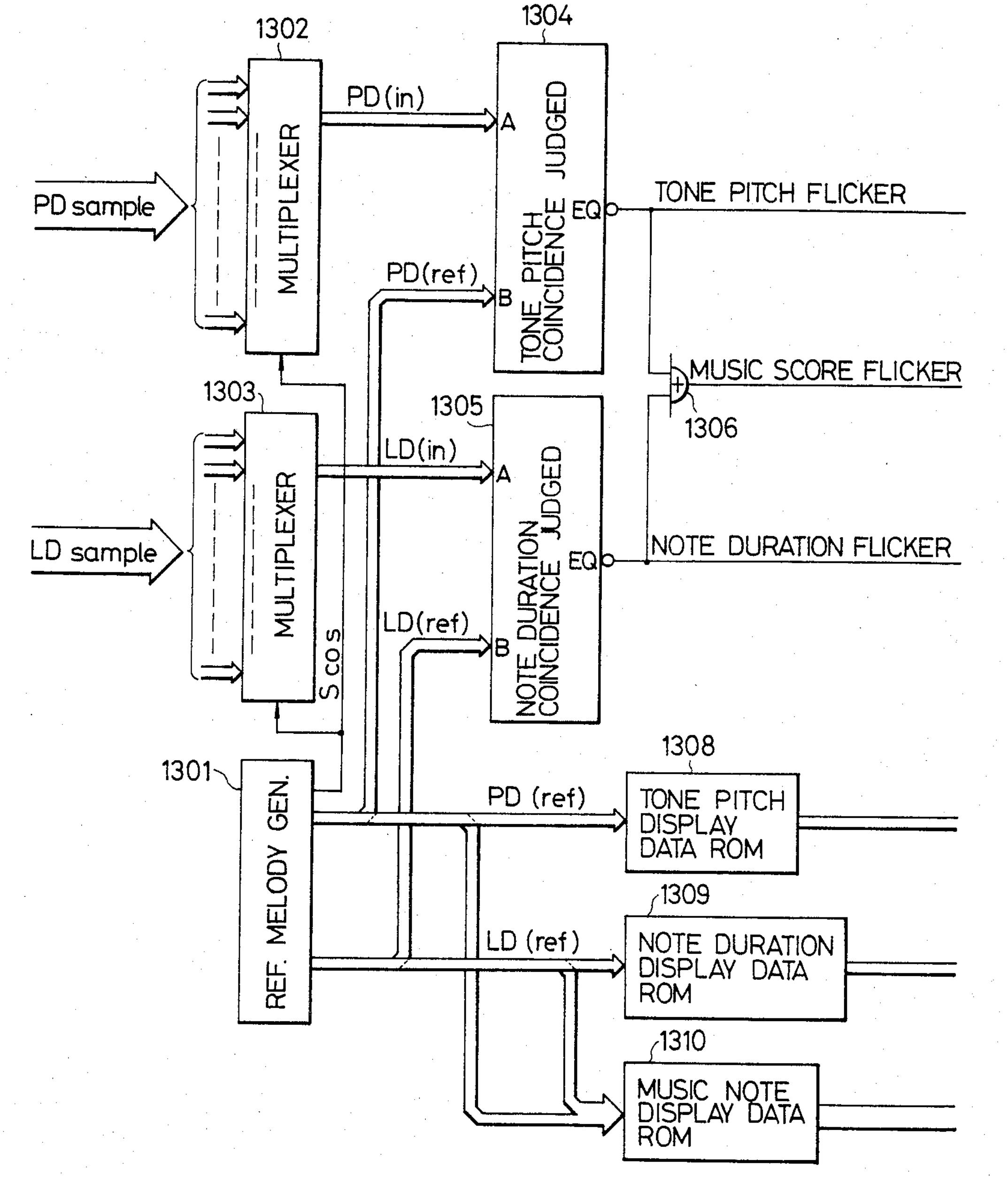
FIGS. 17A and 17B, in combination, are a block diagram showing the details of the performance result display circuit contained in FIG. 1B.
Figure 17B:
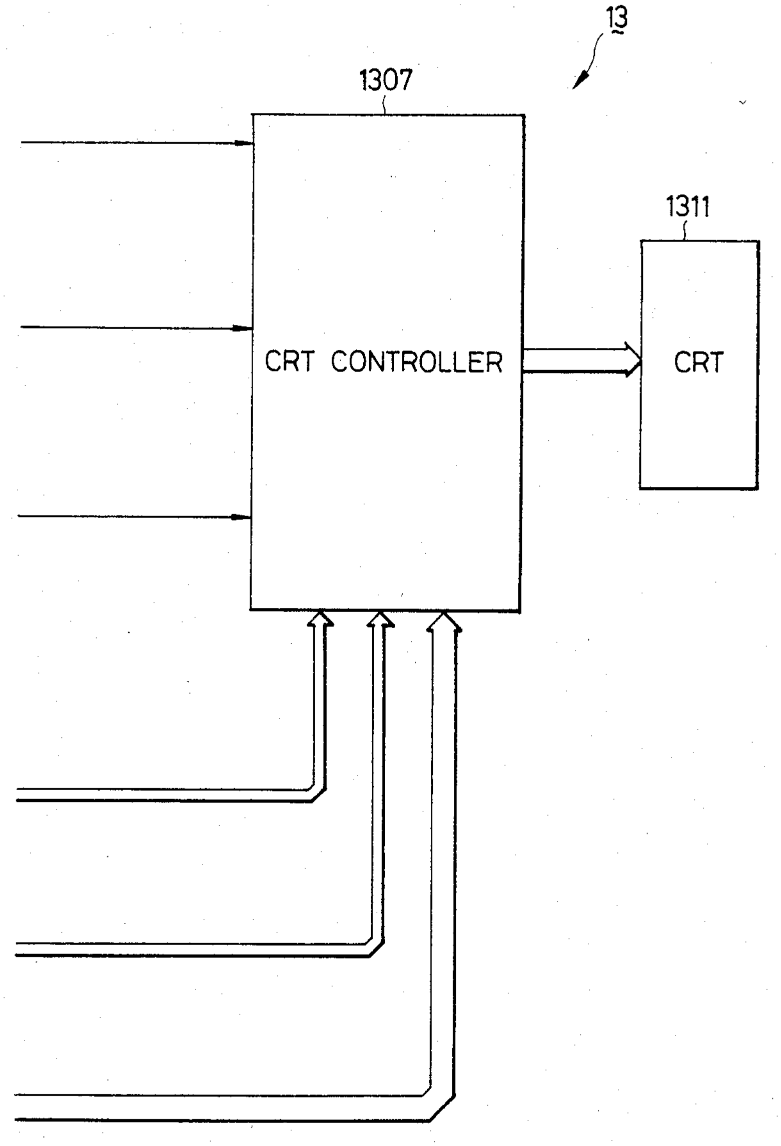

Next, the details of the performance result display apparatus 13 are shown in FIG. 17. In this figure, a reference melody generating circuit 1301 outputs respective tone pitch data $PD_{(ref)}$ and note duration data $LD_{(ref)}$ which jointly constitute a reference melody with a predetermined timing, and also outputs changeover signals $S_{cos}$ in response to the respective output timings.

A multiplexer 1302 selectively outputs, in response to said changeover signals $S_{cos}$, respective tone pitch data constituting the most resembling tone pitch-based tone array data $LD_{sample}$.

A multiplexer 1303 selectively outputs, in response to the changeover signals $S_{cos}$, respective note duration data which constitute the most resembling note duration-based tone array data $LD_{sample}$.

A tone pitch coincidence judging circuit 1304 judges the coincidence between the inputted tone pitch data $PD_{(in)}$ outputted successively from the multiplexer 1302 and the reference tone pitch data $PD_{(ref)}$ outputted from the reference melody generating circuit 1301, and only when these two data fail to coincide, it outputs a "1" pulse.

A note duration coincidence judging circuit 1305 judges the coincidence between the inputted note duration data $LD_{(in)}$ outputted successively from the multiplexer 1303 and the reference note duration data $LD_{(ref)}$ outputted from the reference melody generating circuit 1301, and only when these two data fail to coincide, it outputs a "1" pulse.

And, the outputs of the tone pitch coincidence judging circuit 1304, the note duration coincidence judging circuit 1305 and the OR gate 1306 are supplied, as a tone pitch flickering signal, a note duration flickering signal and a score-lines flickering signal, to a CRT controller 1307.

A tone pitch display data ROM 1308 based on a reference tone pitch data $PD_{(ref)}$ outputted successively and time-divisionally, from the reference melody generating circuit 1301, outputs a tone pitch display data corresponding thereto.

A note duration display data ROM 1309 outputs a note duration display data corresponding to a reference note duration data $LD_{(ref)}$ outputted from the reference melody generating circuit 1301.

A note display data ROM 1310 outputs a music score display data corresponding to a reference note pitch data $PD_{(ref)}$ and a reference note duration data $LD_{(ref)}$ outputted from the reference melody generating circuit 1301.

A CRT controller 1307 functions so that, based on the tone pitch flickering signal, note duration flickering signal, music score flickering signal, tone pitch display data, note duration display data, and note duration data, performs a music score display, a tone pitch display and a note duration display, on a CRT 1311, at the upper site, middle site and bottom site separately, corresponding respectively to the reference melody.

And, the tone pitch display and the note duration display made at the middle site and the bottom site are arranged to develop flickering at the position which is erroneous in these displays. Furthermore, with respect to the music score display at the upper site, similar flickering display is conducted in case either one of the tone pitch or note duration is in error.

As a result, by virtue of the image displayed on the screen of the CRT 1311, the player or the singer is able to surely recognize the erroneous position or item among the performance or singing done by the player or the singer. By concentratedly exercising only the erroneous items, he is able to effectively improve his technique of performance or singing.

Also, by means of the three kinds of display on the screen, the pupil is able to certainly recognize also which of the tone pitch or note duration was mistaken. Furthermore, because of the arrangement of the apparatus that, based on the reference melody, only the erring items relative thereto are displayed. Accordingly, as shown in FIG. 26(A), with respect to the items which the player has already recognized to be erroneous and which has been played again correctly, there is not made any display at all, so that it is possible to notify the player unfailingly only the erroneous items in the performance.

Figure 12A:
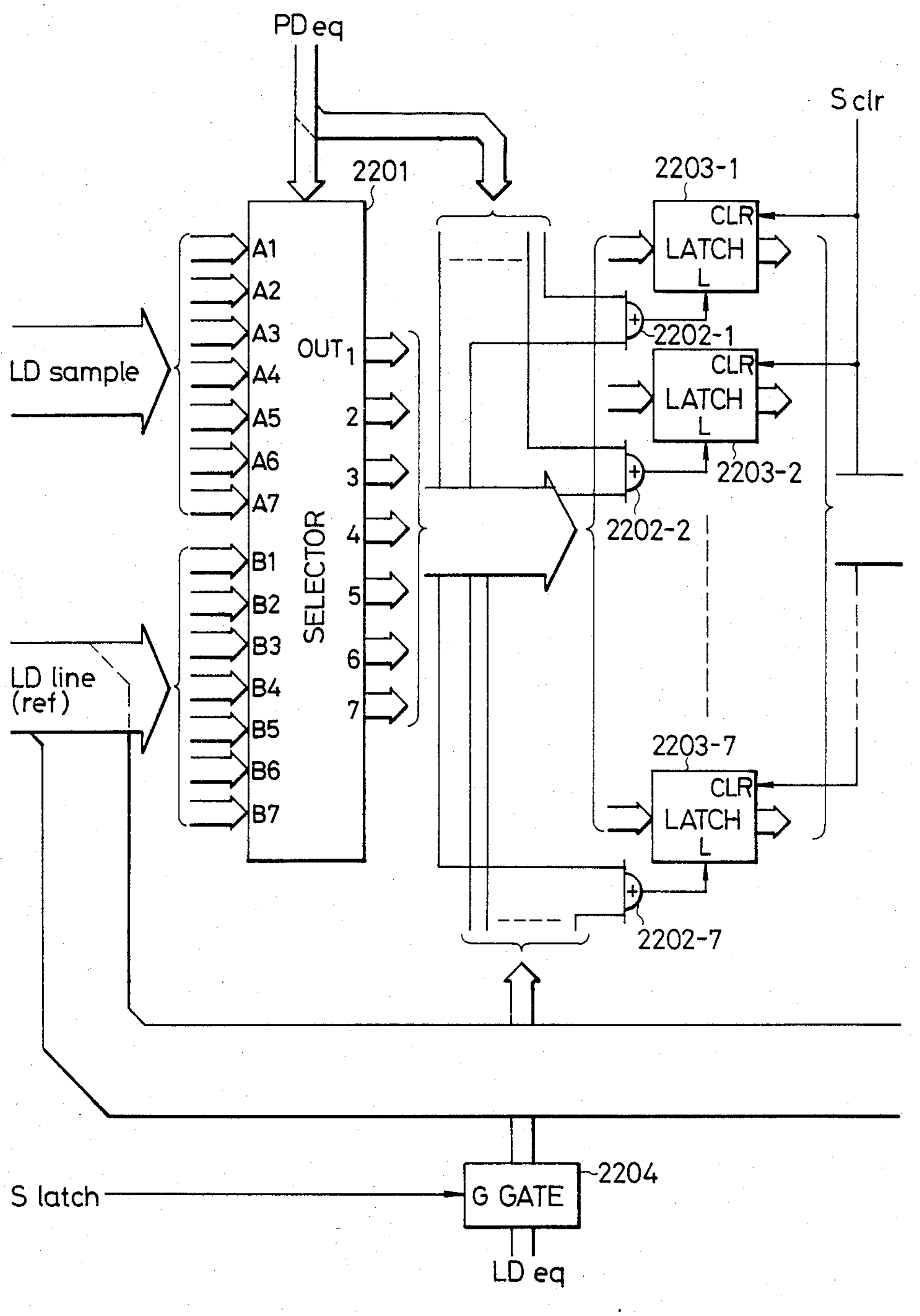
FIGS. 12A and 12B, in combination, are a block diagram showing the details of the playing time-and-time difference detecting circuit contained in FIG. 1B.
Figure 12B:
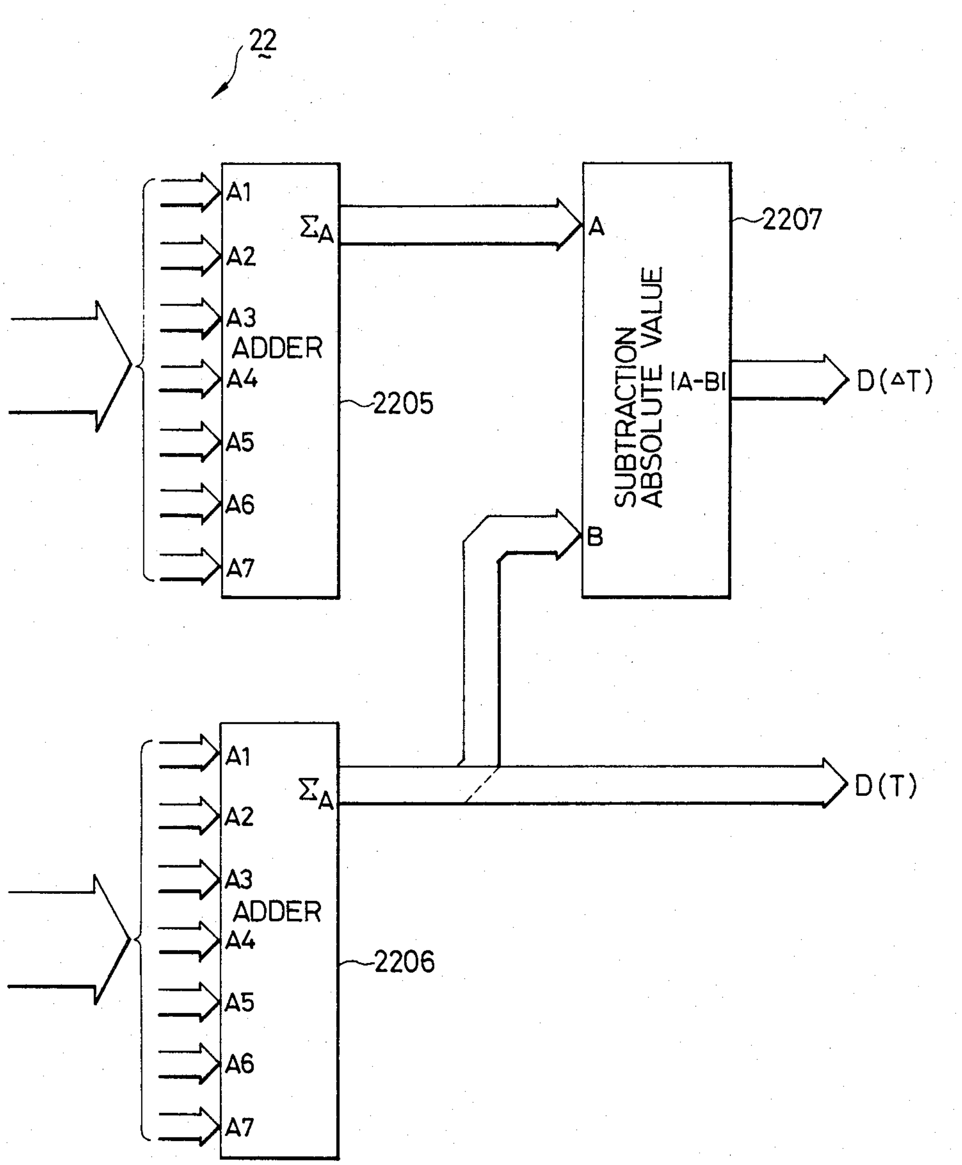

Next, the details of the performance time-time difference detecting circuit 22 are shown in FIG. 12. In this figure, a selector 2201 is constructed so as to be able to separately control the changeover for respective stages by means of a tone pitch coincidence number data $PD_{eq}$ corresponding to the number of coincidental tones between the most resembling tone pitch-based tone array data $PD_{sample}$ outputted from the individual tone pitch coincidence judging circuit 14 and the reference tone pitch-based tone array data $PD_{line(ref)}$, and for this reason there are outputted the contents of the respective stages of either one of the data $LD_{sample}$ and the data $LD_{line(ref)}$ at the output terminals $OUT_1 \sim OUT_7$.

A gating circuit 2204 is controlled of its opening and closing by a latching signal $S_{latch}$, and passes therethrough a note duration coincidence data $LD_{eq}$ corresponding to the number of coincidental tones between the most resembling note duration data $LD_{sample}$ outputted from the individual note duration coincidence judging circuit 16 and the reference note duration-based tone array data $LD_{line(ref)}$.

OR gates 2202-1~2202-7 output logical sums for the respective stages of the tone pitch coincidence data $PD_{eq}$ and the note duration coincidence data $LD_{eq}$. By the outputs of these OR gates, latching circuits 2203-1~2203-7 which will be described later are controlled of their latching actions.

The latching circuits 2203-1~2203-7 are controlled of their latching actions independently by the outputs of said OR gates 2202-1~2202-7. Whereby, they latch the note duration data outputted from the respective output terminals $OUT_1 \sim OUT_7$ of the selector 2202.

An adding circuit 2205 adds up all of the respective note duration data latched by said latching circuits 2203-1~2203-7, and outputs their total sum.

An adding circuit 2206 adds up all of the respective note duration data which constitute said reference note duration-based tone array data $LD_{line(ref)}$, and outputs their total sum. And, the output of this adding circuit 2206 serves as said performance time data D(T).

A subtraction absolute value circuit 2207 seeks the difference between the addition data outputted from said adding circuit 2205 and the addition data outputted from said adding circuit 2206, and outputs its absolute value. This absolute value serves as said performance time difference data $D(\Delta T)$.

Figure 37:
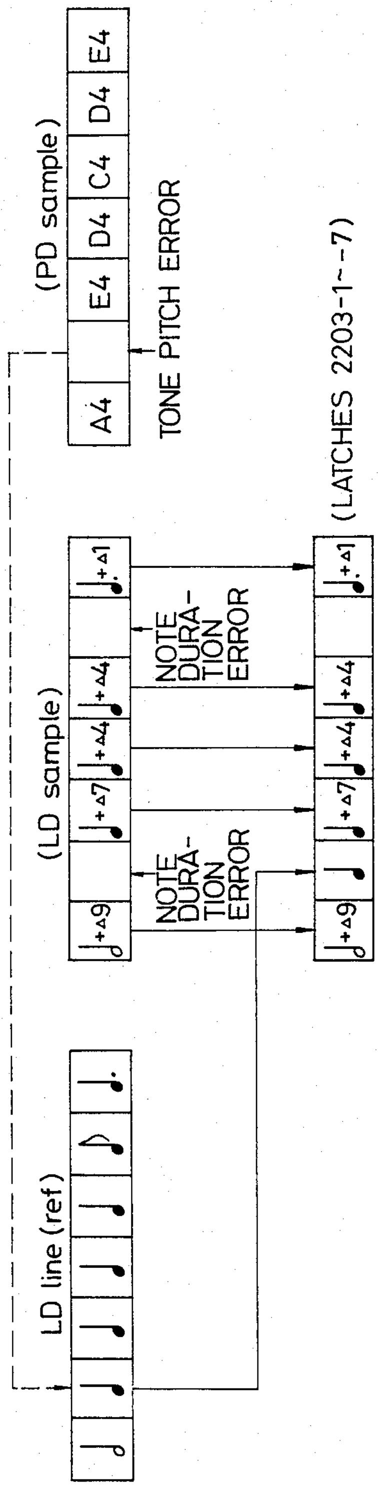
FIG. 37 is an explanatory illustration showing the flow of the note duration data correction processing which is performed in the performance time and time difference detecting circuit.

As a result, when the respective circuits described above are put to action, the latching circuits 2203-1~2203-7 will function in such manner that, in case, as shown in FIG. 37, with respect to the portion of the most resembling tone pitch-based tone array data $PD_{sample}$ which is erroneous in tone pitch, if the corresponding note duration is mistaken in the most resembling note duration-based tone array data $LD_{sample}$ also, the blank region corresponding to the mistaken note duration portion will be corrected by a correct note duration data which is present in the pertinent portion of the reference note duration-based tone array data.

More specifically, in doing an exercise of a melody, tone pitches constitute a particularly important element. For this reason, with respect to the note duration of the tone of the depressed key which is mistaken in tone pitch, this particular note duration is regarded as being correct in the judgement of the note duration, and there can be made a more correct marking or evaluation closer to the judgement done by a music teacher by judging the lengths of those note duration with respect to only those tones of the depressed keys having correct tone pitches.

Figure 13:
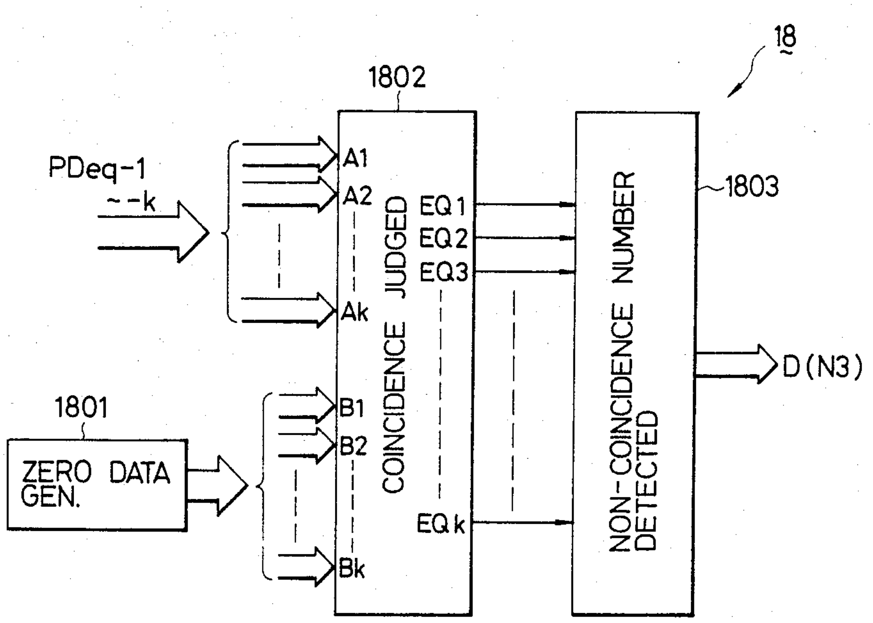
FIG. 13 is a block diagram showing the details of the circuit contained in FIG. 1B for detecting the number of tone arrays having resembling tone pitch portions.

Next, the details of the tone pitch resembling tone array number detecting circuit 18 are shown in FIG. 13. In this figure, a zero data generating circuit 1801 outputs, in parallel, zero data of k in number.

A coincidence judging circuit 1802 judges, individually, the coincidence between the zero data outputted in parallel from the zero data generating circuit 1801 and tone pitch coincidence number data $PD_{eq\text{-}1} \sim PD_{eq\text{-}k}$ of k in number and outputted from the resembling tone pitch-based tone array extracting circuit 7, and outputs respective results of judgement, as 1-bit signals, to terminals $EQ_1 \sim EQ_k$.

A non-coincidence number detecting circuit 1803 detects the number of those "0" signals outputted from the respective terminals $EQ_1 \sim EQ_k$ of the coincidence judging circuit 1802, and outputs them as tone pitch resembling tone array group number data $D(N_3)$.

Figure 14:
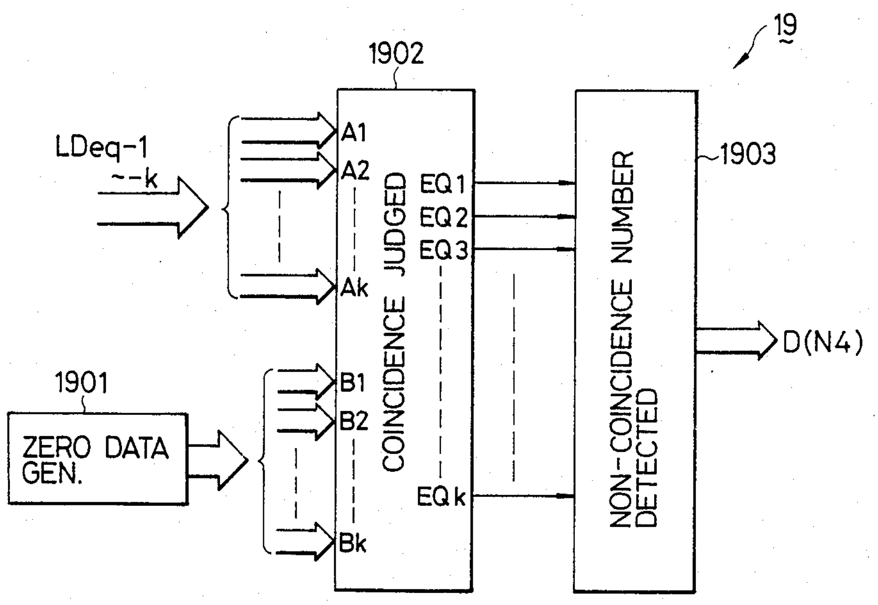
FIG. 14 is a block diagram showing the details of the circuit contained in FIG. 1B for detecting the number of tone arrays having resembling note duration portions.

Next, the details of the note duration resembling tone array detecting circuit 19 are shown in FIG. 14. In this figure, a zero data generating circuit 1901 outputs zero data of k in number.

A coincidence judging circuit 1902 detects, individually, the coincidence between the zero data of k in number outputted in parallel from the zero data generating circuit 1901 and the note duration coincidence number data of k in number $LD_{eq\text{-}1} \sim LD_{eq\text{-}k}$ outputted in parallel from the resembling note duration-based tone array extracting circuit 10, and outputs the respective results of judgement as 1-bit signals to the terminals $EQ_1 \sim EQ_k$.

A non-coincidence number detecting circuit 1903 detects the number of the signals "0" outputted from the coincidence judging circuit 1902, and outputs this as a note duration resembling tone array group number data $D(N_4)$.

Figure 15:
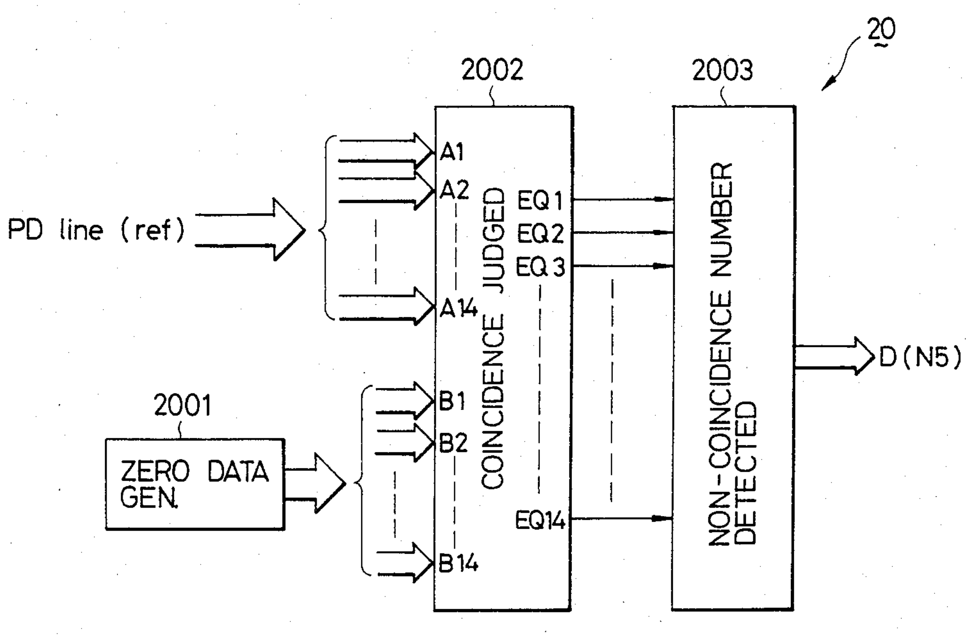
FIG. 15 is a block diagram showing the details of the circuit contained in FIG. 1B for detecting the number of the reference tone pitches.

Next, the details of the reference tone pitch number detecting circuit 20 are shown in FIG. 15. In this figure, a zero data generating circuit 2001 outputs in parallel 14 zero data.

A coincidence judging circuit 2002 judges, individually for each stage, the coincidence between the 14 zero data outputted from the zero data generating circuit 2001 and the reference tone pitch-based tone array data $PD_{line(ref)}$ outputted from the reference tone pitch-based tone array generating circuit 1, and outputs, in parallel, the result of the judgement by 1-bit signals to terminals $EQ_1 \sim EQ_{14}$.

A non-coincidence number detecting circuit 2003 detects the number of "0" pulses among the respective outputs delivered from the coincidence judging circuit 2002, and outputs the result of this detection as a reference tone pitch number data $D(N_5)$.

Figure 16:
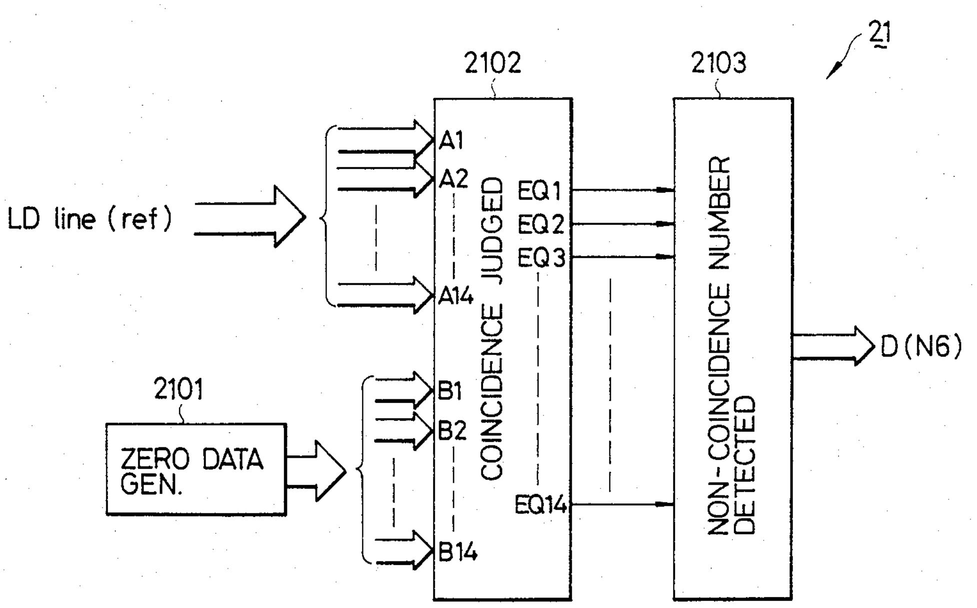
FIG. 16 is a block diagram showing the details of the circuit contained in FIG. 1B for detecting the number of the reference note durations.

Next, the details of the reference note duration number detecting circuit 21 are shown in FIG. 16. In this figure, a zero data generating circuit 2101 outputs, in parallel, 14 zero data.

A coincidence judging circuit 2102 judges, individually for each stage, coincidence between the 14 zero data outputted from the zero data generating circuit 2101 and the reference note duration-based tone array data $LD_{line(ref)}$ outputted from the reference note duration-based tone array generating circuit 12, and outputs in parallel the result of judgement as 1-bit signals to the terminals $EQ_1 \sim EQ_{14}$.

A non-coincidence number detecting circuit 2103 detects the number of "0" pulses among the respective signals outputted from the terminals $EQ_1 \sim EQ_{14}$ of the coincidence judging circuit 2102, and output the result of this detection as a reference note duration number data $D(N_6)$.

Next, the resemblance degree operating circuit 23, based on the thus obtained coincidental tone pitch number data $D(N_1)$, coincidental note duration number data $D(N_2)$, tone pitch resembling tone array group number data $D(N_3)$, note duration resembling tone array group number data $D(N_4)$, reference tone pitch number data $D(N_5)$, reference note duration number data $D(N_6)$, performance time difference data $D(\Delta T)$ and performance time data $D(T)$, seeks the points to be given to the melody playing done by the pupil, by using the following formula:

Points gained $$X = \{[100 \times (N_1/N_5) \times (N_2/N_6) \times (T - |\Delta T|)/T] - Y\} \div 5 \times 5$$

Wherein:

$N_1$ represents the number of coincidences on tone pitch;

$N_2$ represents the number of coincidences on note duration;

$N_5$ represents the number of notes except rests of reference tone array;

$N_6$ represents the number of note including rests of reference tone array;

T represents model performance time;

$\Delta T$ represents performance time difference; and

Y represents the number $N_3$ of tone pitch resembling tone array groups or the number $N_4$ of note duration resembling tone array groups.

The gained score data D *score* obtained by the above-mentioned operation formula is supplied to a score display unit 24, whereby the score of the performance obtained is displayed by, for example, a numerical value displayer as shown in FIG. 1.

Thus, in the melody play exercising apparatus shown in this embodiment, there is adopted the method that the melody played by a pupil on the keyboard 4 is converted to a two-dimensional tone array data comprised of tone pitches and note durations, via the depressed key detecting circuit 5, the inputted tone pitch-based tone array forming circuit 6 and the inputted note duration-based tone array forming circuit 9, and then these tone array data are subjected to pattern recognition processing for respective dimentions via the resembling tone array extracting circuits 7, 10 and coincidental portions superposing circuits 8, 11, and finally the phrase which most closely resembles the reference melody is extracted. Accordingly, it becomes possible to unfailingly extract, among the melody played by the pupil, only that melody portion which is vaguely felt by a music teacher (person) to be somewhat resembling.

That is, when a certain melody is compared against a reference melody, the sense of a human being will make a judgement not only whether or not there is coincidence between the two melodies but also an analogous judgement whether or not these two are somewhat resembling each other. According to the apparatus of this embodiment, it is possible to certainly extract, from the inputted melody played, only that portion of performace which somewhat resembles such reference melody.

Also, according to the apparatus of this embodiment, arrangement is provided so that, based on the most resembling tone pitch data $PD_{sample}$ or the most resembling note duration data $LD_{sample}$ which are outputted from the coincidental portions superposing circuits 8, 11, respectively, there can further display which portion of the extracted somewhat resembling melody is actually different from the reference melody. Accordingly, thanks to the display of the erring portion, the player or the pupil is able to certainly know the erroneous portion of play which he unconsciously has failed.

Also, according to the apparatus of this embodiment, arrangement is provided so that the most resembling tone array data $PD_{sample}$ and $LD_{sample}$ which are extracted from the coincidental portions superposing circuits 8 and 11 are used as the basal data, and that these data are compared with, for example, the coincidental tone pitch number data $D(N_1)$, coincidental note duration number data $D(N_2)$, tone pitch resembling tone array group number data $D(N_3)$, note duration resembling tone array group number data $D(N_4)$, reference tone pitch number data $D(N_5)$, reference note duration number data $D(N_6)$, performance time difference data $D(\Delta T)$ and model performance time data $D(T)$, and that whereby the score mark of performance is calculated. Accordingly, it becomes possible to obtain a result of evaluation which is quite close to the sense of the music teacher.

That is, by taking the ratio between the coincidental tone pitch number $N_1$ and the reference tone pitch number $N_5$, and the ratio between the coincidental note duration number $N_2$ and the reference note duration number $N_6$, respectively, it is possible to express the difference between the aforesaid somewhat resembling melody portion and the reference melody, and furthermore by obtaining the ratio of the difference between the model performance time T and the performance time difference $\Delta T$ relative to the model performance time T, it becomes possible to known how much difference the entire performance time of said somewhat resembling melody portion has against the performance time of the reference melody. Furthermore, by making cognizance of the tone pitch resembling tone array group number $N_3$ or the note duration resembling tone array group number $N_4$, respectively, it is possible to know how many correcting playings have been there in the played melody. Accordingly, by using them as the elements for evaluation, it is possible to obtain a result of evaluation which is quite close to the sense of the music teacher (person).

It should be understood here that, in the above-described embodiment, arrangement is provided so that by using the melody playing done on the keyboard 4 as the objective, the result of this performance is displayed or the gained score for the result of such playing is obtained. Accordingly, there is shown the depressed key detecting circuit 5 which is known in the so-called electronic musical instruments as the means for obtaining respective single tone data corresponding to an inputted melody. The application of the present invention is not limited thereto, but it is possible also to make a display or to take score of a similar performance result based on the output signals of, for example, a microphone or an appropriate electronic musical instrument.

Figure 24:
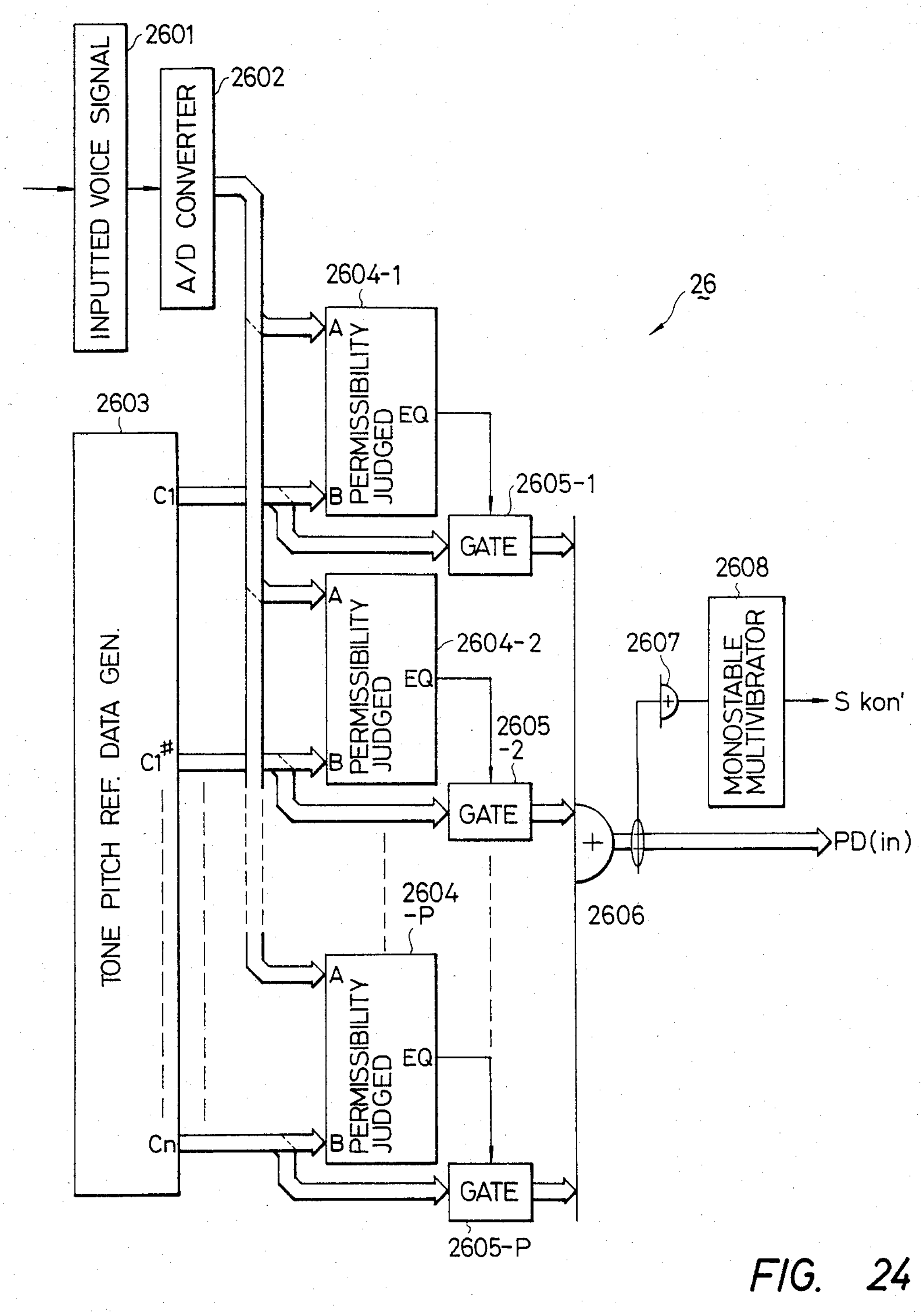
FIG. 24 is a block diagram showing another example of the tone pitch detecting means.
Figure 25:
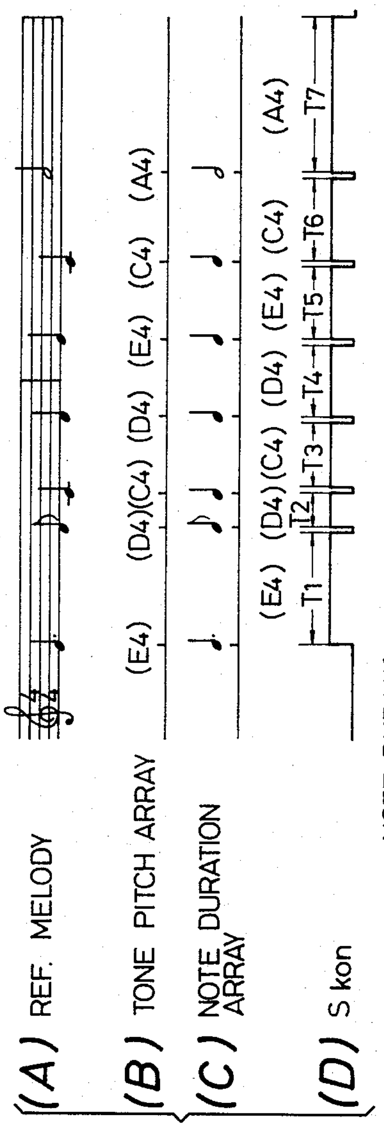
FIG. 25 is an illustration showing an example of the respective tone array data corresponding to the reference melody.

In such case, it is only necessary to provide such tone pitch data detecting circuit 26 as shown in FIG. 24, in place of the depressed key detecting circuit 5. In FIG. 24, a basal wave detecting circuit 2601 detects the basal wave contained in the inputted voice signal or music tone signal, and outputs this signal after converting it to a pertinent analog voltage.

An A/D converting circuit 2602 converts an analog voltage outputted from said basal wave detecting circuit 2601 to a digital signal.

A tone pitch reference data generating circuit 2603 outputs, in parallel, a series of reference tone pitch data comprising $C_1$, $C_1\#$, $D_1$, . . . , $C_n$.

Permissibility judging circuits 2604-1~2604-p compare the magnitudes between the inputted tone pitch data outputted from the A/D converting circuit 2602 and the respective reference tone pitch data outputted from the tone pitch reference data generating circuit 2603, and only when the tone pitch difference corresponding to these results of comparison fall within a predetermined permissible range, they output "1" pulses to their respective terminals EQ.

Gating circuits 2605-1~2605-p are controlled of their opening and closing by respective coincidence outputs of the permissibility judging circuits 2604-1~2604-p, respectively, and whereby they pass therethrough those tone pitch data corresponding to $C_1 \sim C_n$, respectively.

An OR gate 2606 is intended to take logical sum of tone pitch data via the respective gating circuits 2605-1~2605-p. This OR gate 2606 outputs tone array data corresponding to inputted voice signal.

An OR gate 2607 is intended to take logical sum of each bit of said OR gate 2606, and whereby detects the fact that some tone array data has been inputted.

A monostable multivibrator 2608, in response to an output "1" of said OR gate 2607, outputs a fine width pulse "1". This "1" pulse serves as the key depression timing signal $S_{kon}$, shown in FIG. 1, and also an output of said OR gate 2606 serves the inputted tone pitch data $PD_{(in)}$ shown in FIG. 1.

Also, in the above-described embodiment, there have been shown the depressed key detecting circuit 5 or the tone pitch data detecting circuit 26 which is designed so that the respective inputted tones are converted to two-dimensional data comprised of tone pitches and note durations. However, it is needless to say that the application of the present invention is not limited thereto, but that there may be included those circuits designed so that the detection is performed by converting the inputted tones to the dimension of accent, the dimension of tone color, or the dimension of tone volume, in addition to the above-stated dimensions of tone pitch and note duration.

For example, concrete explanation will be made by taking up tone color as an example. As the tone array pattern of the reference tone pitch-based tone array generating circuit 1 shown in FIG. 1 and as the tone array pattern inptted successively to the shift register 607 shown in FIG. 2, it is only necessary to construct the tone color informations which the respective constituting tones of the tone arrays have respectively, i.e. for example, flute, piano, violin, trumpet, etc., into their tone color arrays in this order.

More particularly, as is noted here, the informations which are inputted from the shift register 607 are digital tone pitch informations. Accordingly, it is only necessary to arrange so that those formant data which the respective constituting tones of the tone arrays have respectively are inputted to said shift register 607. More specifically, it is only necessary to arrange so that the respective constituting tones of the tone arrays are filtered in such manner that each constituting tone is filtered of its wave successively by respective band pass filters (for example, three band pass filters whose central frequency is 500 Hz, 1000 Hz and 3000 Hz), and those analog voltage levels outputted from the respective band filters are converted to digital informations, and in case their values are, for example, '4', '3' and '2', and these digital data are inputted successively into the shift register for each constituting tone.

The apparatus which is so constructed as stated above can be used for the purposes of, for example, timing matching of the tones of various musical instruments of an orchestra.

Furthermore, although the conception is the same as those described above, relatively forwardly positioned formant of such sound as mewing of cat, bow-wow of dog, song of bird and so on is extracted, and thus the extraction of tone pattern for each different tone color of these types may be realized easily in the same manner as described above.

Furthermore, with respect to tone volume also, arrangement may be made so that respective tone volume levels of respective constituting tones of a tone array are converted to their respective digital informations to be inputted to the shift register 607, and thus tone volume pattern extraction can be easily realized.

The apparatus which is arranged as described above can be conveniently used in the exercise of developing emotional feeling in the playing with the progress of a melody.

Furthermore, when it is intended to construct an apparatus for exercising chords or rhythms, arrangement may be made as follows. That is, the respective informations of playing which have been detected are filtered by a plurality of band pass filters similar to those stated above which are provided in parallel respectively, and whereby the respective constituting tone data of the chord are converted to digital data, and respective detected digital data are inputted to the shift register.

Also, in case an apparatus for exercising accent is to be constructed, strong and weak data are detected from the data of playing inputted in a similar manner, and they are converted to digital data, and then the digitalized data are inputted to the abovesaid shift register.

By so arranging, the apparatus may be conveniently used for the exercise of developing further emotional feeling, in addition to the above-described instance of tone color.

Also, in the abovesaid embodiment, with respect to the music note whose tone pitch is already erroneous in the performance time and time difference detecting circuit 22, the note duration of this music note is regarded to be correct, and thereby marking is conducted with the importance being placed on the feature peculiar to the melody, i.e. on the tone pitch. Conversely, with respect to the music note whose note duration is wrong, arrangement may be made so that the tone pitch itself is regarded to be correct, so that it is needless to say that a result of marking with the importance being placed on rhythm can be obtained.

Next, description will be made to another embodiment (hereinafter to be referred to as a second embodiment) in case the present invention is applied to a portable electronic musical instrument, by referring to FIGS. 38–40.

The apparatus of this second embodiment is of an external appearance which is constructed as a portable keyboard apparatus. Also, its function includes, in addition to the function as an ordinary electronic musical instrument, various musical scale game functions such as musical scale roulette game, musical scale golf game, and musical scale tennis game, and in addition to these kinds of games, the apparatus is provided with a melody lesson function according to the present invention. Also, the controlling of this electronic musical instrument is carried out by a so-called micro-processor, and its system arrangement is shown in FIG. 38.

Figure 38:
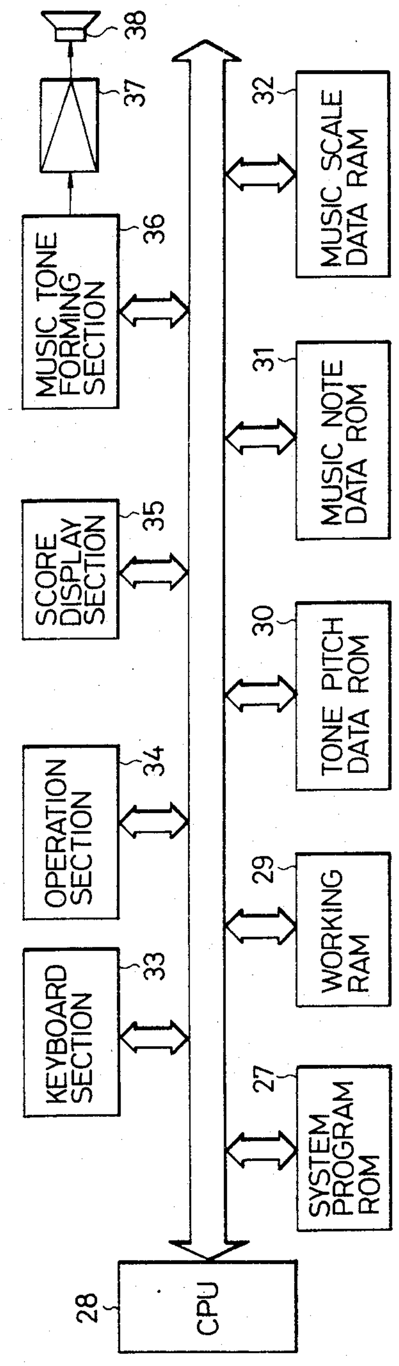
FIG. 38 is a block diagram showing the systematical arrangement of the portable keyboard apparatus as a whole embodying the present invention.

In FIG. 38, a system program ROM 27 houses system programs which define various actions which are performed in a CPU 28.

A wording RAM 29 is used as a working area when the abovesaid various system programs are carried out.

A tone pitch data ROM 30 stores a plural groups of tone pitch data such as for two measures which constitute a melody which is composed when a composing action processing which will be described later is carried out. At the time of the composing action processing which will be describe later, one of the stored groups of tone pitch data is selectively read out by random number data.

A music note data ROM 31 stores a plural groups of a series of music note data, for such as two measures, which are composed in such manner as said tone pitch data ROM 30, and as in the case of the tone pitch data ROM 30, these melodies are selectively read out by a random number data.

A music score data RAM 32 temporarily stores a melody of for example two measures which is composed by a melody composing action processing which will be described later.

A keyboard section 33 is constructed with, for example, a keyboard and a depressed key detecting circuit for detecting the key depression on the keyboard. This keyboard section 33 outputs so-called tone pitch data and key-on timing signal, ect.

An operating section 34 houses a action mode changeover switch for changing-over various actions of this apparatus, a power supply connecting switch and other various switches. The outputs of these switches are delivered out.

A score display section 35 is comprised of a character display apparatus which is constructed with, for example, a liquid crystal. This character display apparatus is to display the score obtained by score processing which will be described later.

A music tone forming section 36 is constructed with a conversion processing apparatus which is well known in electronic musical instruments of this type for converting tone pitch data to music tone signals. Those music tone signals outputted from this music tone forming section 36 are sounded through a loudspeaker 38 after being amplified via an amplifier 37.

Figure 39:
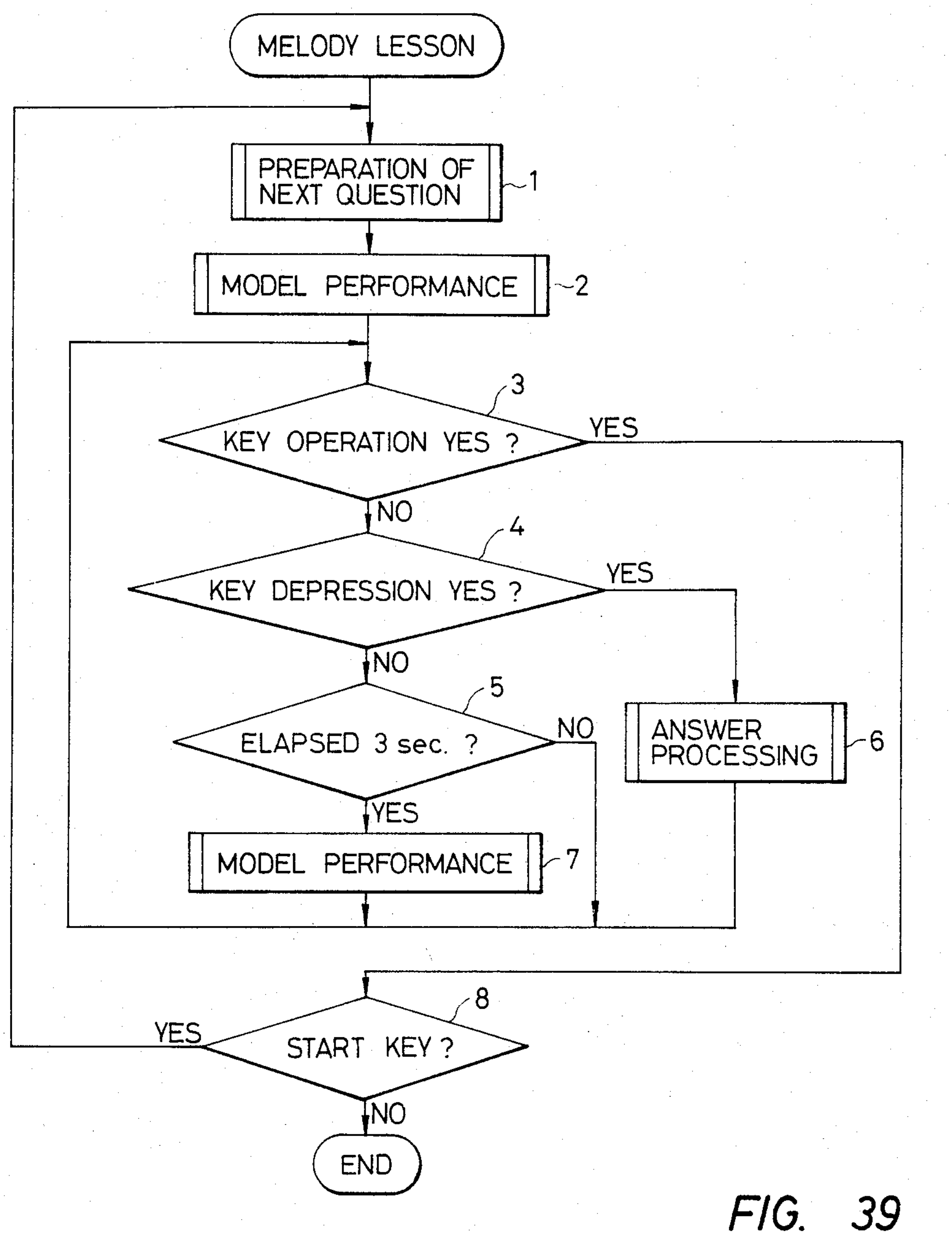
FIG. 39 is a general flow chart schematically showing the operation relating to melody lesson among various mode operations of the keyboard apparatus of FIG. 38.

Next, basic actions of the apparatus of this embodiment is shown in the general flow chart of FIG. 39.

Firstly, the contents of the respective steps which are carried out shown in this general flow chart are explained in detail.

Step (1): in response to the action that the mode changeover switch in the operation section 34 has been changed over to melody lesson mode, a melody for two measures is composed. In this composing action, the tone pitch data and the note duration data for two measures which are stored respectively in said tone pitch data ROM 30 and music note data ROM 31 are read out at random by random number data. The melody for two measures which is a combination of these data is stored in the music note data RAM 32.

The details of this composition action have been applied for patent in, for example, Japanese Patent Application Nos. Sho 56-158437, Sho 56-132494, Sho 56-125603 and Sho 56-132493 filed by the present assignee. Accordingly, description of their details is omitted here.

Step (2): The composed melody data for two measures stored in the music note data RAM 32 is transferred time divisionally successively to the music tone forming section 36, and this is converted to music tone signals. And, the converted music tone signals are amplified via the amplifier 37 and are sounded through the loudspeaker 38.

Step (3): The operation section 34 judges whether or not any key switch has been actuated, and in case the result of the judgement is YES, the processing advances to Step (8), and in case of NO, it advances to Step (4).

Step (4): The keyboard section 33 judges whether or not any key has been depressed, and in case the result of judgement is YES, the processing advances to Step (6), and in case of NO, it advances to Step (5).

Step (5): The keyboard section 33 judges whether or not the state of no depressed key has lapsed for more than 3 seconds, and in case the result of the judgement is YES, the processing advances to Step (7), and in case of NO, it returns to Step (3).

Step (6): For the key depression data (comprised of tone pitch data and note duration data) inputted from the keyboard section 33, score operation for the result of playing done in said first embodiment is carried out, and the score obtained whereby is outputted to the score display section 35.

Figure 40:
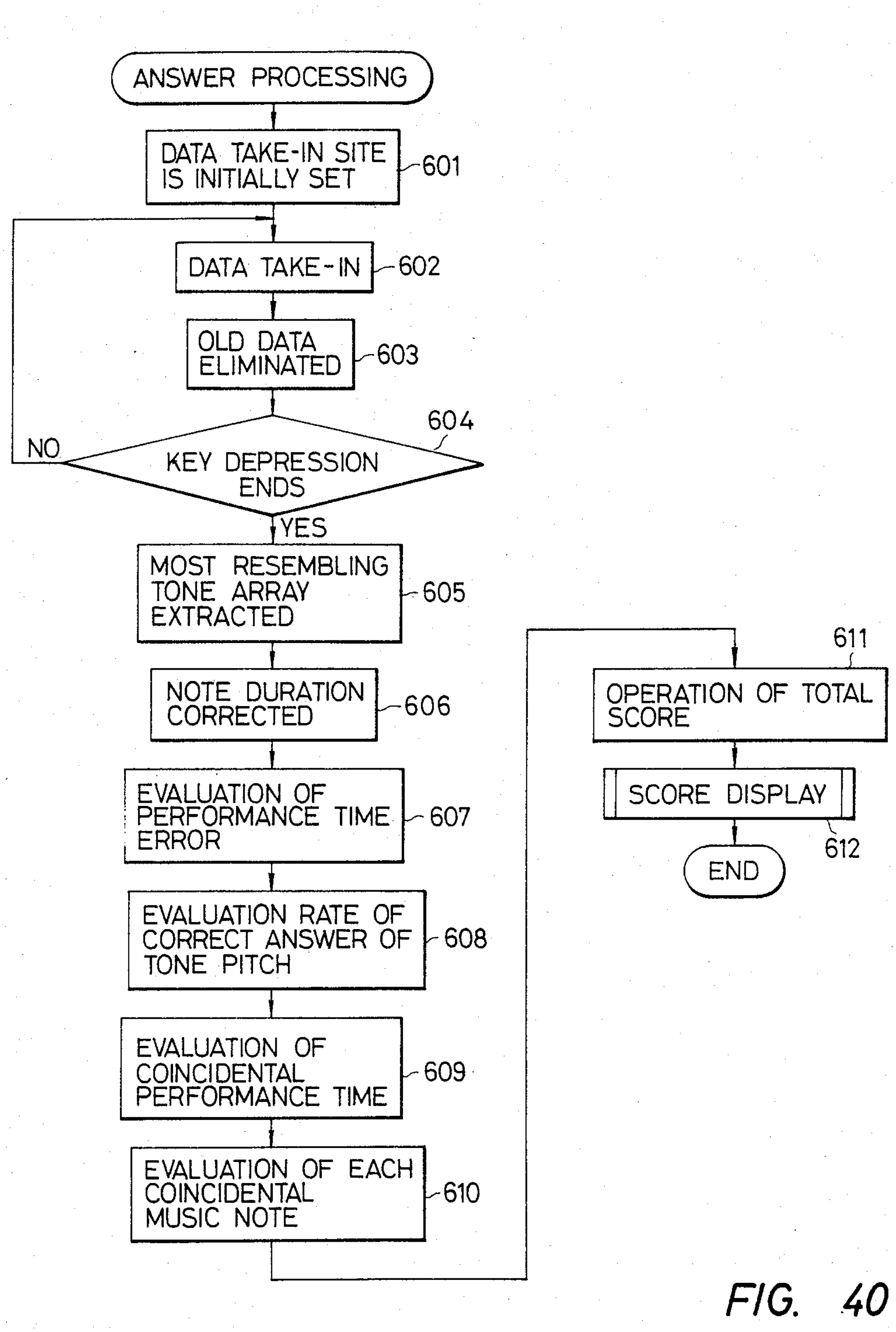
FIG. 40 is a flow chart showing the details of the answer processing program in the general flow chart of FIG. 39.

The details of the answer processing (6) are shown in FIG. 40.

Step (7): Model playing processing similar to Step (2) is performed.

Step (8): Whether or not the depressed key is the start key is judged by the operation section 34, and in case the result of judgement is YES, processing returns to Step (1), and if NO, the melody lesson is terminated.

Next, the details of the answer processing which is performed in Step (6) are explained by referring to the flow chart of FIG. 40.

Step (601): The site at which the tone pitch data and note duration data inputted from the keyboard section 33 is initially set.

Step (602): From the key depression data successively taken in from the keyboard section 33 are removed jitters, and the remaining data are taken in a predetermined area within the abovesaid initially set working RAM 29. Here, the length of note duration which can be regarded as jitter shall correspond to a short time depression of key of about 100 ms.

Step (603): From the key depression data obtained by the latest key depression, up to 12 tones backward are retained, and prior data are eliminated.

Step (604): Whether or not the input from the key depression data from the keyboard section 33 is judged. In case the result of judgement is YES, the processing advances to Step (605), and in case of NO, it returns to Step (602).

Step (605): Out of the series of tone pitch-based tone array data and note duration-based tone array data which have been stored in the area set within the working RAM 29, those tone array data which resembles most closely the tone pitch-based tone array data and the note duration-based tone array data stored in said music note data RAM 32 are extracted.

In this extraction of resembling tone array, there is performed the pattern processing action explained with respect to the first embodiment. Therefore, no further explanation will be made here.

Step (606): As explained with respect to the first embodiment, most resembling tone array is compared against the reference tone array stored in the music note data RAM, and with respect to the portion of the playing in which tone pitch is wrong, its music note is regarded as being correct, and correction of its note duration is made.

Step (607): Comparison is made between the model performance time of the reference melody stored in the music note data RAM 32 and the performance time shown by the most resembling tone array extracted in said Step (605), and the difference time therebetween is obtained to serve as the element for marking. For example, concretely, if the entire performance time after correction of note duration is shorter than the model performance time, mark reduction of two points for every 0.1 second will be made, and conversely in case it is longer, mark reduction of 5 points will be made uniformly.

Step (608): In accordance with the operation formula: Score=Score×Number of Correct Answer÷Number of Questions given, the rate of correct answer of tone pitch is calculated out.

Step (609): Comparison of magnitude, for each music note, is made between the respective music note data for two measures stored in the respective data RAM 32 and the music note of the most resembling tone array extracted in Step (605), and in case all the music notes are coincidental in length with the reference music notes, there is no reduction in the score. In other instances, a mark reduction of 5 points is made uniformly. Whereby, evaluation with respect to variance of music notes is carried out.

Step (610): Judgement of coincidence is made individually between the respective music note data stored in the music note data RAM 32 and the respective music note data constituting the most resembling tone array extracted in Step (605), and for each erring music note, mark reduction of 5 points is made.

Step (611): All of the respective gained scores obtained in each step mentioned above are added together. With respect to portions of less than 5 points, they are omitted to thereby perform the operation of the total score gained.

Step (612): The total gained score obtained in Step (611) is transmitted to the score display section 35, whereby a numerical value display is made on a predetermined display apparatus.

Next, the actions in the flow chart comprising the above-stated respective steps will be explained systematically.

Firstly, in the operation section 34 shown in FIG. 31, the mode changeover switch is set to the melody lesson side. Whereupon, in the flow chart shown in FIG. 39, Steps (1) and (2) are carried out in succession, and a melody sound (for example, two measures) automatically composed will be sounded from the loudspeaker 38.

Next, either the pupil or the player performs a melody playing corresponding to the answer based on the melody sound which he heard through his ears.

Whereupon, processing will advance in the order Step (3)→Step (4)→Step (6), and an answer processing program is carried out. In the answer processing program (6), as shown in FIG. 40, Step (601) is carried out first, and thereafter throughout the period wherein the key-depressed state continues on the keyboard section 33, the sequence Step (602)→Step (603)→Step (604)→Step (602) is repeated. Whereby, in the predetermined set area of the working RAM 29, there will be formed tone pitch-based tone array data and music note-based tone array data which are free of jitters.

Next, upon termination of the playing on the keyboard section 33, aforesaid respective steps (605)~(612) are carried out, and on the gained score display section 35 will be displayed the result of marking for the melody played on the keyboard section 33.

Next, upon ending of the carrying-out of Step (6), the sequence of Step (3)→Step (4)→Step (5)→Step (7) is repetitively carried out, and again the same melody is sounded from the loudspeaker 38. More particularly, in case there is a difference between the melody given as a question and the answered melody, in order that the pupil is able to do the exercise the same melody repeatedly, arrangement is made so that, unless the start key is depressed upon ending of the answer processing (6), the same melody is sounded repetitively.

Then, when the start key is depressed in the operation section 34, the result of carrying-out of Step (3) becomes YES, and in succession thereto the sequence Step (8)→Step (1)→Step (2) is carried out, and a freshly composed different melody is sounded from the loudspeaker 38. By repeating the foregoing sequence, it becomes possible to perform a melody playing many times repeatedly with respect to the same melody or a different fresh melody. And, each time of ending of answer, there is displayed repeatedly on the display secton 35 the score corresponding to the result of performance on the keyboard section 33. Whereby, the pupil is able to effectively improve his own melody playing technique.

In this way, according to this second embodiment, by repeating the actions that a brief melody which is automatically composed is memorized by him, and that an answer thereto is done via the keyboard section 33, and by recognizing the gained score for the result of performance, the pupil is able to very effectively carry out melody lesson of this kind even in the absence of his teacher.

As will be clear from the explanation made above of the first and second embodiments, in case a music teacher usually evaluate any melody, he can unconsciously extract the particular melody portion which somewhat resembles a model melody. Whereby, in case the pupil became aware of the erroneous portion during the melody playing and in case he played the corrected melody, the erring portion and the re-played portion are automatically deleted, and he can certainly extract only the melody portion necessary for marking, etc.

Also, with respect to the portion, among the melody portion played by the pupil, which has been replayed and corrected as stated above, such portion is deleted, and only the portion which the pupil has erred unconsciously is unfailingly displayed on the screen. Whereby, it is possible to effectively improve the technique of the melody playing.

Furthermore, it is possible to obtain the result of evaluation which is quite close to the sense of a music teacher, and by virtue of such display of gained score, it is possible to give all the more effective comments to the pupil.

FIGS. 41 to 44 are figures for explaining still another embodiment (hereinafter to be referred to as the third embodiment) in case the present invention is applied to a melody recognition apparatus. Like parts as in FIG. 1 are given like reference numerals, and their explanation is omitted, and only those parts different from FIG. 1 are described below.

Figure 41A:
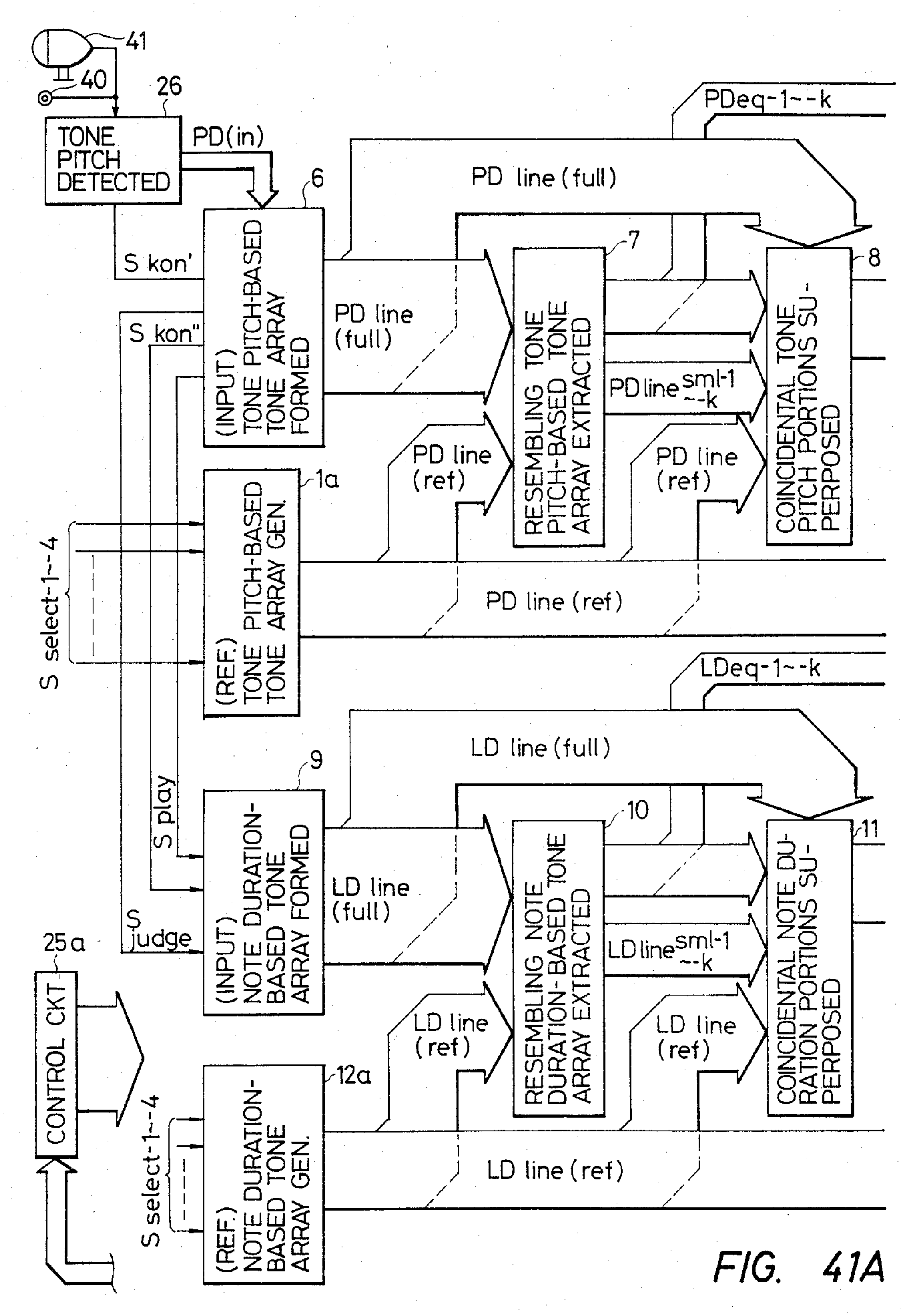
FIGS. 41A, 41B and 41C, in combination, are a block diagram showing the overall construction of the melody recognizing means embodying the present invention.
Figure 41B:
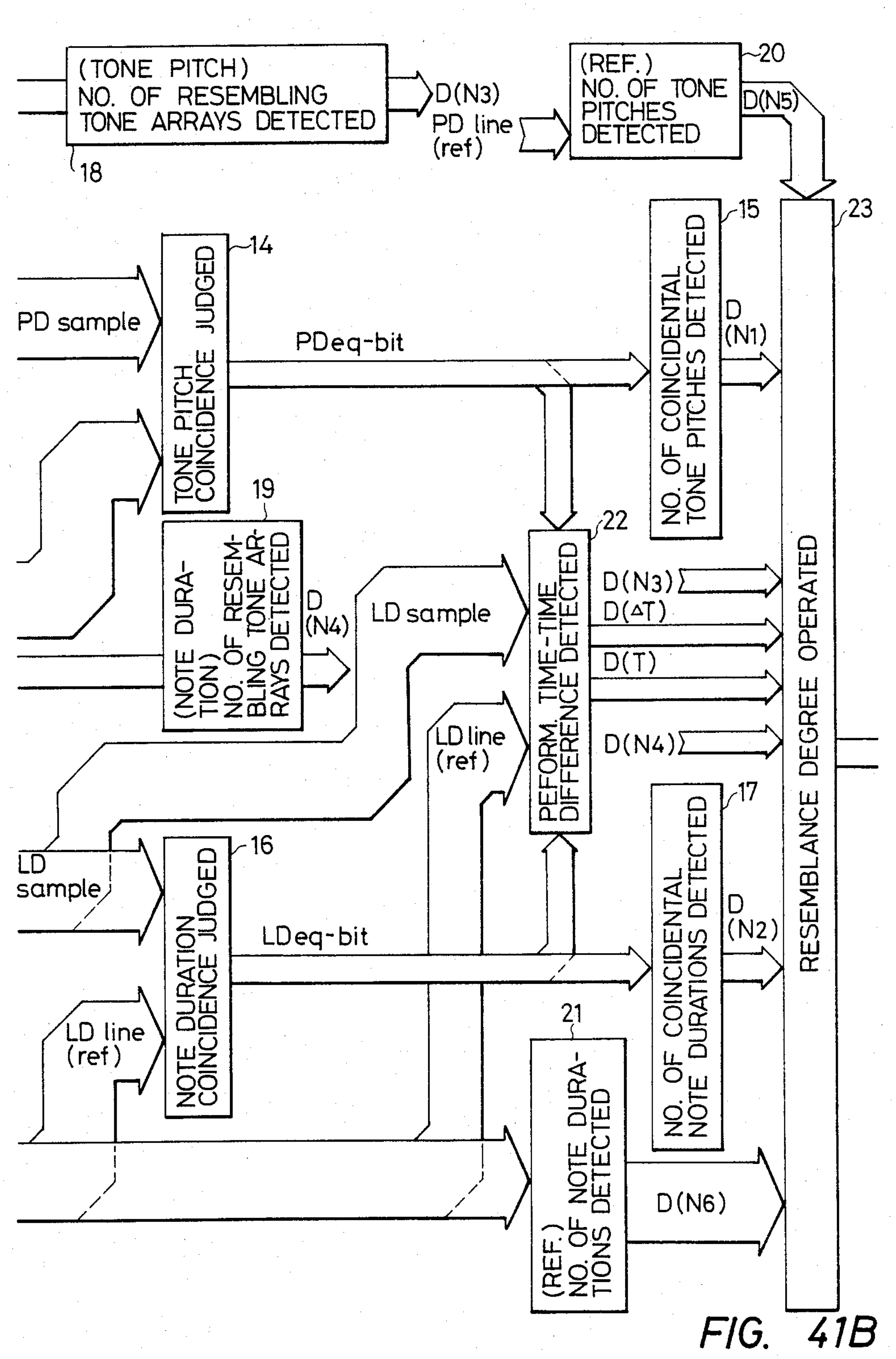
Figure 41C:
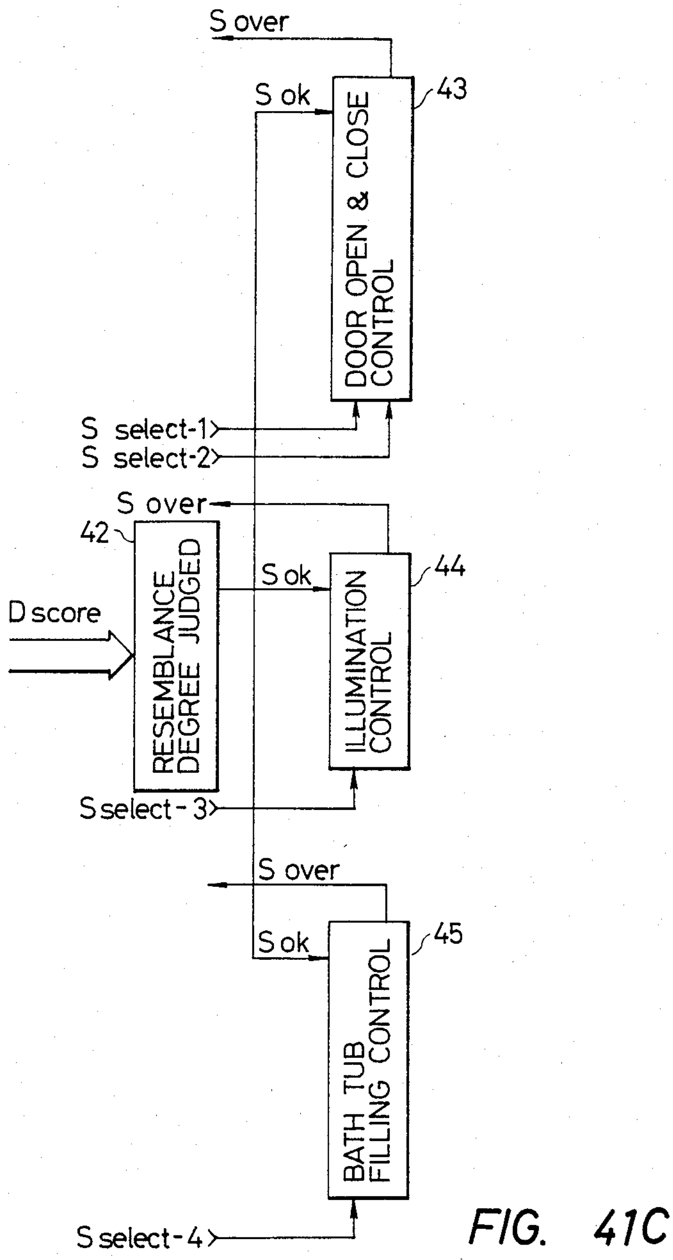

In FIG. 41, a reference tone pitch-based tone array generating circuit 1*a* and a reference note duration-based tone array generating circuit 12*a* store reference tone pitch-based tone array data $PD_{line(ref)}$ and reference note duration-based tone array data $LD_{line(ref)}$ for plural kinds of melodies, respectively. Arrangement is provided so that these tone array data can be alternatively read out by melody designation signals $S_{select\text{-}1}$~$S_{select\text{-}4}$ which will be described later.

Also, a tone pitch detecting circuit 26 (FIG. 24) is supplied, for example, with voice signals detected via a microphone 41 or with output signals of an electronic musical instrument detected via an input terminal 40. The tone pitch detecting circuit 26 outputs tone pitch data $PD_{(in)}$ contained in these inputted signals and outputs timing signals $S_{kon'}$ indicative of the output timing of the respective tone pitch data.

A resemblance degree judging circuit 42 judges said resemblance score data $D_{score}$ based on a predetermined reference score (for example 80 points), and only when the value of this resemblance score data exceeds 80 points which serve as the reference score value, it outputs a "1" pulse as a recognition confirmation signal $S_{ok}$.

A door opening and closing controlling circuit 43, an illumination controlling circuit 44 and a bath tub filling controlling circuit 45 deal with the opening and closing of doors, the controlling of lighting-up of illumination devices and the controlling of pouring water into the bath tub, respectively. These respective circuits are alternatively enabled in accordance with the contents of the aforesaid melody designating signals $S_{select}\text{-}1$~$S_{select}\text{-}4$.

And, in the enabled state of these respective circuits, only when a melody recognition confirming signal $S_{ok}$ is outputted, the respective controlling circuits will perform their required functions, and upon ending of their performances, it outputs a completion signal $S_{over}$.

As a result, when, as stated above, for example, a melody corresponding to the predetermined door opening and closing command is snug or voiced through the microphone 41, the door opening and closing circuit will carry out its required actions only when the sung melody is recognized as sufficiently resembling the respective tone array data stored in the reference tone pitch-based tone array generating circuit 1*a* and the reference note duration-based tone array generating circuit 12*a*. Whereby, the opening and closing of the door are automatically performed.

In contrast thereto, in the state that a melody designating signal $S_{select\text{-}3}$ or $S_{select\text{-}4}$ is outputted from the controlling circuit 25*a*, if a melody corresponding to an illumination controlling command or a bath tub filling controlling command is inputted from a microphone 41 or from, for example, an electronic musical instrument, the illumination controlling circuit 44 or the bath tub filling controlling circuit 45 will perform a required action, respectively, in response to the "1" pulse serving as the melody recognition signal $S_{ok}$. Whereby, the controlling of either the lighting-up of illumination devices or the pouring of water into the bath tub is automatically carried out.

Figure 44:
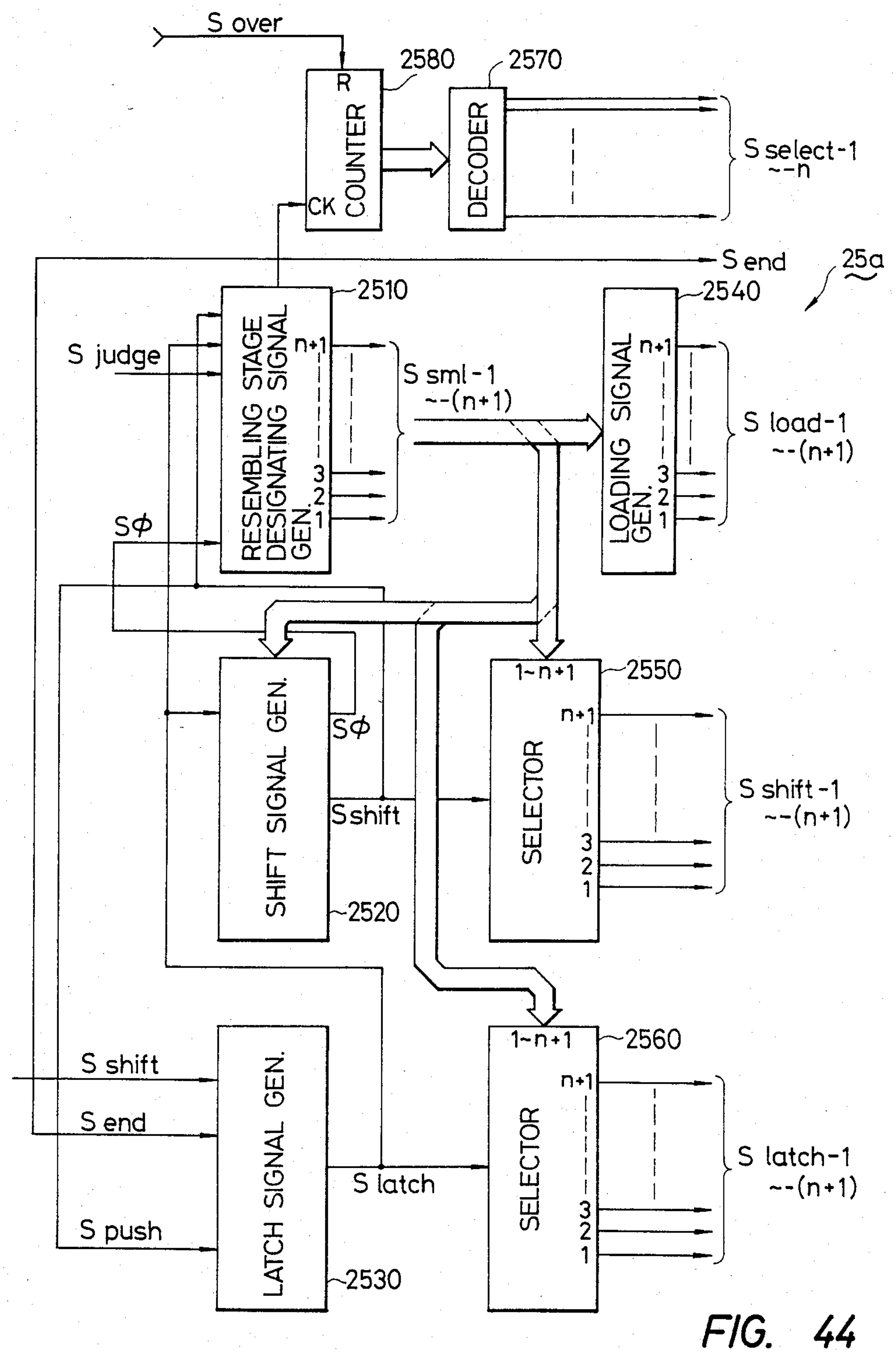
FIG. 44 is a block diagram showing the details of the controlling circuit contained in FIG. 41A.

Now, the controlling circuit 25*a* in this embodiment is noted to be comprised of the controlling circuit 25 of the first embodiment and a decoder 2570 and a counter 2580, as shown in detail in FIG. 44.

The counter 2580 is reset at each arrival of an action end signal $S_{over}$, and is controlled of its advancement of count at each arrival of a judgement end signal. The count value of this counter 2580 is decoded by the decoder 2570, and the respective decoding outputs serve as said melody designation signals $S_{select\text{-}1} \sim S_{select\text{-}4}$.

Figure 42:
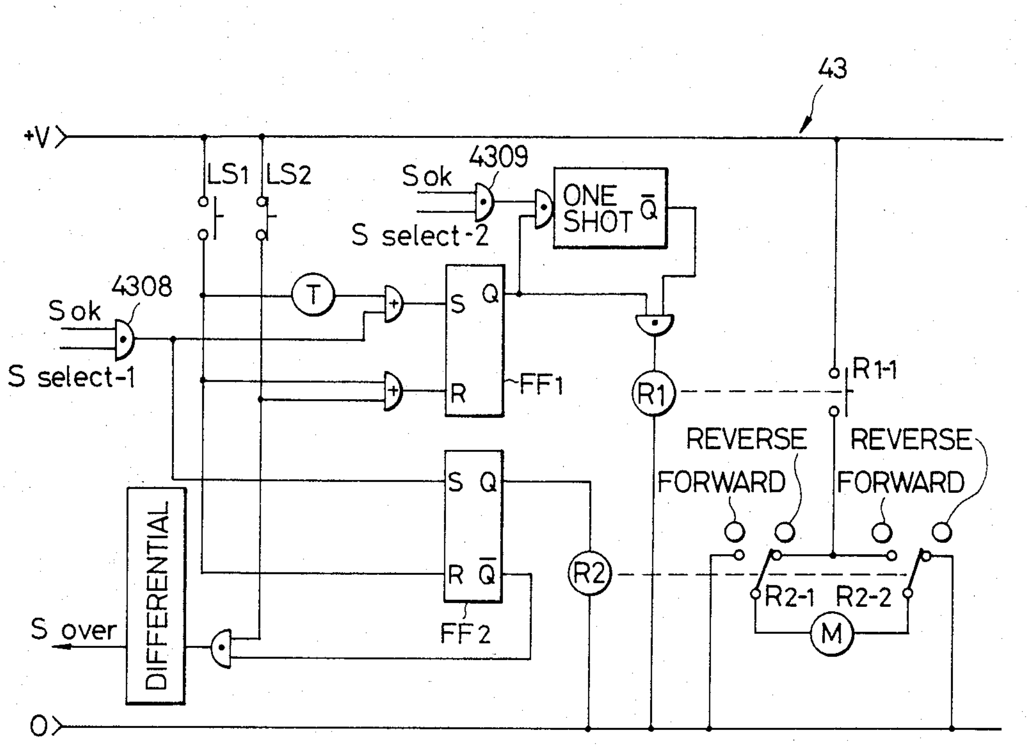
FIG. 42 is a sequence circuit diagram showing the details of the door opening and closing controlling circuit contained in FIG. 41C.
Figure 43:
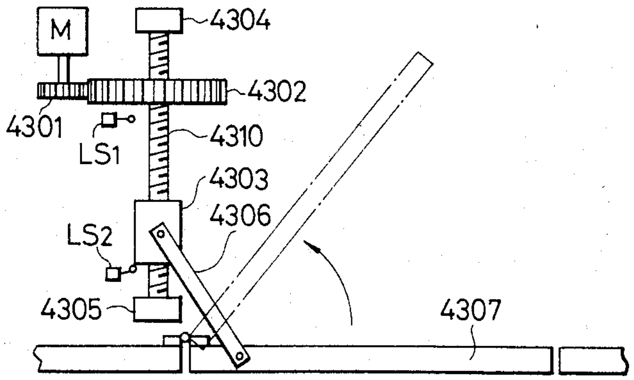
FIG. 43 is a schematic illustration showing the details of the door opening and closing driving means contained in FIG. 42.

Next, the details of the door opening and closing circuit 43 are shown in FIGS. 42 and 43.

An AND gate 4308 is controlled of its opening and closing by said melody designating signal $S_{select\text{-}1}$, and whereby it passes therethrough a melody recognition confirming signal $S_{ok}$.

An AND gate 4309 is controlled of its opening and closing by said melody designating signal $S_{select\text{-}2}$, and whereby it passes therethrough a melody recognition confirming signal $S_{ok}$.

On the other hand, as shown in FIG. 43, the rotation force of a motor M is transmitted, via a driving gear 4301, to a follower gear 4302. Whereby, a threaded rod 4310 fixed to the follower gear 4302 is rotated between the bearings 4304 and 4305 where the rod is supported.

Whereupon, a boss 4303 which meshes with the thread of the rod 4310 makes a vertical rectilinear movement in the figure in accordance with the direction of rotation of the motor M. Whereby, a door 4307 is driven to perform its opening and closing actions via a lever 4306.

Also, the distance of movement covered by the boss 4303 is restricted by a limit switch $LS_1$ or $LS_2$. The boss 4303 is allowed to make reciprocating movements between these limit switches.

In the above-stated arrangement, if a voice melody corresponding to door opening is now inputted from the microphone 41, firstly the melody designating signal $S_{select\text{-}1}$ becomes "1", and whereby the AND gate 4308 is rendered to its "opened" state.

In this state, in case the inputted voice melody sufficiently resembles the melody corresponding to the predetermined, one for the opening of a door, the melody recognition confirming signal $S_{ok}$ becomes "1", and there is established the AND condition of the AND gate 4308, and accordingly flip-flops $FF_1$ and $FF_2$ are set. As a result, a relay $R_1$ is driven and a switch $R_{1\text{-}1}$ is actuated, and said relay $R_1$ is driven so that the connection of the switches $R_{2\text{-}1}$ and $R_{2\text{-}2}$ are changed over to the forward rotation terminal side. Accordingly, the motor M starts to rotate in the forward rotation mode, and the door is opended so that a switch $LS_2$ is turned off.

When the door ends its opening action, a limit switch $LS_1$ is actuated, so that the flip-flop $FF_1$ is reset, and accordingly the switch $R_{1\text{-}1}$ is deactuated, and the motor is brought to a halt.

Also, as a result, the limit switch $LS_1$ is actuated, and the flip-flop $FF_2$ also is reset, and the motor is now plunged to a reverse rotation mode.

Then, when the timer T which is triggered by the actuation of the switch $LS_1$ reaches a predetermined time, it generates an output pulse. Whereby the flip-flop $FF_1$ is set. As a result, the switch $R_{1\text{-}1}$ is actuated, and the motor will start to rotate in its reverse rotation mode. The switch $LS_1$, on the other hand, it deactuated.

Then, when the door ends its closing action, the limit switch $LS_2$ is actuated, resetting the flip-flop $FF_1$, while deactuating the switch $R_{1\text{-}1}$, so that the motor stops. There is outputted a stop signal $S_{over}$.

When, during the period in which the door is kept open, the command "STOP" is recognized, and when the AND condition of the AND gate 4309 is established, the one shot multivibrator is driven, causing the switch $R_{1\text{-}1}$ to be deactuated for a fixed period of time, and the motor is brought to a halt.

Also, the actions of the illumination controlling circuit 44 and the bath tub filling circuit 45 are substantially the same as that mentioned above, so that their description is omitted.

Thus, according to the melody recognition apparatus shown in this embodiment, if a predetermined melody which has been preliminarily determined corresponding to respective required actions is inputted from either the microphone 41 or the input terminal 40 via, for example, an output signal of an electronic musical instrument, the opening and closing of a door, the controlling of lighting-up of an illuminating device or the controlling of pouring of water into a bath tub, or other controlling will be automatically carried out only when the inputted melody is recognized to be sufficiently resembling the corresponding reference melody pattern. Whereby, it becomes possible to effect a remote controlling of various kinds of objectives requiring controlling, via a voice or a musical instrument.

Also, especially this embodiment is arranged so that, as the presumptive step of judging whether or not the inputted melody resembles the reference melody, a phrase which can be regarded as sufficiently resembling the reference melody is extracted. Accordingly, even in case, for example, there is present an erroneous portion in the inputted melody, if such portion has been corrected by, for example, re-singing, such erroneous portion is removed from the objective intended for the evaluation of the resemblance degree, and it is possible to obtain a result of evaluation which is quite close to the sense of a music teacher (person).

For this reason, only if a melody is inputted from the microphone 41 with an accuracy of a certain extent, without necessarily with a precise accuracy, it is possible to certainly expect a desired function of the apparatus. Thus, even for a person who is not good at singing or playing or for a physically handicapped person who is not able to pronounce a strictly accurate melody, it becomes possible for him to certainly perform a remote control via a voice or musical instrument of such type and degree as mentioned above.

As will be apparent from the description of the respective embodiments made above, it is possible to recognize the information inputted via the play of a musical instrument or voice, with a sense like a music teacher, and based thereon it is possible to effect a remote control of a required objective or objectives. In addition, as compared with conventional voice recognition system which controls the objective via a voiced language, the construction of the apparatus of the present invention is relatively simple, and the apparatus can be applied widely to a remote control of any objectives in a manner as described above.

What is claimed is:

1. A tone pattern identifying system, comprising:
   means for generating a tone array of successively located tone data serving as a reference theme;
   means for externally inputting a tone array of successively located tone data independent of the reference theme tone data; and
   comparing means for collating the array of reference theme tone data with the array of inputted tone data by recognizing coincidence between the tone data in said reference theme tone array and the tone data in said inputted tone array at respective corresponding locations in the arrays each time one of these two arrays is shifted in its position relative to the other, and outputting a most closely resembling array of tone data thus recognized.

2. A tone pattern identifying system according to claim 1, in which:
   said comparing means has a reference theme memory for storing said array of reference theme tone data and an inputted tone array memory for storing said array of inputted tone data.

3. A tone pattern identifying system according to claim 1, in which:
   said comparing means further outputs, as a result of the detection, a less closely resembling array of tone data than said most closely resembling array.

4. A tone pattern identifying system according to claim 3, further comprising:
   means for producing a further tone array by combining coincidental tone data in said most closely resembling array with those coincidental tone data in said less closely resembling array.

5. A tone pattern identifying system according to claim 4, further comprising:
   means for evaluating a resemblance degree of the produced further tone array relative to the reference theme tone array based on a parameter representing the number of the coincidental tone data contained in said produced further tone array.

6. A tone pattern identifying system according to claim 4, further comprising:
   means for evaluating a resemblance degree of the produced further tone array relative to the reference theme tone array based on a parameter representing a difference in time length between said reference theme tone array and the produced further tone array.

7. A tone pattern identifying system according to claim 5, further comprising:
   means for displaying a result of the evaluation of said resemblance degree.

8. A tone pattern identifying system according to claim 6, further comprising:
   means for displaying a result of the evaluation of said resemblance degree.

9. A tone pattern identifying system according to claim 1, in which:
   each of said tone data in said inputted tone array and each of said tone data in said reference tone array both contain tone pitch data and note duration data.

10. A tone pattern identifying system comprising:
   means for generating a tone array of successively located tone data serving as a reference theme;
   means for externally inputting a tone array of successively located tone data independent of the reference theme tone data; and
   comparing means for collating between the array of reference theme tone data and the array of inputted tone data by recognizing coincidence between the tone data in said reference theme tone array and the tone data in said inputted tone array at respective corresponding locations in the arrays each time one of these two arrays is shifted in its position relative to the other, and outputting an information relating to a most closely resembling array of tone data thus recognized.

11. A tone pattern identifying system according to claim 10, in which:
   said comparing means further outputs an information relating to a less closely resembling array of tone data than said most closely resembling array as a result of the detection.

12. A tone pattern identifying system according to claim 11, in which:
   each of said informations contains data indicative of the number of shifting of one of the two arrays done by the time the resembling array is recognized.

13. A tone pattern identifying system according to claim 11, further comprising:
   means for producing a further tone array by combining coincidental tone data in a most closely resembling array reproduced on the basis of the information relating to the most closely resembling array together with coincidental tone data in a less closely resembling array reproduced on the basis of the information relating to the less closely resembling array.

14. A tone pattern identifying system according to claim 13, further comprising:
   means for evaluating a resemblance degree of the produced further tone array relative to the reference theme tone array based on a parameter representing the number of the coincidental tone data contained in said produced further tone array.

15. A tone pattern identifying system according to claim 13, further comprising:
   means for evaluating a resemblance degree of the produced further tone array relative to the reference theme tone array based on a parameter representing a difference in time length between said reference theme tone array and the produced further tone array.

16. A tone pattern identifying system according to claim 14, further comprising:
   means for displaying a result of the evaluation of said resemblance degree.

17. A tone pattern identifying system according to claim 15, further comprising:
   means for displaying a result of the evaluation of said resemblance degree.

18. A tone pattern identifying system according to claim 10, in which:
   each of said tone data in said inputted tone array and each of said tone data in said reference tone array both contain tone pitch data and note duration data.

19. A tone pattern identifying system, comprising:

means for generating a tone array of successively located tone data serving as a reference theme, means for inputting a separate tone array of successively located tone data, comparing means for collating the array of reference theme tone data with the array of inputted tone data, comprising:

means for successively shifting the position of one of these two tone data arrays relative to the other, and means, operative at each shift of said shifting means, for comparing coincidence at each array location between the tone data of said two relatively shifted arrays, and means for outputting a most closely resembling array of tone data from the coincidences recognized by said comparing means.

* * * * *